US012563234B2

(12) United States Patent
Xiu et al.

(10) Patent No.: US 12,563,234 B2
(45) Date of Patent: Feb. 24, 2026

(54) SIGN PREDICTION FOR BLOCK-BASED VIDEO CODING

(71) Applicant: BEIJING DAJIA INTERNET INFORMATION TECHNOLOGY CO., LTD., Beijing (CN)

(72) Inventors: Xiaoyu Xiu, San Diego, CA (US); Ning Yan, San Diego, CA (US); Yi-Wen Chen, San Diego, CA (US); Che-Wei Kuo, San Diego, CA (US); Wei Chen, San Diego, CA (US); Hong-Jheng Jhu, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/606,849

(22) Filed: Mar. 15, 2024

(65) Prior Publication Data

US 2024/0223811 A1     Jul. 4, 2024

Related U.S. Application Data

(63) Continuation-in-part of application No. 18/435,883, filed on Feb. 7, 2024, now Pat. No. 12,452,457, and
(Continued)

(51) Int. Cl.
*H04N 19/61*          (2014.01)
*H04N 19/132*        (2014.01)
(Continued)

(52) U.S. Cl.
CPC ........... *H04N 19/61* (2014.11); *H04N 19/132* (2014.11); *H04N 19/176* (2014.11); *H04N 19/18* (2014.11); *H04N 19/196* (2014.11)

(58) Field of Classification Search
CPC .... H04N 19/61; H04N 19/132; H04N 19/176; H04N 19/18; H04N 19/196; H04N 19/14
See application file for complete search history.

(56) References Cited

U.S. PATENT DOCUMENTS

| | | | | |
|---|---|---|---|---|
| 8,130,828 B2 * | 3/2012 | Hsu | ...................... | H04N 19/126 375/240 |
| 10,609,367 B2 * | 3/2020 | Zhao | ...................... | H04N 19/13 |

(Continued)

FOREIGN PATENT DOCUMENTS

| | | |
|---|---|---|
| KR | 1020200064171 A | 6/2020 |
| WO | 2017115028 A1 | 7/2017 |

(Continued)

OTHER PUBLICATIONS

Maryam Mokhtari et al., (hereinafter Mokhtari); "Texture Classification using Dominant Gradient Descriptors", Conference of Machine Vision and Image Processing (MVIP), IEEE, 2013 (Year: 2013).*
(Continued)

*Primary Examiner* — Dramos Kalapodas
(74) *Attorney, Agent, or Firm* — Bayes PLLC

(57) ABSTRACT

Implementations of the disclosure provide a video decoding apparatus and method for transform coefficient sign prediction on a video decoder side. The method may include generating a plurality of candidate hypotheses for a set of candidate transform coefficients associated with a transform block of a video frame from a video. The method may further include selecting a hypothesis from the plurality of candidate hypotheses as a set of predicted signs for the set of candidate transform coefficients, wherein the hypothesis is selected based on a cost function calculated by extrapolating neighboring samples of the transform block in an extrapolation direction determined based on a dominant gradient direction. The method may also include estimating original signs for the set of candidate transform coefficients
(Continued)

based on the set of predicted signs and a sequence of sign signaling bits received from a video encoder.

20 Claims, 28 Drawing Sheets

Related U.S. Application Data a continuation of application No. PCT/US2022/043607, filed on Sep. 15, 2022, said application No. 18/435,883 is a continuation of application No. PCT/US2022/040442, filed on Aug. 16, 2022.

(60) Provisional application No. 63/250,797, filed on Sep. 30, 2021, provisional application No. 63/244,317, filed on Sep. 15, 2021, provisional application No. 63/233,940, filed on Aug. 17, 2021.

(51) Int. Cl.
H04N 19/176 (2014.01)
H04N 19/18 (2014.01)
H04N 19/196 (2014.01)

(56) References Cited

U.S. PATENT DOCUMENTS

| | | | |
|---|---|---|---|
| 10,713,523 B2 | 7/2020 | Paschalakis et al. | |
| 2010/0166074 A1 | 7/2010 | Ho et al. | |
| 2013/0039423 A1* | 2/2013 | Helle | H04N 19/46 |
| | | | 375/E7.125 |
| 2015/0221068 A1 | 8/2015 | Martensson et al. | |
| 2016/0014421 A1 | 1/2016 | Cote et al. | |
| 2017/0142444 A1 | 5/2017 | Henry | |
| 2018/0176556 A1* | 6/2018 | Zhao | H04N 19/176 |
| 2018/0176563 A1 | 6/2018 | Zhao et al. | |
| 2019/0208225 A1* | 7/2019 | Chen | H04N 19/176 |
| 2020/0396487 A1 | 12/2020 | Nalci et al. | |
| 2020/0404311 A1 | 12/2020 | Filippov et al. | |
| 2021/0014509 A1* | 1/2021 | Filippov | H04N 19/463 |
| 2021/0067807 A1 | 3/2021 | Lainema | |
| 2021/0297703 A1* | 9/2021 | Li | H04N 19/159 |
| 2022/0174281 A1* | 6/2022 | Jiang | H04N 19/124 |

FOREIGN PATENT DOCUMENTS

| | | | |
|---|---|---|---|
| WO | 2019135930 A1 | 7/2019 | |
| WO | 2019172797 A1 | 9/2019 | |
| WO | 2019172802 A1 | 9/2019 | |
| WO | 20190172798 A1 | 9/2019 | |
| WO | 2023055300 A2 | 4/2023 | |

OTHER PUBLICATIONS

Anthony Nasrallah et al., (hereinafter Nasrallah) "Decoder-Side Intra Mode Derivation With Texture Analysis in VVC Test Model" *Ateme, France, 978-1-5386-6249-6 @ 2019 IEEE (Year: 2019).*
Alexander Alshin et al., :Description of SDR, HDR and 360 video coding technology proposal considering mobile application scenario by Samsung, Huawei, GoPro, and HiSilicon JVET-J0024-v2, San Diego, US Apr. 10-20, 2018 (Year: 2018).*
International Search Report and Written Opinion in related PCT Application No. PCT/US2022/040442 dated Nov. 25, 2022 (11 pages).
International Search Report and Written Opinion in related PCT Application No. PCT/US2023/010901 dated May 10, 2023 (9 pages).
International Search Report and Written Opinion in related PCT Application No. PCT/US2022/049264 dated Apr. 5, 2023 (9 pages).
International Search Report and Written Opinion in related PCT Application No. PCT/US2022/053150 dated Apr. 14, 2023 (12 pages).

Jianle Chen et al., Algorithm Description for Versatile Video Coding and Test Model 13 (VTM 13), Joint Video Experts Team (JVET) of ITU-T SG 16 WP 3 and ISO/IEC JTC I/SC 29, [Document: JVETV2002-v1 (Version 1 )], 22nd Meeting, by teleconference, Jul. 4, 2021.
Joel Sole et al., Transform Coefficient Coding in HEVC, IEEE Transactions on Circuits and Systems for Video Technology (vol. 22, No. 12), pp. 1765-1777, Dec. 12, 2012.
Sehwan Ki et al., Learning-Based JND-Directed HDR Video Pre-processing for Perceptually Lossless Compression With HEVC, IEEE Access (vol. 8), pp. 228605-228618, Dec. 31, 2020.
Mohammed Golam Sarwer et al., AHG12: On Sign Pediction, Joint Video Experts Team (JVET) of ITU-T SG 16 WP 3 and ISO/IEC JTC 1/SC 29 24th Meeting, by teleconference, JVET-X0120-v2, Oct. 7, 2021.
Jie Chen et al., EE2-4.3 related: More Combined Test Results for Sign Prediction, JVET-Y0141-v2, Joint Video Experts Team (JVET) of ITU-T SG 16 WP 3 and ISO/IEC JTC 1/SC 29, 25th Meeting, by teleconference, pp. 1-5, Jan. 12, 2022.
International Search Report and Written Opinion in related PCT Application No. PCT/US2022/043607 dated Dec. 12, 2022 (11 pages).
Heiko Schwarz et al., "Additional Support of Dependent Quantization with 8 States", JVET-Q0243-v2, Joint Video Experts Team (JVET) of ITU-T SG 16 WP 3 and ISO/IEC JTC 1/SC 29/WG 11, 17th Meeting: Brussels, BE, pp. 1-12, Jan. 8, 2020.
Office Action in related Japanese Application No. 2024-516981, dated May 27, 2025 (8 pgs.).
Supplementary European Search Report in related European Application No. 22870667.7 dated Jul. 7, 2025 (13 pgs.).
Mohsen Abdoli, et al. , Non-CE3: Decoder-side Intra Mode Derivation with Prediction Fusion Using Planar , Joint Video Experts Team (JVET) of ITU-T SG 16 WP 3 and ISO/IEC JTC 1/SC 29/WG 11 , JVET-00449-v21, 15th Meeting: Gothenburg, SE Jul. 12, 2019 (12 pgs.).
Felix Henry and Gordon Clare , Residual Coefficient Sign Prediction , Joint Video Exploration Team (JVET) of ITU-T SG 16 WP 3 and ISO/IEC JTC 1/SC 29/WG 11 , JVET-D0031 , 4th Meeting: Chengdu, CN , Oct. 15-21, 2016 (8 pgs.).
Xiaoyu Xiu, et al. , AHG12: Enhanced sign prediction , Joint Video Experts Team (JVET) of ITU-T SG 16 WP 3 and ISO/IEC JTC 1/SC 29 , JVET-X0150-v2 , 24th Meeting, by teleconference , Oct. 6-15, 2021 (5 pgs.).
Nasrallah Anthony et al: "Decoder-Side Intra Mode Derivation with Texture Analysis in VVC Test Model", 2019 IEEE International Conference On Image Processing (ICIP), IEEE, Sep. 22, 2019 (Sep. 22, 2019), pp. 3153-3157, XP033642190, DOI: 10.1109/ICIP.2019. 8803773 [retrieved on Aug. 15, 2019], (5 pgs.).
Coban M et al: "Algorithm description of Enhanced Compression Model 2 (ECM 2)", 135. Mpeg Meeting; Jul. 12, 2021-Jul. 16, 2021; Online; (Motion Picture Expert Group or Iso/Iec JTC1/SC29/WG11),, No. m57745; JVET-W2025 Sep. 1, 2021 (Sep. 1, 2021), XP030297803, Retrieved from the Internet: URL: https://dms.mpeg. expert/doc_end_user/documents/135_Teleconference/wg11/m57745-JVET-W2025-v1-JVET-W2025.zip JVET-W2025.docx [retrieved on Sep. 1, 2021], (22 pgs.).
Extended European Search report in related European Application No. 22893519.3, dated Oct. 27, 2025 (17 pages).
Final Office Action in related U.S. Appl. No. 18/658,783, filed Nov. 14, 2025 (24 pages).
Extended European Search Report in related European Application No. 22908485.0, dated Nov. 14, 2025 (13 pages).
Notice of Allowance in related U.S. Appl. No. 18/743,673, dated Dec. 16, 2025 (16 pages).
Extended European Search Report in related European Application No. 23740726.7, dated Nov. 14, 2025 (13 pages).
Alshin A et al: "Description of SDR, HDR and 360° video coding technology proposal by Samsung, Huawei, GoPro, and HiSilicon " mobile application scenario, 10. Jvet Meeting; Oct. 4, 2018-Apr. 20, 2018; San Diego; (The Joint Video Exploration Team of ISO/IEC JTC1/SC29/WG11 and ITU-TSG. 16 ); Url: http://phenix.int-Evry. Fr/Jvet/,, No. JVET-J0024-v5, Apr. 14, 2018 (Apr. 14, 2018-), XP030151190.

(56) References Cited

OTHER PUBLICATIONS

Office Action in related U.S. Appl. No. 18/775,207 dated Jan. 12, 2026 (21 pages).
Office Action in related Indian Application No. 202417028954 dated Dec. 19, 2025 (8 pages).

* cited by examiner

|  |  |  |  |
|---|---|---|---|
|  |  |  |  |
| $B_{2,0}$ | $B_{2,1}$ | $B_{2,2}$ | $B_{2,3}$ |
| $B_{1,0}$ | $B_{1,1}$ | $B_{1,2}$ | $B_{1,4}$ |

|  |  | $C_{0,2}$ | $C_{0,1}$ | $P_{0,0}$ | $P_{0,1}$ | $P_{0,2}$ | $P_{0,3}$ |
|---|---|---|---|---|---|---|---|
|  |  | $C_{1,2}$ | $C_{1,1}$ | $P_{1,0}$ |  |  |  |
|  |  | $C_{2,2}$ | $C_{2,1}$ | $P_{2,0}$ |  |  |  |
|  |  | $C_{3,2}$ | $C_{3,1}$ | $P_{3,0}$ |  |  |  |

FIG. 10

1700

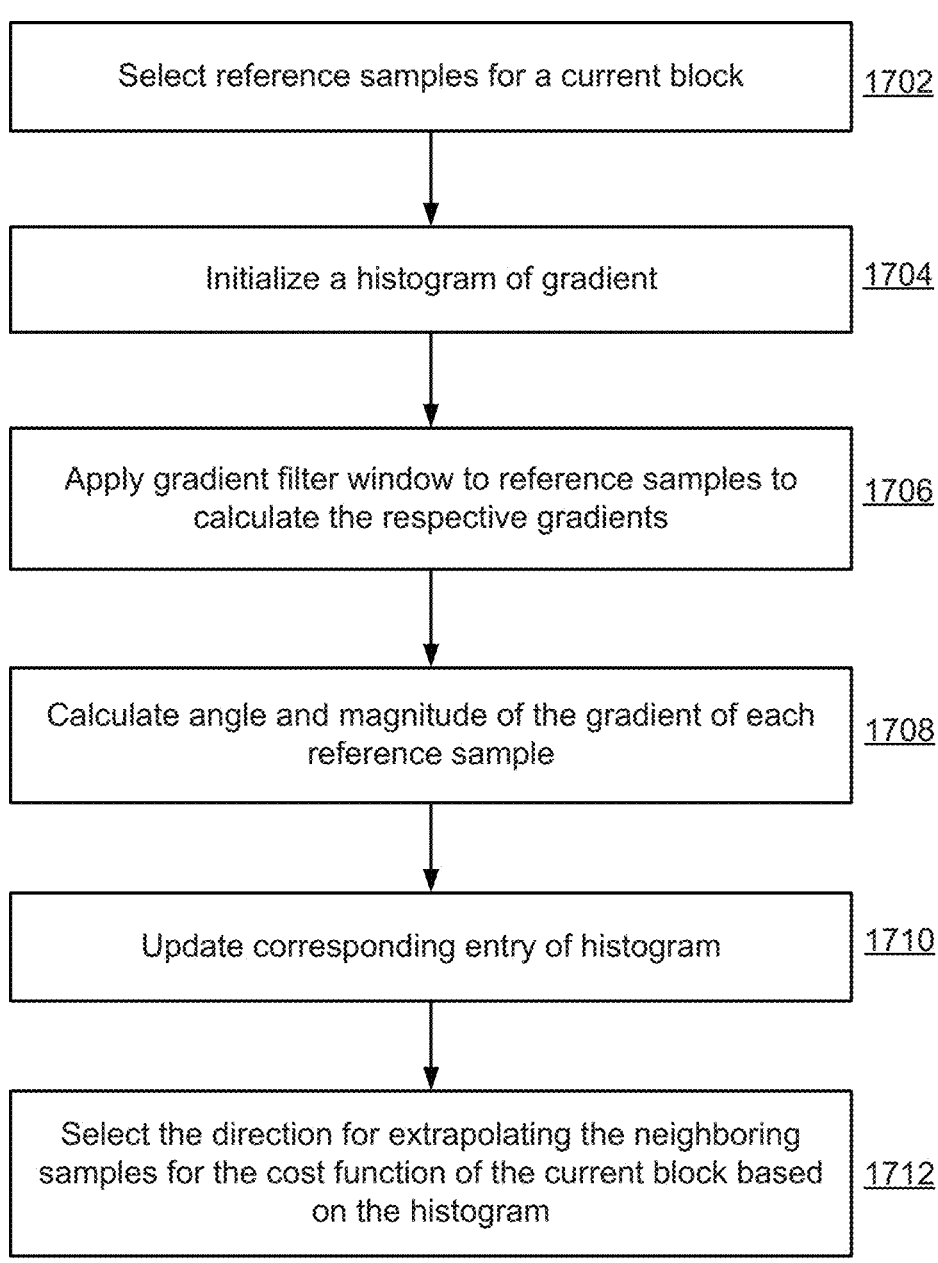

| Select reference samples for a current block | 1702 |

| Initialize a histogram of gradient | 1704 |

| Apply gradient filter window to reference samples to calculate the respective gradients | 1706 |

| Calculate angle and magnitude of the gradient of each reference sample | 1708 |

| Update corresponding entry of histogram | 1710 |

| Select the direction for extrapolating the neighboring samples for the cost function of the current block based on the histogram | 1712 |

FIG. 17

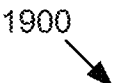

1900

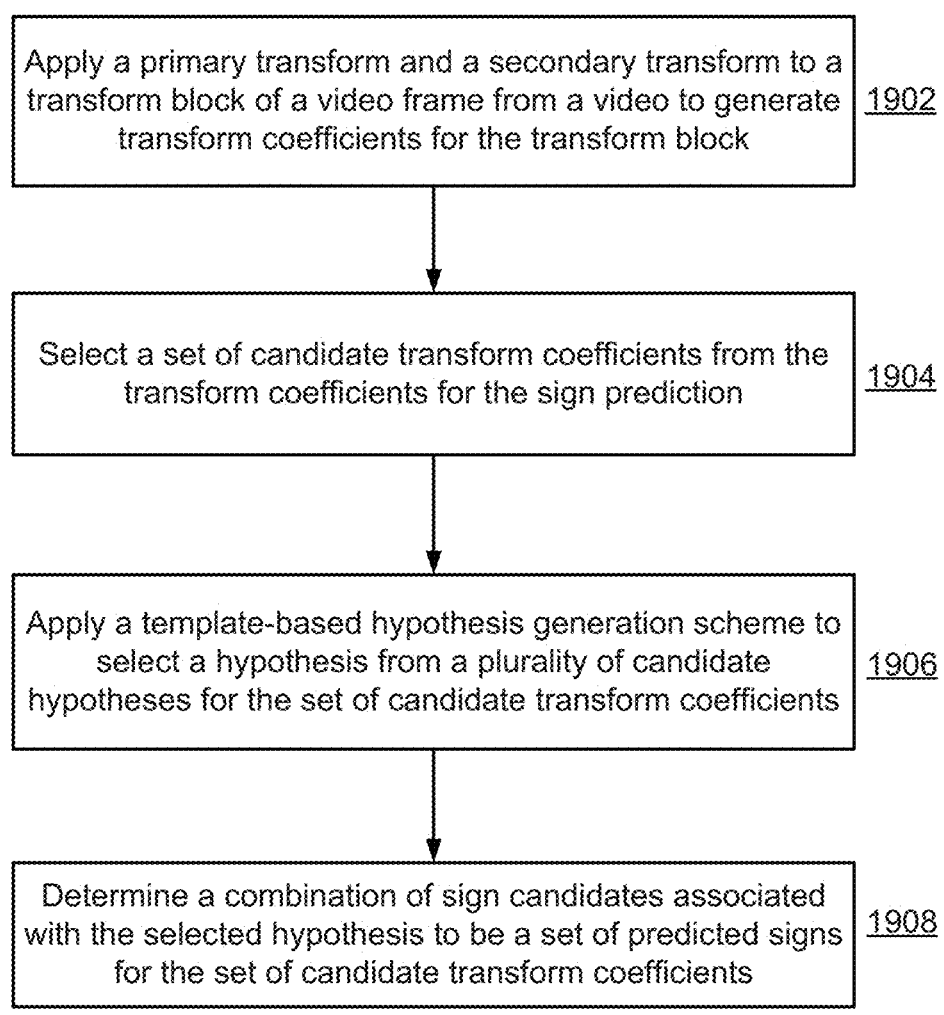

| Apply a primary transform and a secondary transform to a transform block of a video frame from a video to generate transform coefficients for the transform block | 1902 |

| Select a set of candidate transform coefficients from the transform coefficients for the sign prediction | 1904 |

| Apply a template-based hypothesis generation scheme to select a hypothesis from a plurality of candidate hypotheses for the set of candidate transform coefficients | 1906 |

| Determine a combination of sign candidates associated with the selected hypothesis to be a set of predicted signs for the set of candidate transform coefficients | 1908 |

FIG. 19

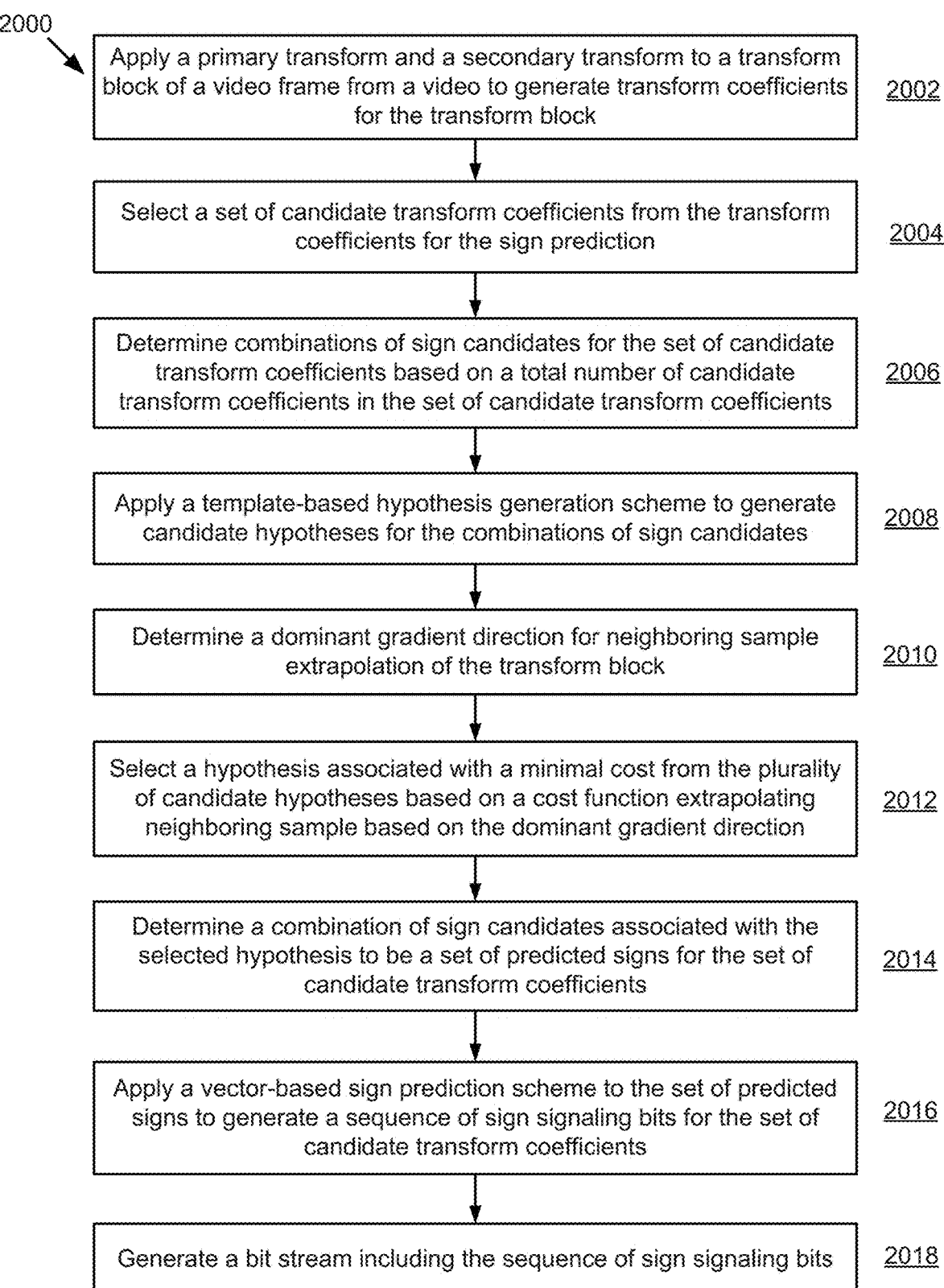

2000

Apply a primary transform and a secondary transform to a transform block of a video frame from a video to generate transform coefficients for the transform block    2002

Select a set of candidate transform coefficients from the transform coefficients for the sign prediction    2004

Determine combinations of sign candidates for the set of candidate transform coefficients based on a total number of candidate transform coefficients in the set of candidate transform coefficients    2006

Apply a template-based hypothesis generation scheme to generate candidate hypotheses for the combinations of sign candidates    2008

Determine a dominant gradient direction for neighboring sample extrapolation of the transform block    2010

Select a hypothesis associated with a minimal cost from the plurality of candidate hypotheses based on a cost function extrapolating neighboring sample based on the dominant gradient direction    2012

Determine a combination of sign candidates associated with the selected hypothesis to be a set of predicted signs for the set of candidate transform coefficients    2014

Apply a vector-based sign prediction scheme to the set of predicted signs to generate a sequence of sign signaling bits for the set of candidate transform coefficients    2016

Generate a bit stream including the sequence of sign signaling bits    2018

FIG. 20

SIGN PREDICTION FOR BLOCK-BASED VIDEO CODING

CROSS-REFERENCE TO RELATED APPLICATIONS

This application is a continuation of PCT Application No. PCT/US22/43607, filed Sep. 15, 2022, which is based upon and claims priority to U.S. Provisional Application No. 63/244,317, filed Sep. 15, 2021, and U.S. Provisional Application No. 63/250,797, filed Sep. 30, 2021. This application is also a continuation-in-part of U.S. application Ser. No. 18/435,883, filed Feb. 7, 2024, which is a bypass continuation of PCT Application No. PCT/US22/40442, filed Aug. 16, 2022, which further claims priority to U.S. Provisional Application No. 63/233,940, filed Aug. 17, 2021.

TECHNICAL FIELD

This application is related to video coding and compression. More specifically, this application relates to video processing systems and methods for sign prediction in block-based video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

SUMMARY

Implementations of the present disclosure provide a video decoding method for transform coefficient sign prediction on a video decoder side. The video decoding method may include selecting, by one or more processors, a set of candidate transform coefficients from dequantized transform coefficients for the transform coefficient sign prediction. The dequantized transform coefficients are associated with a transform block of a video frame from a video. The video decoding method may further include applying, by the one or more processors, a template-based hypothesis generation scheme to select a hypothesis from a plurality of candidate hypotheses for the set of candidate transform coefficients. The video decoding method may additionally include determining, by the one or more processors, a combination of sign candidates associated with the selected hypothesis to be a set of predicted signs for the set of candidate transform coefficients. The video decoding method may additionally include estimating, by the one or more processors, original signs for the set of candidate transform coefficients based on the set of predicted signs and a sequence of sign signaling bits received from a video encoder. The video decoding method may additionally include updating, by the one or more processors, the dequantized transform coefficients based on the estimated original signs for the set of candidate transform coefficients.

Implementations of the present disclosure also provide a video decoding apparatus for transform coefficient sign prediction on a video decoder side. The video decoding apparatus may include a memory configured to store a video including a plurality of video frames and one or more processors coupled to the memory. The one or more processors may be configured to select a set of candidate transform coefficients from dequantized transform coefficients for the transform coefficient sign prediction. The dequantized transform coefficients are associated with a transform block of a video frame from the video. The one or more processors may further be configured to apply a template-based hypothesis generation scheme to select a hypothesis from a plurality of candidate hypotheses for the set of candidate transform coefficients. The one or more processors may additionally be configured to determine a combination of sign candidates associated with the selected hypothesis to be a set of predicted signs for the set of candidate transform coefficients. The one or more processors may additionally be configured to estimate original signs for the set of candidate transform coefficients based on the set of predicted signs and a sequence of sign signaling bits received from a video encoder. The one or more processors may additionally be configured to update the dequantized transform coefficients based on the estimated original signs for the set of candidate transform coefficients.

Implementations of the present disclosure also provide a non-transitory computer-readable storage medium having stored therein instructions which, when executed by one or more processors, cause the one or more processors to perform a video decoding method for transform coefficient sign prediction on a video decoder side. The video decoding method may include selecting a set of candidate transform coefficients from dequantized transform coefficients for the sign prediction. The dequantized transform coefficients are associated with a transform block of a video frame from a video. The video decoding method may further include applying a template-based hypothesis generation scheme to select a hypothesis from a plurality of candidate hypotheses for the set of candidate transform coefficients. The video decoding method may further include determining a combination of sign candidates associated with the selected hypothesis to be a set of predicted signs for the set of candidate transform coefficients. The video decoding method may additionally include estimating original signs for the set of candidate transform coefficients based on the set of predicted signs and a sequence of sign signaling bits received through a bit stream from a video encoder. The video decoding method may additionally include updating the dequantized transform coefficients based on the estimated original signs for the set of candidate transform coefficients. The bit stream is stored in the non-transitory computer-readable storage medium.

Implementations of the present disclosure also provide a non-transitory computer-readable storage medium having stored therein a bitstream which is decodable by a video decoding method. The video decoding method includes selecting a set of candidate transform coefficients from dequantized transform coefficients for transform coefficient sign prediction. The dequantized transform coefficients are associated with a transform block of a video frame from a video. The video decoding method includes applying a template-based hypothesis generation scheme to select a hypothesis from a plurality of candidate hypotheses for the set of candidate transform coefficients. The video decoding method includes determining a combination of sign candidates associated with the selected hypothesis to be a set of predicted signs for the set of candidate transform coefficients. The video decoding method includes estimating original signs for the set of candidate transform coefficients based on the set of predicted signs and a sequence of sign signaling bits received through a bit stream from a video encoder. The video decoding method includes updating the dequantized transform coefficients based on the estimated original signs for the set of candidate transform coefficients.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 10 is a graphical representation illustrating calculation of a cost function for sign prediction in accordance with some examples.

FIG. 17 is a flow chart of a method for capturing a dominate gradient direction within the neighboring reconstructed samples of a current block in accordance with some implementations of the present disclosure.

FIG. 19 is a flow chart of an exemplary method for sign prediction in block-based video coding in accordance with some implementations of the present disclosure.

FIG. 20 is a flow chart of an exemplary video encoding method for transform coefficient sign prediction performed by a video encoder in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

Figure 1:
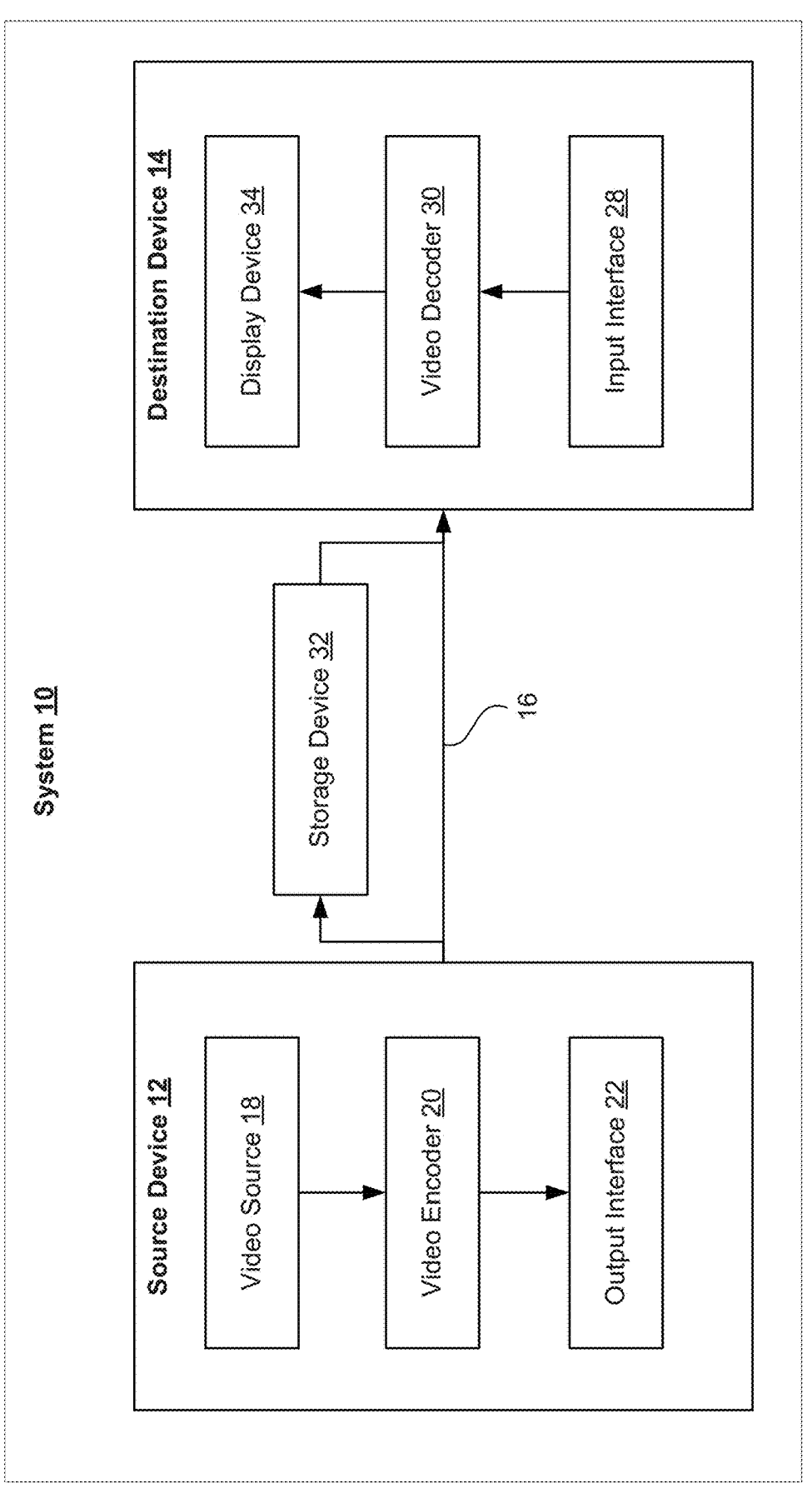
FIG. 1 is a block diagram illustrating an exemplary system for encoding and decoding video blocks in accordance with some implementations of the present disclosure.

FIG. 1 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of forwarding the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may store the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or any combination thereof that is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20, and the output interface 22. The video source 18 may include a source such as a video capturing device, e.g., a video camera, a video archive containing previously captured video, a video feeding interface to receive video data from a video content provider, and/or a computer graphics system for generating computer graphics data as the source video, or a combination of such sources. As one example, if the video source 18 is a video camera of a security surveillance system, the source device 12 and the destination device 14 may include camera phones or video phones. However, the implementations described in the present disclosure may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data for a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present disclosure is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
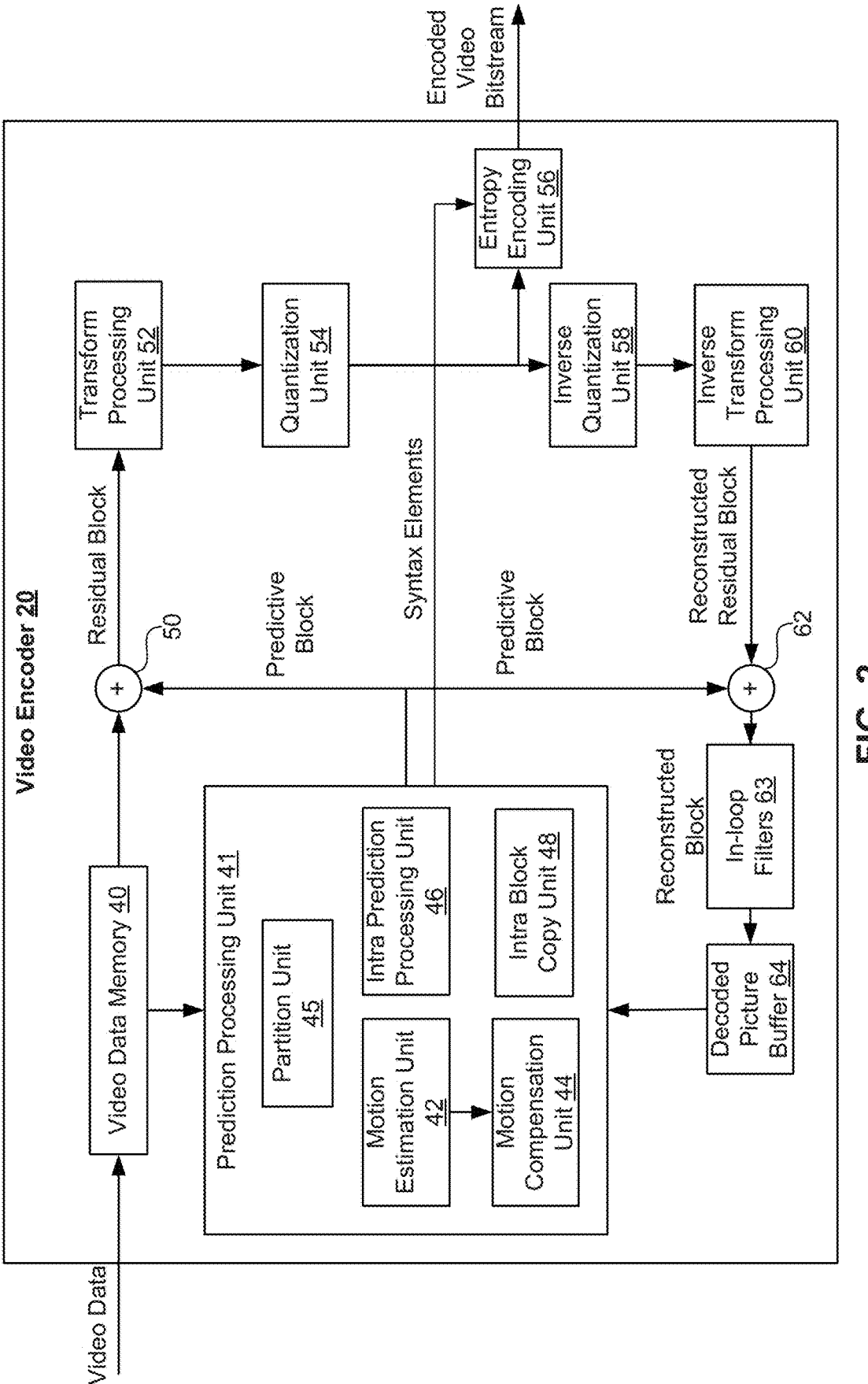
FIG. 2 is a block diagram illustrating an exemplary video encoder in accordance with some implementations of the present disclosure.

FIG. 2 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove block artifacts from reconstructed video data. Another in-loop filter, such as an SAO filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning, Triple-Tree (TT) partitioning or any combination thereof. It should be noted that the term "block" or "video block" as used herein may be a portion, in particular a rectangular (square or non-square) portion, of a frame or a picture. With reference to, for example, HEVC and VVC, the block or video block may be or correspond to a Coding Tree Unit (CTU), a CU, a Prediction Unit (PU), or a Transform Unit (TU), and/or may be or correspond to a corresponding block, e.g., a Coding Tree Block (CTB), a Coding Block (CB), a Prediction Block (PB), or a Transform Block (TB). Alternatively or additionally, the block or video block may be or correspond to a sub-block of a CTB, a CB, a PB, a TB, etc.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block (e.g., a predictive block) to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference frame, according to a predetermined pattern within a sequence of video frames. Motion estimation, performed by the motion estimation unit 42, may be a process of generating motion vectors, which may estimate motion for video blocks. A motion vector, for example, may indicate the displacement of a video block within a current video frame or picture relative to a predictive block within a reference frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vectors.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual block of pixel difference values by subtracting pixel values of the predictive block provided by the motion compensation unit 44 from the pixel values of the current video block being coded. The pixel difference values forming the residual block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. It is noted that the motion estimation unit 42 and the motion compensation unit 44 may be integrated together, which are illustrated separately for conceptual purposes in FIG. 2.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or from a different frame according to inter prediction, the video encoder 20 may form a residual block by subtracting pixel values of the predictive block from the pixel values of the current video block being coded, forming pixel difference values. The pixel difference values forming the residual block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. For example, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in a bitstream.

After the prediction processing unit 41 determines the predictive block for the current video block via either inter prediction or intra prediction, the summer 50 forms a residual block by subtracting the predictive block from the current video block. The residual video data in the residual block may be included in one or more TUs and is provided to the transform processing unit 52. The transform processing unit 52 transforms the residual video data into transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 may use an entropy encoding technique to encode the quantized transform coefficients into a video bitstream, e.g., using Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding, or another entropy encoding methodology or technique. The encoded bitstream may then be transmitted to the video decoder 30 as shown in FIG. 1 or archived in the storage device 32 as shown in FIG. 1 for later transmission to or retrieval by the video decoder 30. The entropy encoding unit 56 may also use an entropy encoding technique to encode the motion vectors and the other syntax elements for the current video frame being coded.

The inverse quantization unit 58 and the inverse transform processing unit 60 apply inverse quantization and inverse transformation, respectively, to reconstruct the residual block in the pixel domain for generating a reference block for prediction of other video blocks. A reconstructed residual block may be generated thereof. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42, and the motion compensation unit 44 as a predictive block to inter predict another video block in a subsequent video frame.

Figure 3:
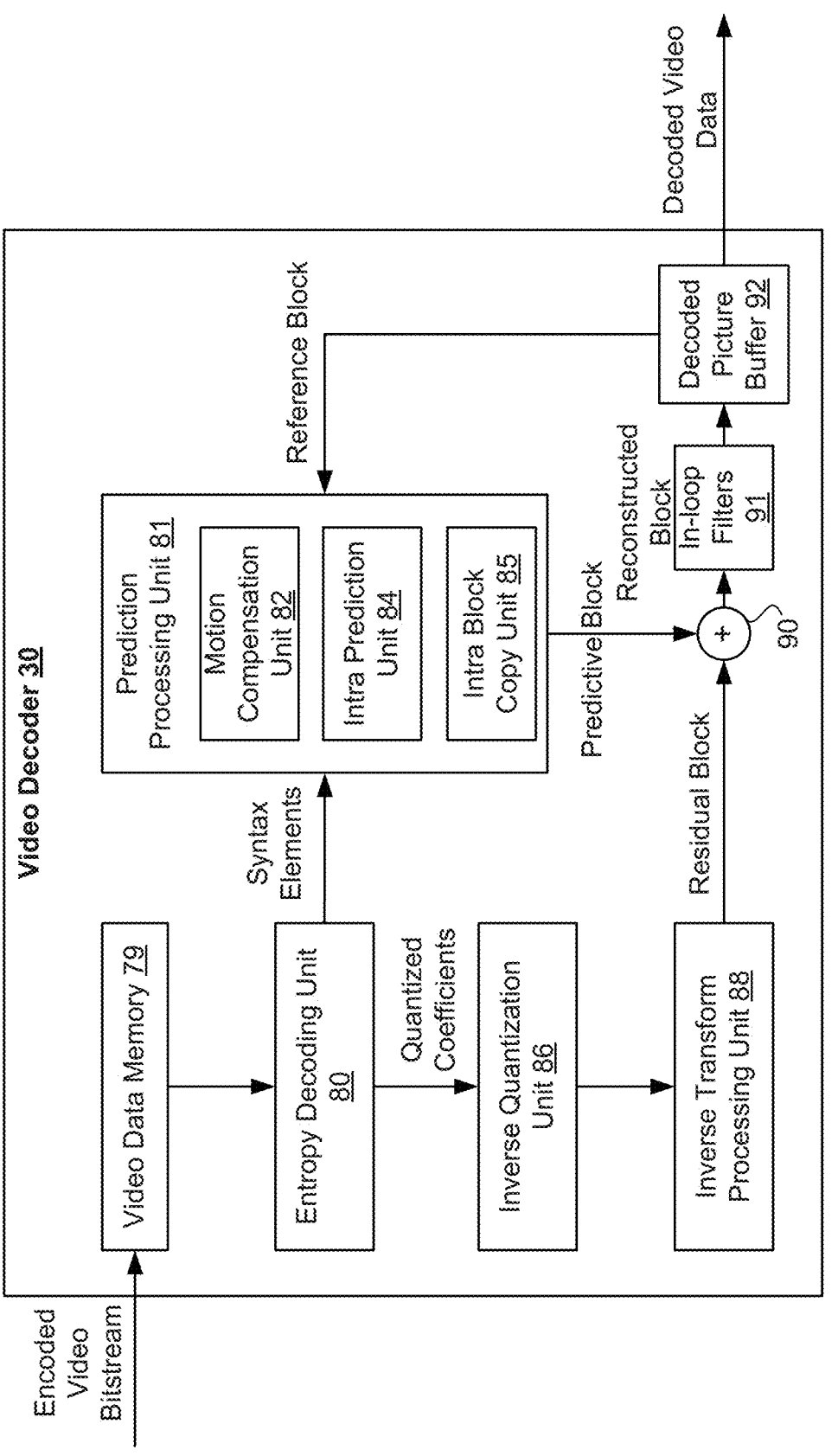
FIG. 3 is a block diagram illustrating an exemplary video decoder in accordance with some implementations of the present disclosure.

FIG. 3 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 may use an entropy decoding technique to decode the bitstream to obtain quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (e.g., I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, e.g., List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block processed by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inversely quantizes the quantized transform coefficients provided in the bitstream and decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs a decoded video block for the current video block by summing the residual block from the inverse transform processing unit 88 and a corresponding predictive block generated by the motion compensation unit 82 and the intra BC unit 85. The decoded video block may also be referred to as a reconstructed block for the current video block. An in-loop filter 91 such as a deblocking filter, SAO filter, and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process (e.g., including a video encoding process and a video decoding process), a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
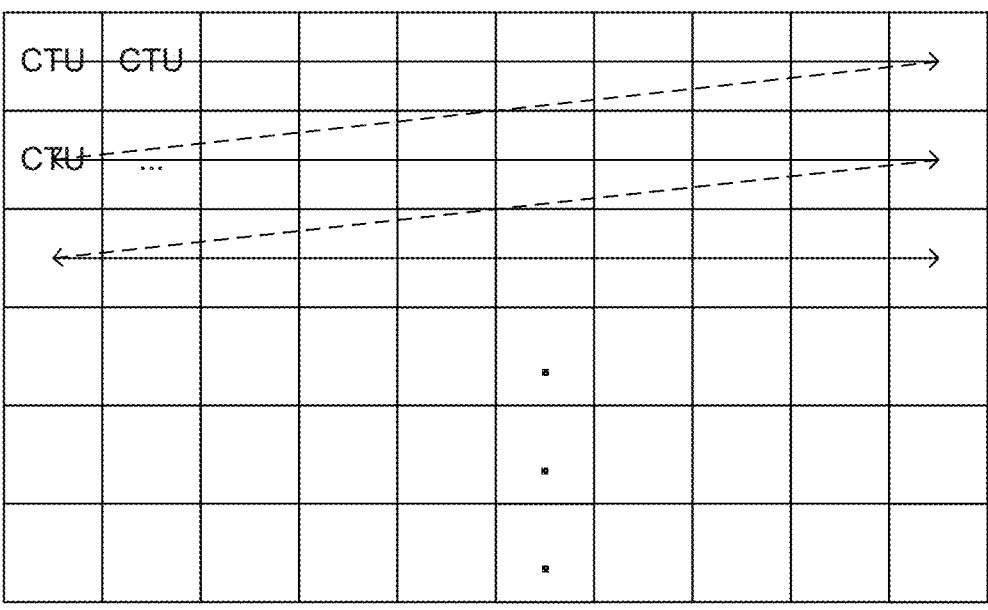
FIGS. 4A through 4E are graphical representations illustrating how a frame is recursively partitioned into multiple video blocks of different sizes and shapes in accordance with some implementations of the present disclosure.
Figure 4B:
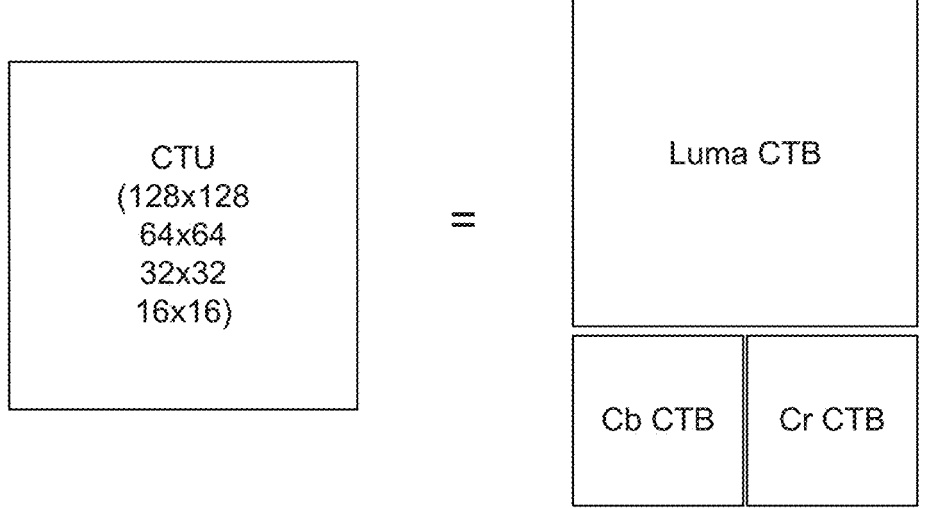

As shown in FIG. 4A, the video encoder 20 (or more specifically the partition unit 45) generates an encoded representation of a frame by first partitioning the frame into a set of CTUs. A video frame may include an integer number of CTUs arranged consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that a CTU in the present disclosure is not necessarily limited to a particular size. As shown in FIG. 4B, each CTU may include one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may include a single coding tree block and syntax elements used to code the samples of the coding tree block. A coding tree block may be an N×N block of samples.

Figure 4C:
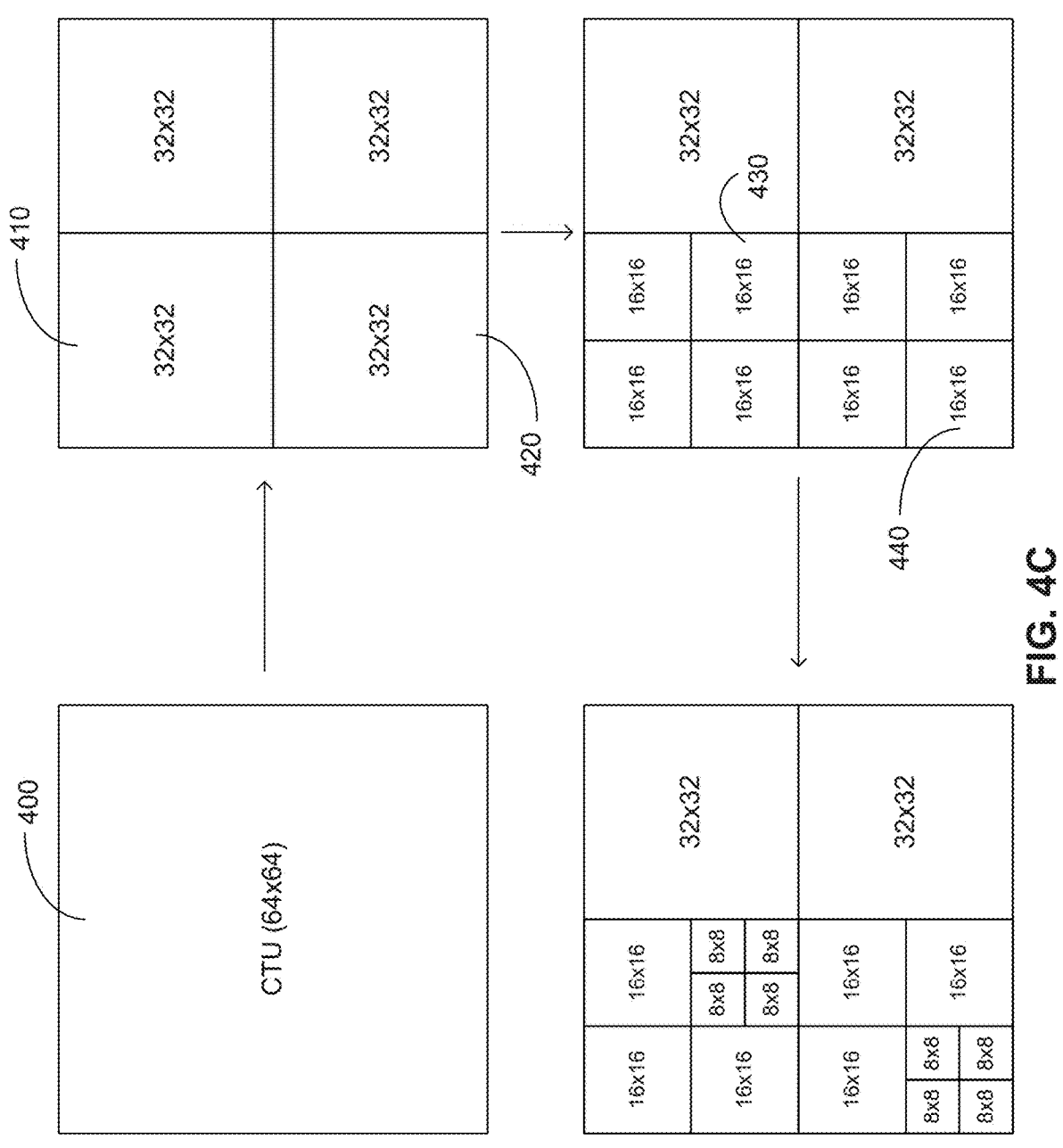
Figure 4D:
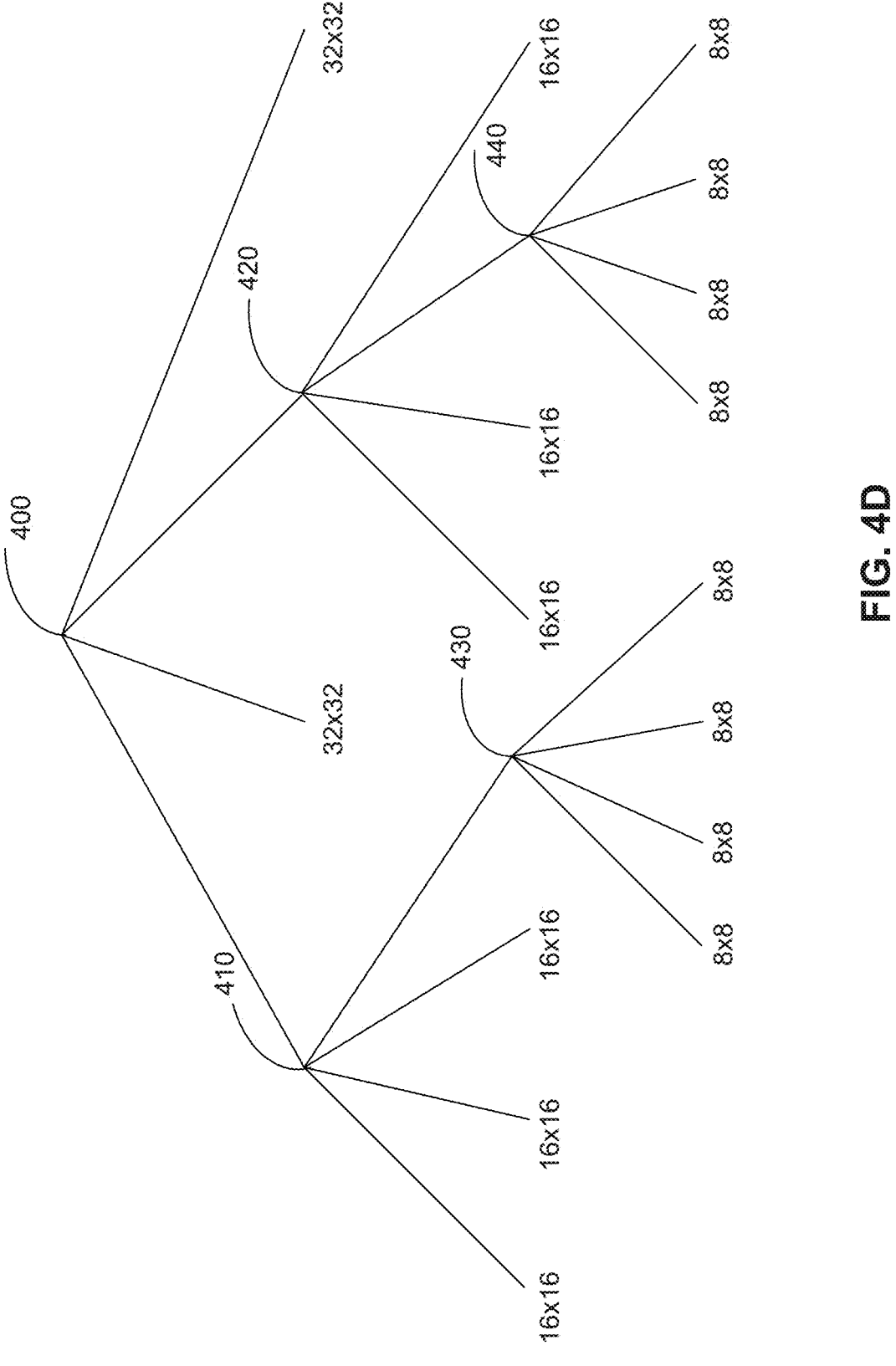
Figure 4E:
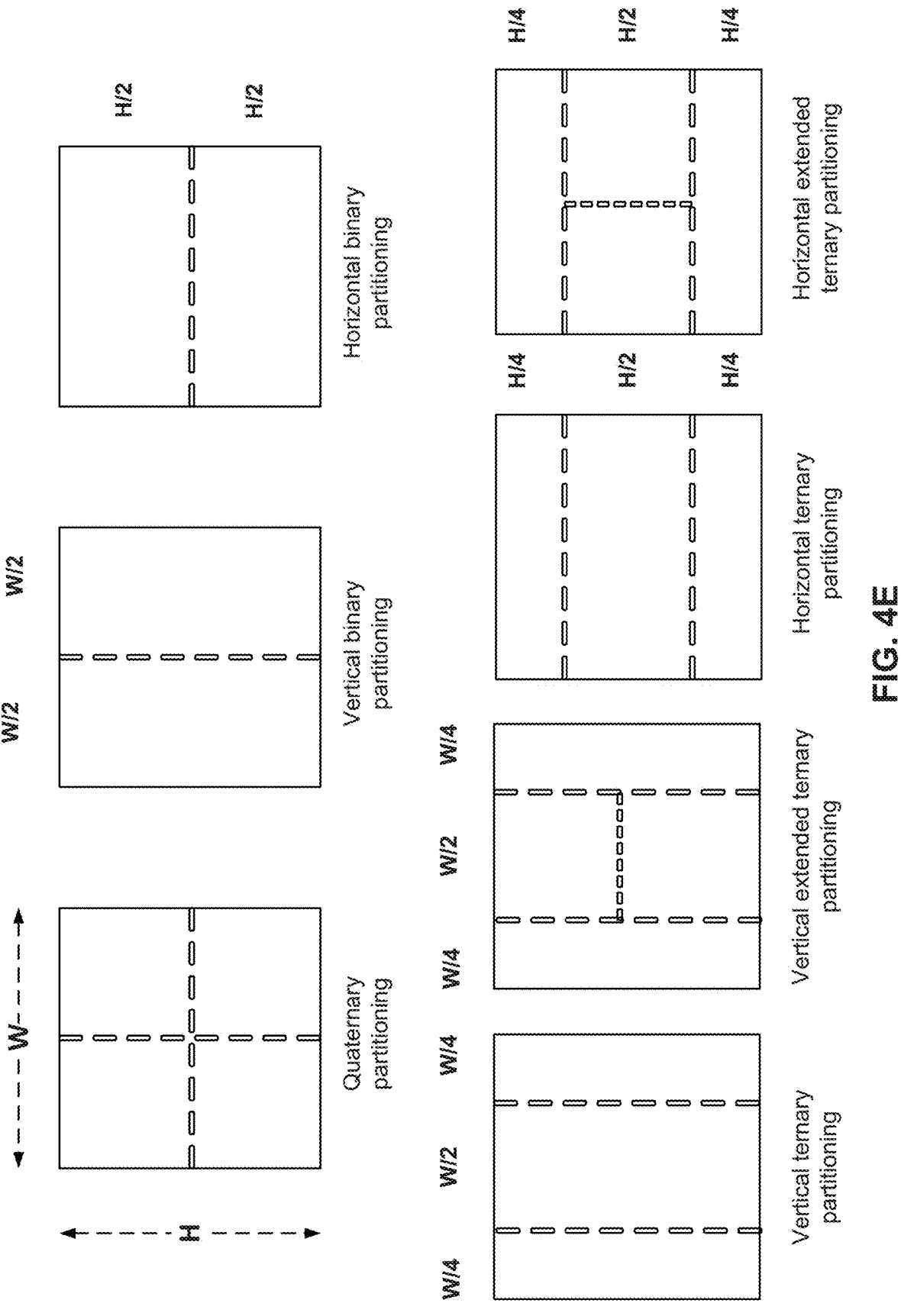

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may include a CB of luma samples and two corresponding coding blocks of chroma samples of a frame of the same size, and syntax elements used to code the samples of the coding blocks. In monochrome pictures or pictures having three separate colour planes, a CU may include a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are multiple possible partitioning types of a coding block having a width W and a height H, i.e., quaternary partitioning, vertical binary partitioning, horizontal binary partitioning, vertical ternary partitioning, vertical extended ternary partitioning, horizontal ternary partitioning, and horizontal extended ternary partitioning.

In some implementations, the video encoder 20 may further partition a coding block of a CU into one or more M×N PBs. A PB may include a rectangular (square or non-square) block of samples on which the same prediction, inter or intra, is applied. A PU of a CU may include a PB of luma samples, two corresponding PBs of chroma samples, and syntax elements used to predict the PBs. In monochrome pictures or pictures having three separate color planes, a PU may include a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block, and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block may include a rectangular (square or non-square) block of samples on which the same transform is applied. A TU of a CU may include a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may apply an entropy encoding technique to encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that form a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that intra block copy (IBC) could be regarded as either intra-frame prediction or a third mode. Between the two modes, inter-frame prediction contributes more to the coding efficiency than intra-frame prediction because of the use of motion vectors for predicting a current video block from a reference video block.

But with the ever-improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding an actual motion vector of the current CU into the video bitstream (e.g., the actual motion vector being determined by the motion estimation unit 42 as described above in connection with FIG. 2), the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream, and the amount of data used for representing motion information in the video bitstream can be significantly decreased.

Like the process of choosing a predictive block in a reference frame during inter-frame prediction of a code block, a set of rules can be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30, and an index of the selected motion vector predictor within the motion vector candidate list is sufficient for the video encoder 20 and the video decoder 30 to use the same motion vector predictor within the motion vector candidate list for encoding and decoding the current CU. Thus, only the index of the selected motion vector predictor needs to be sent from the video encoder 20 to the video decoder 30.

Figure 5:
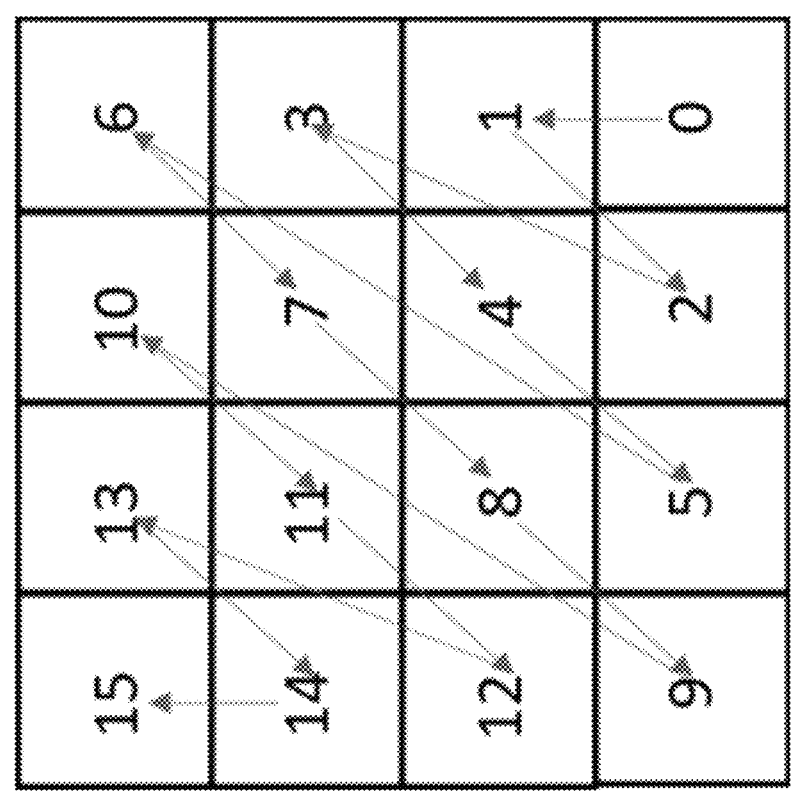
FIG. 5 is a graphical representation illustrating a top-left scan order of transform coefficients in a coefficient group in accordance with some examples.

A brief discussion with respect to transform coefficient coding in a block-based video coding process (e.g., in an Enhanced Compression Model (ECM)) is provided herein. Specifically, each transform block is firstly divided into multiple coefficient groups (CGs), with each coefficient group includes transform coefficients of a 4×4 subblock for the luma component and a 2×2 subblock for the chroma components. The coding of the transform coefficients in the transform block is performed in the units of coefficient groups. For example, the coefficient groups inside the transform block are scanned and coded based on a first predetermined scan order. When coding each coefficient group, the transform coefficients of the coefficient group are scanned based on a second predetermined scan order within each subblock. In the ECM, the same top-left scan order is applied to scan the coefficient groups inside the transform block and different transform coefficients in each coefficient group (e.g., both the first and second predetermined scan orders are the top-left scan order). FIG. 5 is a graphical representation illustrating the top-left scan order of transform coefficients in a coefficient group in accordance with some examples. The numbers 0-15 in FIG. 5 indicates the corresponding scan order of each transform coefficient in the coefficient group.

According to a transform coefficient coding scheme in the ECM, a flag is firstly signaled for each transform block to indicate whether the transform block includes any non-zero transform coefficients. In a case where there is at least a non-zero transform coefficient in the transform block, a position of the last non-zero transform coefficient scanned according to the top-left scan order is explicitly signaled from video encoder 20 to video decoder 30. With the position of the last non-zero transform coefficient being signaled, flags are further signaled for all the coefficient groups that are coded before the last coefficient group (i.e., the coefficient group including the last non-zero coefficient). Correspondingly, the number of flags indicate whether the respective coefficient groups include non-zero transform coefficients or not. If a flag of a coefficient group is equal to zero (indicating all the transform coefficients in the coefficient group are zeros), no further information needs to be sent for the coefficient group. Otherwise (e.g., the flag of the coefficient group is equal to one), an absolute value and a sign of each transform coefficient in the coefficient group are signaled in a bit stream according to the scan order. However, in existing designs, signs of the transform coefficients are bypass coded (e.g., no context model is applied), leading to inefficient transform coding in the current design. Consistent with the present disclosure, an improved LFNST process with sign prediction of the transform coefficients is described below in more detail, so that the transform coding efficiency can be improved.

Figure 6:
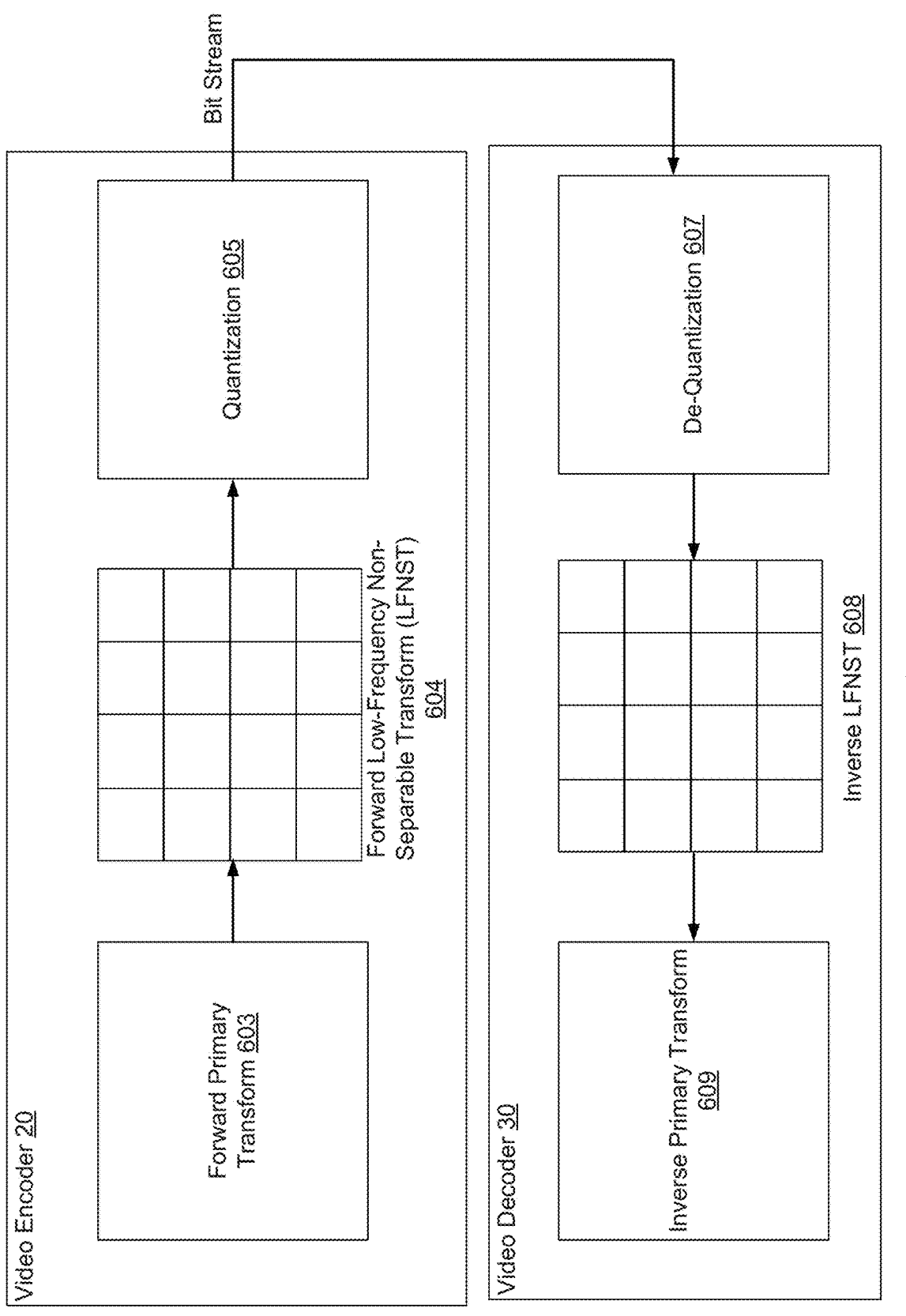
FIG. 6 is a graphical representation illustrating a low-frequency non-separable transform (LFNST) process in accordance with some examples.

FIG. 6 is a graphical representation illustrating an LFNST process in accordance with some examples. In the VVC, a secondary transform tool (e.g., an LFNST) is applied to compact the energy of transform coefficients of intra-coded blocks after a primary transform. As shown in FIG. 6, a forward LFNST 604 is applied between a forward primary transform 603 and a quantization 605 at video encoder 20, and an inverse LFNST 608 is applied between a de-quantization 607 and an inverse primary transform 609 at video decoder 30. For example, the LFNST process may include both forward LFNST 604 and inverse LFNST 608. As some examples, for a 4×4 forward LFNST 604, there may be 16 input coefficients; for an 8×8 forward LFNST 604, there may be 64 input coefficients; for a 4×4 inverse LFNST 608, there may be 8 input coefficients; and for an 8×8 inverse LFNST 608, there may be 16 input coefficients. In forward LFNST 604, non-separable transforms with a varying transform size are applied based on a size of a coding block, which can be depicted using a matrix multiplication process. For example, assume that forward LFNST 604 is applied to a 4×4 block. Samples in the 4×4 block can be expressed using a matrix X as shown in the following expression (1):

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}. \tag{1}$$

The matrix X can be serialized as a vector X as shown in the following expression (2):

$$\vec{X} = [X_{00} \; X_{01} \; X_{02} \; X_{03} \; X_{10} \; X_{11} \; X_{12} \; X_{13} \ldots X_{30} \; X_{31} \; X_{32} \; X_{33}]^T. \tag{2}$$

In the above expression (1) or (2), X denotes a coefficient matrix obtained through forward primary transform 603, and $X_{ij}$ denotes a primary transform coefficient in the matrix X. Then, forward LFNST 604 is applied as follows according to expression (3):

$$\vec{F} = T \cdot \vec{X}. \tag{3}$$

In the above expression (3), $\vec{F}$ denotes transform coefficients after forward LFNST 604, and T denotes a transform kernel (e.g., a transform matrix). In the above example, because X is a 4×4 matrix, T is a 16×16 matrix. The 16×1 vector $\vec{F}$ is subsequently re-organized as a 4×4 block (e.g., a coefficient matrix with a size of 4×4) according to a predetermined scan order. A first transform coefficient located before a second transform coefficient in the vector $\vec{F}$ may be associated with a smaller scanning index than the second transform coefficient in the 4×4 block.

In some implementations, a reduced non-separable transform kernel can be applied in the LFNST process. For example, based on the above expression (3), forward LFNST 604 is based on a direct matrix multiplication which is expensive in terms of computational operations and memory source to store transform coefficients. Therefore, a reduced non-separable transform kernel can be used in the LFNST design to reduce the implementation cost of the LFNST process, by mapping an N-dimension vector to a R-dimension vector in a different space, where R<N. For example, instead of using an N×N matrix for the transform kernel, a RxN matrix is used as the transform kernel in forward LFNST 604 as shown in expression (4):

$$T_{R \times N} = \begin{bmatrix} t_{0,0} & t_{0,1} & \cdots & t_{0,N-1} \\ t_{1,0} & t_{1,1} & \cdots & t_{1,N-1} \\ \vdots & \vdots & \ddots & t_{2,N-1} \\ t_{R-1,0} & t_{R-1,1} & \cdots & t_{R-1,N-1} \end{bmatrix}. \quad (4)$$

In the above expression (4), the R base vectors in $T_{R \times N}$ are generated by selecting the first R bases of the original N-dimension transform kernel (i.e., N×N). Additionally, given that $T_{R \times N}$ is orthogonal, an inverse transform matrix for inverse LFNST 608 is the transpose of the forward transform matrix $T_{R \times N}$.

For 8×8 LFNST, if a factor N/R=4 is applied, a 64×64 transform matrix is reduced to a 16×48 transform matrix for forward LFNST 604, and a 64×64 inverse transform matrix is reduced to a 48×16 inverse transform matrix for inverse LFNST 608. This is achieved by applying the LFNST process to an 8×8 subblock in the top-left region of primary transform coefficients. Specifically, when the 16×48 forward LFNST is applied, it takes 48 transform coefficients from three 4×4 subblocks in the top-left 8×8 subblock (excluding its right-bottom 4×4 subblock) as input. In some examples, the LFNST process is restricted to be applicable only if all transform coefficients outside the top-left 4×4 subblock are zeros, which indicates that when LFNST is applied, all primary-only transform coefficients have to be zeros. Furthermore, to control complexity in a worst case (in terms of multiplications per pixel), the LFNST matrix for 4×4 and 8×8 coding blocks are forced to 8×16 and 8×48 transforms, respectively. For 4×M and M×4 coding blocks (M>4), the non-separable transform matrix of the LFNST is 16×16.

In LFNST transform signaling, there are four transform sets in total, and two non-separable transform kernels per transform set are enabled in the LFNST design. A transform set is selected from the four transform sets according to an intra prediction mode of an intra block. The mapping from the intra prediction mode to the transform set is predetermined as shown in the following Table 1. If one of three Cross-Component Linear Model (CCLM) modes (e.g., INTRA_LT_CCLM, INTRA_T_CCLM, or INTRA_L_CCLM) is used for a current block (81<=predModeIntra<=83), a transform set "0" is selected for the current chroma block. For each transform set, the selected non-separable secondary transform candidate is indicated by signaling an LFNST index in a bit stream.

TABLE 1

| IntraPredMode | set |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

In some examples, because the LFNST is restricted to be applied to an intra block if all transform coefficients outside the first 16×16 subblock are zeros, the LFNST index signaling is dependent on the position of the last significant (i.e., non-zero) transform coefficient. For example, for 4×4 and 8×8 coding blocks, the LFNST index is only signaled when the position of the last significant transform coefficient is less than 8. For other coding block sizes, the LFNST index is only signaled when the position of the last significant transform coefficient is less than 16. Otherwise (i.e., the LFNST index is not signaled), the LFNST index is inferred to be zero, i.e., the LFNST is disabled.

Furthermore, to reduce a size of a buffer for caching transform coefficients, the LFNST is disallowed when either the width or the height of the current coding block is greater than the maximum transform size (i.e., 64) as signaled in a sequence parameter set (SPS). Meanwhile, the LFNST is only applied when the primary transform is DCT2. Besides, the LFNST is applied to intra coding blocks in both intra and inter slices and for both luma and chroma components. If a dual-tree or local-tree is enabled (where the partitions of luma and chroma components are misaligned), the LFNST indices are signaled separately for the luma and chroma components (i.e., luma and chroma components can apply different LFNST transforms). Otherwise, when a single-tree is applied (where the partitions of luma and chroma components are aligned), the LFSNT is only applied to the luma component with a single LFNST index being signaled.

Figure 7:
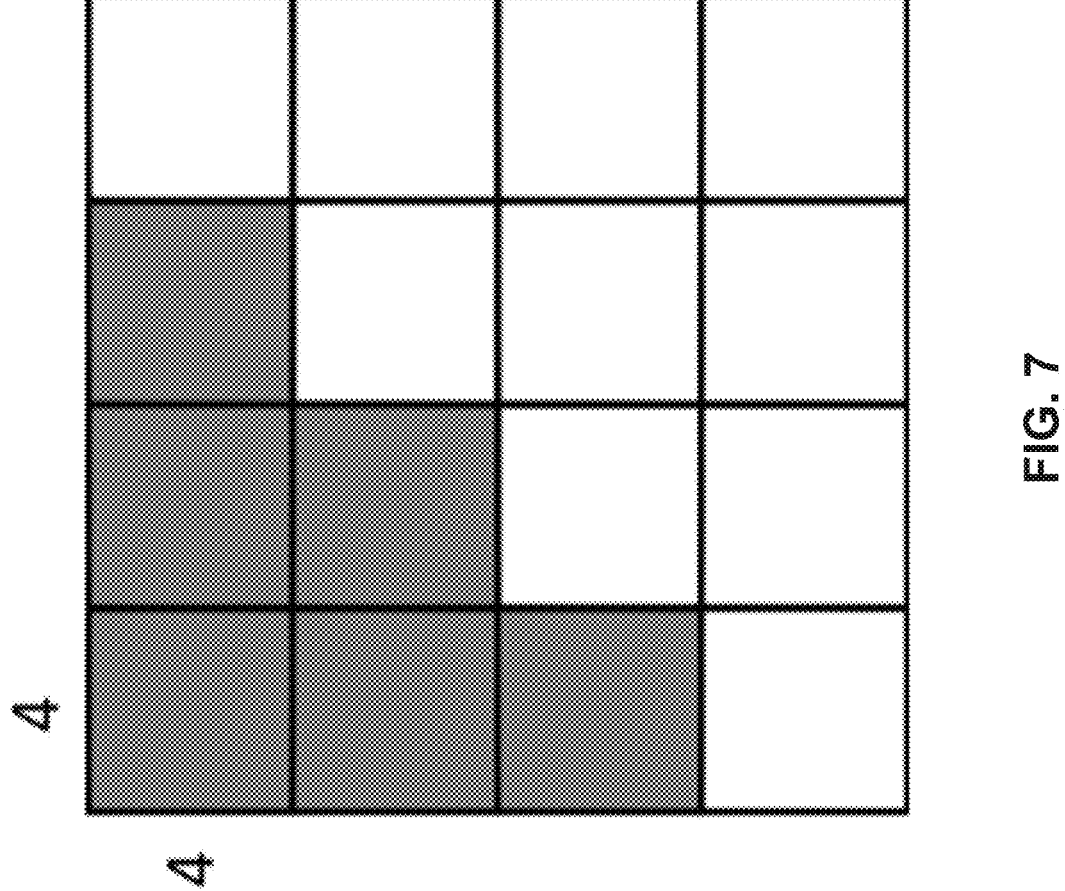
FIG. 7 is a graphical representation illustrating a top-left region of primary transform coefficients inputted to a forward LFNST in accordance with some examples.

The LFNST design in the ECM is like that in the VVC, except that additional LFNST kernels are introduced to provide better energy compaction of the residual samples of large block sizes. Specifically, when the width or height of the transform block is no smaller than 16, a new LFNST transform is introduced to the top-left region of the low-frequency transform coefficients generated from the primary transform. In the current ECM, as shown in FIG. 7, the low-frequency region includes six 4×4 subblocks in the top-left corner of the primary transform coefficients (e.g., six 4×4 subblocks shown with gray color in FIG. 7). In this case, the number of coefficient inputs to forward LFNST 604 is 96. Additionally, to control the worst-case computational complexity, the number of coefficient outputs of forward LFNST 604 is set to 32. Specifically, for WxH transform blocks where W>=16 and H>=16, a 32×96 forward LFNST is applied, which takes 96 transform coefficients from six 4×4 subblocks in the top-left region as input and outputs 32 transform coefficients. On the other side, the 8×8 LFNST in the ECM utilizes the transform coefficients in all four 4×4 subblocks as input and outputs 32 transform coefficients (i.e., a 32×64 matrix for forward LFNST 604 and a 64×32 matrix for inverse LFNST 608). This is different from the VVC where the 8×8 LFNST is only applied to the three 4×4 subblocks in the top left region and generates only 16 transform coefficients (i.e., a 16×48 matrix for forward LFNST 604 and a 48×16 matrix for inverse LFNST 608). Additionally, the total number of LFNST sets is increased from 4 in the VVC to 35 in ECM. Similar to the VVC, the selection of the LFNST set is dependent on the intra prediction mode of the current coding unit, and each LFNST set includes three different transform kernels.

In some examples, a multiple transform selection (MTS) scheme is applied for transforming residuals of both inter and intra coded blocks in addition to DCT2 transform used in HEVC. The MTS scheme uses multiple selected transforms from the DCT8 and DST7 transforms.

For example, two control flags are specified at a sequence level to enable the MTS scheme for intra and inter modes, separately. When the MTS scheme is enabled at the sequence level, another CU level flag is further signaled to indicate whether the MTS scheme is applied or not. In some implementations, the MTS scheme is only applied to the luma component. Furthermore, the MTS scheme is signaled only when the following conditions are satisfied: (a) both the width and height are smaller than or equal to 32; are (b) the Coded Block Flag (CBF) is equal to one. If the MTS CU flag is equal to zero, then DCT2 is applied in both horizontal and vertical directions. If the MTS CU flag is equal to one, then two other flags are additionally signaled to indicate the transform types for the horizontal and vertical directions, respectively. The mapping between the MTS horizontal and vertical control flags and the applied transforms is illustrated in the following Table 2.

TABLE 2

| MTS_CU_flag | MTS_Hor_flag | MTS_Ver_flag | Intra/inter | |
| | | | Horizontal | Vertical |
| --- | --- | --- | --- | --- |
| 0 | | | DCT2 | |
| 1 | 0 | 0 | DST7 | DST7 |
| 1 | 0 | 1 | DCT8 | DST7 |
| 1 | 1 | 0 | DST7 | DCT8 |
| 1 | 1 | 1 | DCT8 | DCT8 |

With respect to precision of a transform matrix, all the MTS transform coefficients are in 6-bit precision, which is the same as the DCT2 core transforms. Given that the VVC supports all the transform sizes used in the HEVC, all the transform cores used in the HEVC are kept to be the same as the VVC, including 4-point, 8-point, 16-point, and 32-point DCT-2 transforms and 4-point DST-7 transform. Meanwhile, other transform cores including 64-point DCT-2, 4-point DCT-8, 8-point, 16-point, 32-point DST-7 and DCT-8 are additionally supported in the VVC transform design. Furthermore, to reduce the complexity of the large size DST-7 and DCT-8, high frequency transform coefficients that are located outside the 16×16 low-frequency region are set to zeros (also known as zero-out) for DST-7 and DCT-8 transform blocks when either the width or height is equal to 32.

In the VVC, in addition to DCT2, only DST7 and DCT8 transform kernels are utilized for intra and inter coding. For intra coding, usually the statistical characteristics of the residual signal depend on the intra prediction mode. Additional primary transforms may be beneficial to handle the diversity of the residual characteristics.

Additional primary transforms including DCT5, DST4, DST1, and identity transform (IDT) are employed in the ECM. Also, the MTS set is made dependent on the TU size and intra mode information. 16 different TU sizes can be considered, and 5 different classes can be considered for each TU size depending on the intra-mode information. For each class, 4 different transform pairs are considered (the same as that of VVC). Although a total of 80 different classes may be considered, some of those different classes often share the same transform set. Thus, there are 58 (less than 80) unique entries in a resultant Lookup Table (LUT).

For angular modes, a joint symmetry over the TU shape and intra prediction is considered. Thus, a mode i (i>34) with a TU shape A×B may be mapped to the same class corresponding to the mode j-(68-i) with a TU shape B×A. However, for each transform pair, the orders of the horizontal and vertical transform kernels are swapped. For example, a 16×4 block with mode 18 (horizontal prediction) and a 4×16 block with mode 50 (vertical prediction) are mapped to the same class, with the vertical and horizontal transform kernels being swapped. For the wide-angle modes, the nearest conventional angular mode is used for the transform set determination. For example, mode 2 is used for all the modes between -2 and -14. Similarly, mode 66 is used for mode 67 to mode 80.

Figure 8:
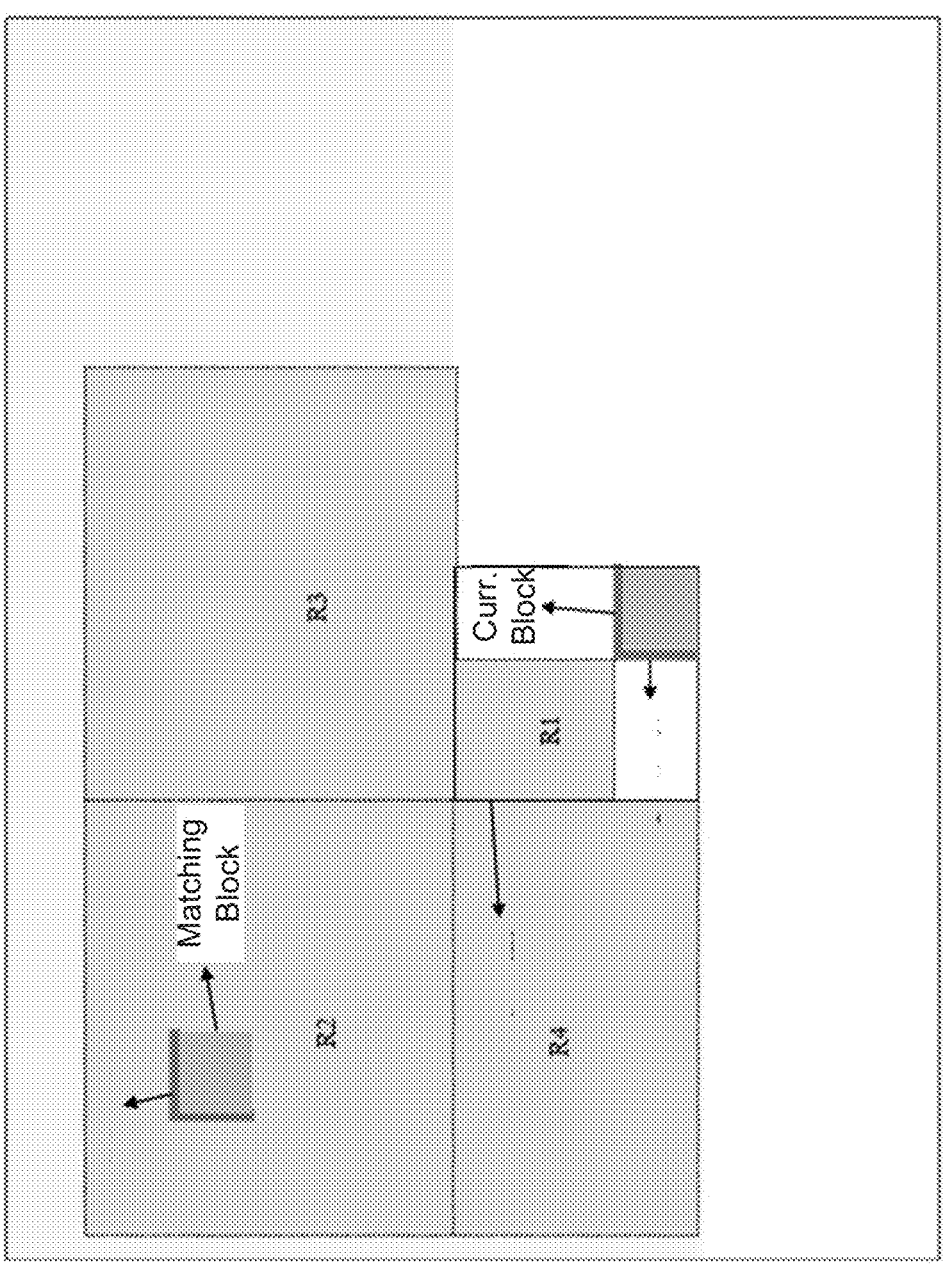
FIG. 8 is a graphical representation illustrating a search area of intra template matching in accordance with some examples.

Intra template matching prediction is an example of the intra prediction mode that copies a prediction block from a reconstructed part of a current frame, whose L-shaped template matches a current template. For a predetermined search range, video encoder 20 searches for the most similar template to the current template (e.g., based on an SAD cost) in a reconstructed part of the current frame, and uses the corresponding block as a prediction block. Video encoder 20 then signals the usage of this mode, and the same prediction operation is performed at a decoder side. A prediction signal is generated by matching an L-shaped causal neighbor of a current block with another block in a predetermined search area as shown in FIG. 8, which includes: (a) a current CTU (R1); (b) a top-left CTU (R2); (c) an above CTU (R3); and (d) a left CTU (R4). The intra template matching is enabled for CUs with a size less than or equal to 64 in width and height. Meanwhile, the intra template matching prediction mode is indicated by signaling a flag at a CU level. When the intra template matching is applied to a coding block with the width or height between 4 and 16 (inclusive), the primary transform that is applied to the corresponding dimension is set to DST-VII. Otherwise (i.e., the width or height is smaller than 4 or larger than 16), DCT-II is applied in the dimension.

Figure 9:
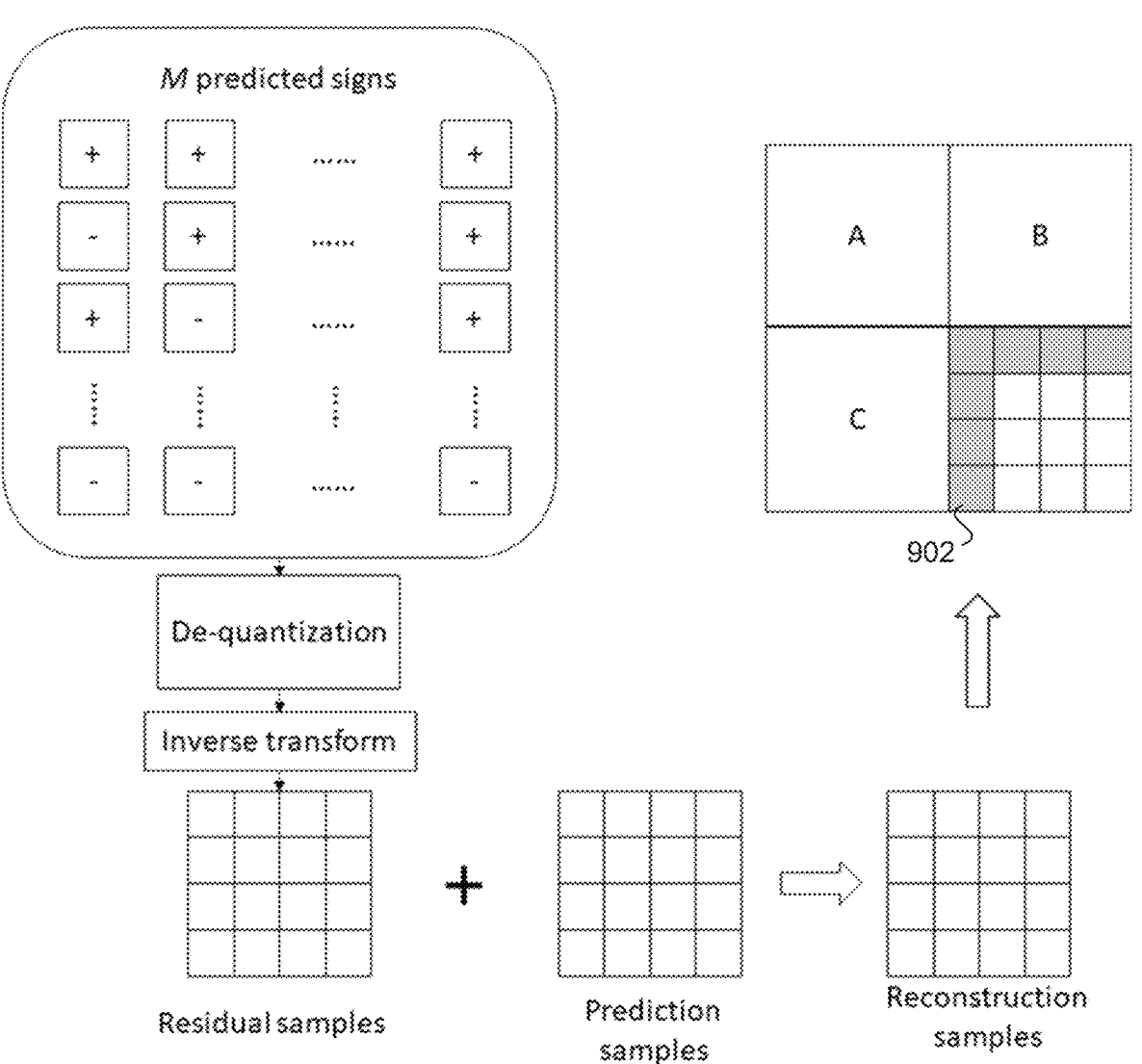
FIG. 9 is a graphical representation illustrating an exemplary process of sign prediction in accordance with some examples.

FIG. 9 is a graphical representation illustrating an exemplary process of sign prediction in accordance with some examples. In some implementations, sign prediction can be intended to estimate signs of transform coefficients in a transform block from samples of its neighboring block and to code the difference between each estimated sign and a corresponding true sign with "0" (or "1") to indicate that the estimated sign is the same (or not the same) as the true sign. In a case when the signs can be accurately estimated in a high percentage (e.g., 90% or 95% of the signs are estimated correctly), the difference between the estimated signs and the true signs tends to be 0, which can be efficiently entropy-coded by CABAC when compared to the bypass-coded signs for the transform coefficients in the VVC.

In general, there is a high correlation among samples at the boundaries between a current block and its neighboring blocks, which can be utilized by a sign prediction scheme to predict the signs of the transform coefficients of the current block. As shown in FIG. 9, assume that there are M non-zero transform coefficients in the current block (with M signs each being either + or -). Then, a total number of possible combinations of the signs is 2M. The sign prediction scheme generates a corresponding hypothesis (e.g., reconstructed samples at the top and left boundaries of the current block) using each combination of the signs, and compares the reconstructed samples in the corresponding hypothesis with extrapolated samples from neighboring blocks to obtain a sample difference (e.g., SSD or SAD) between the reconstructed samples and the extrapolated samples. A combination of the signs (among the 2 possible combinations of the signs) which minimizes the sample difference is selected as predicted signs in the current block.

In some implementations as shown in FIG. 9, in order to generate a corresponding hypothesis for each combination of the M signs, M corresponding transform coefficients can be processed by a de-quantization operation and an inverse transform to obtain residual samples. The residual samples can be added with the prediction samples to obtain reconstructed samples, which include the reconstructed samples at the top and left boundaries of the current block (shown in an L-shaped gray area 902).

In some implementations, a cost function which measures spatial discontinuity between the samples at the boundaries of the current block and its neighboring block is used for the selection of the combination of the signs. Instead of using the L2 norm (SSD), the cost function can be based on the L1 norm (SAD) as shown below in expression (5):

$$costHV = \sum_{n=0}^{N-1} |2B_{-1,n} - B_{-2,n} - P_{0,n}| + \sum_{m=0}^{M-1} |2C_{m,-1} - C_{m,-2} - P_{m,0}|. \tag{5}$$

In the above expression (5), Bin (with i=−2, −1) represents neighboring samples of the current block from its top neighboring block. $C_{m,j}$ (with j=−2, −1) represents neighboring samples of the current block from its left neighboring block. $P_{o,n}$ and $P_{m,o}$ represent corresponding reconstructed samples on the top and left boundaries of the current block, respectively. N and M represent a width and a height of the current block, respectively. FIG. 10 shows the corresponding samples $P_{o,n}$ and $P_{m,o}$ of the current block and the corresponding samples $B_{i,n}$ and $C_{m,j}$ of the neighboring blocks that are used to calculate the cost function for the sign prediction.

In some implementations, a template-based hypothesis reconstruction method can be applied in the sign prediction scheme to avoid the complexity of conducting multiple inverse transforms. Each template can be a set of reconstructed samples on the top and left boundaries of the current block, and can be acquired by applying the inverse transform to a coefficient matrix where a specific coefficient is set to one while all the other coefficients are equal to zeros. Given that the inverse transforms (e.g., DCT, DST) are linear, the corresponding hypothesis can be generated by a linear combination of a set of pre-calculated templates.

In some implementations, the predicted signs are classified into two sets and each set is coded by a single CABAC context. For example, a first set includes the predicted signs of the transform coefficients at the top-left corner of a transform block, and a second set includes the predicted signs of the transform coefficients at all the other locations of the transform block.

Like HEVC, scalar quantization is used in the VVC. In some implementations, the scalar quantization in the VVC may be is implemented as a dependent scalar quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization used in the HEVC, the admissible reconstruction vectors are packed more densely in the N-dimensional vector space (N represents the number of transform coefficients in a transform block). That means, for a given average number of admissible reconstruction vectors per N-dimensional unit volume, the average distortion between an input vector and its closest reconstruction vector is reduced.

Figure 11:
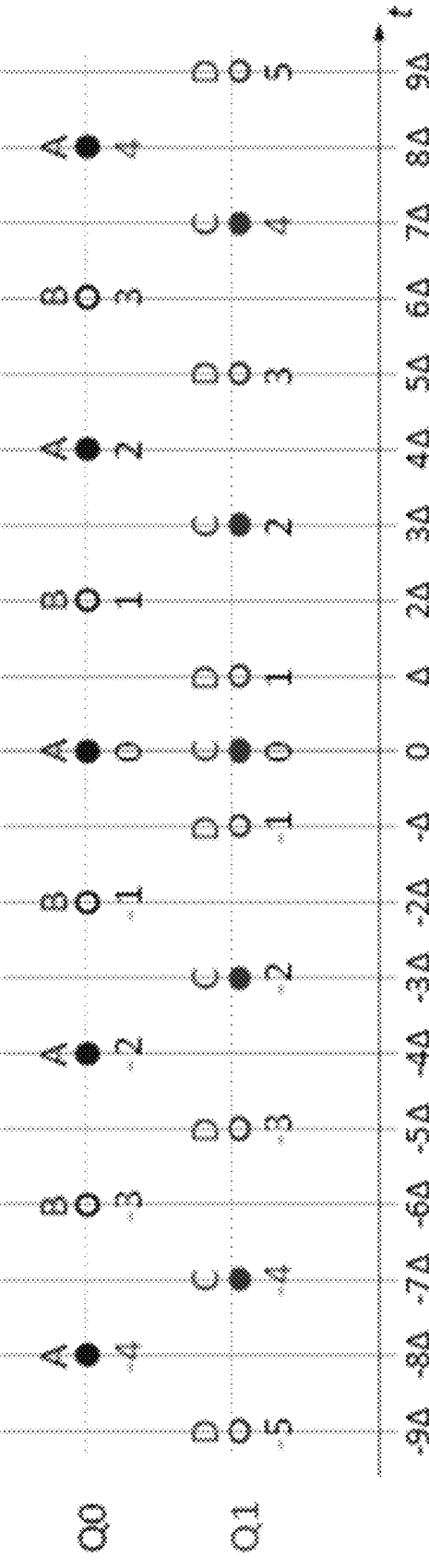
FIG. 11 is a graphical representation illustrating two exemplary scalar quantizers used in a dependent scalar quantization in accordance with some examples.

The dependent scalar quantization can be implemented by: (a) defining two scalar quantizers with different reconstruction levels and (b) defining a process for switching between the two scalar quantizers. FIG. 11 illustrates two exemplary scalar quantizers used in a dependent scalar quantization of the VVC in accordance with some implementations of the present disclosure. As shown in FIG. 11, the two scalar quantizers, denoted by Q0 and Q1, are applied in the quantization design of the VVC. The location of the available reconstruction levels is uniquely specified by a quantization step size Δ. In this implementation, the selection between the two scalar quantizers Q0 and Q1 is not explicitly signalled in bitstream. Instead, the quantizer used for a current transform coefficient is determined by the parities of the transform coefficient levels that precede the current transform coefficient in coding order by video encoder 20 or in reconstruction order by video decoder 30.

Figure 12B:
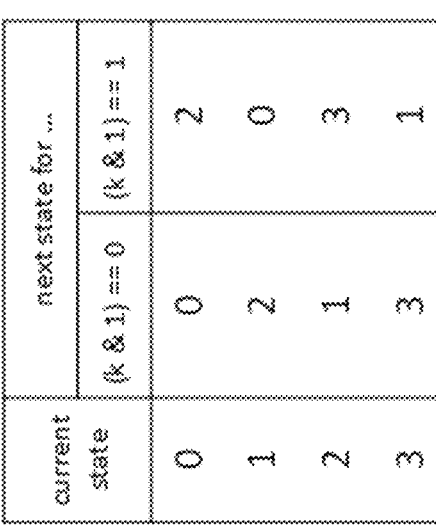
FIG. 12B is a table showing an exemplary quantizer selection according to the state transition of FIG. 12A in accordance with some examples.
Figure 12A:
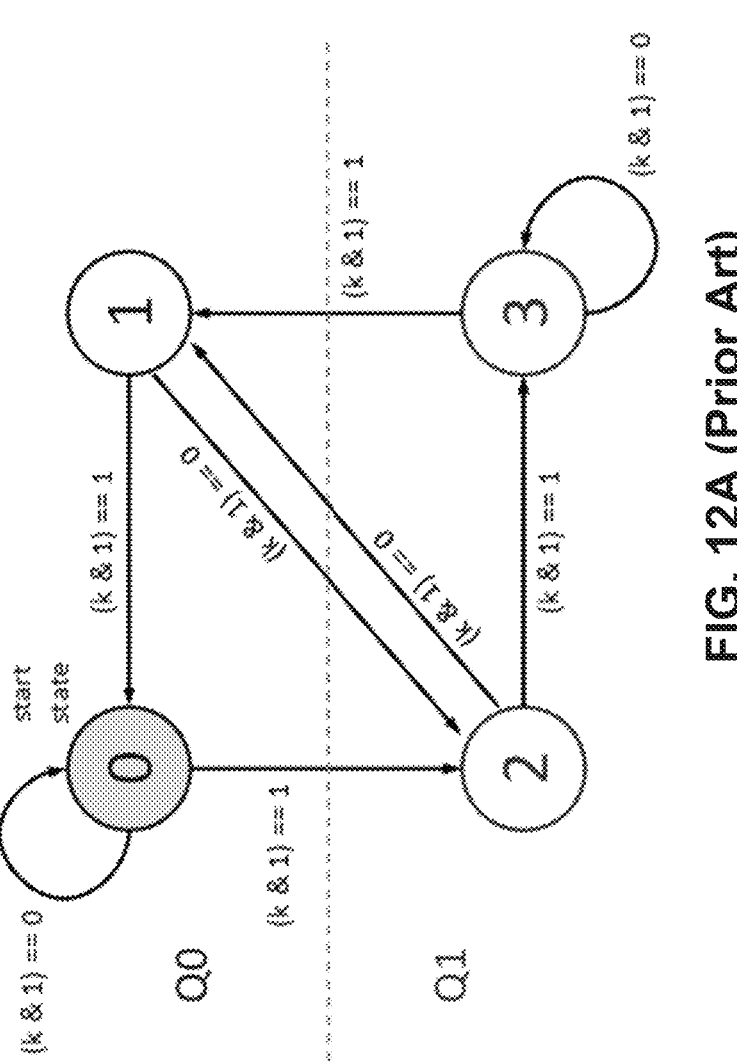
FIG. 12A is a graphical representation illustrating state transition using a state machine with four states used in a dependent scalar quantization in accordance with some examples.

In some implementations, the switching between the two scalar quantizers is done via a state machine. For example, FIG. 12A is a graphical representation illustrating state transition using a state machine with four states used in a dependent scalar quantization in accordance with some examples. As illustrated in FIG. 12, the states can take four different values of 0, 1, 2, 3. It is uniquely determined by the parities of the transform coefficient levels preceding the current transform coefficient in coding/reconstruction order.

In some implementations, at the start of the inverse quantization for a transform block, the state is set equal to 0. The transform coefficients are reconstructed in a scanning order (i.e., in the same order they are entropy decoded).

After a current transform coefficient is reconstructed, the state is updated according to the state machine. For example, in FIG. 12A, k denotes the value of the transform level. At each state, the next state is determined based on the parity of the transform coefficient level k, i.e., (k & 1). The next state when (k & 1)==1 is different from the next state when (k & 1)==0. As shown in FIG. 12A, the state machine includes two arrows pointing to two different states from each of the four states. FIG. 12B is a table showing an exemplary quantizer selection according to the state transition of FIG. 12A in accordance with some examples. For example, according to FIG. 12A and FIG. 12B, at state 1, the next state will be 2 if (k & 1)==0 and 0 if (k & 1)==1.

Correspondingly, at the decoder, a reconstructed quantization index of one transform coefficient can calculated according to expression (6):

$$quantIdx = (abs(k) \ll 1) - (state \ \& \ 1). \tag{6}$$

where abs( ) is the function of calculating the absolute value of the input and state is the current state of the state transition machine when parsing the level of the current transform coefficient. Further, on the decoder side, the reconstructed transform coefficient after de-quantization can be obtained according to expression (7):

$$transCoeff = quantIdx \cdot \Delta. \qquad (7)$$

Several exemplary deficiencies that exist in a current design of the sign prediction scheme are identified herein. In a first example, the sign prediction in the current ECM is only applicable to the prediction of signs for transform coefficients in transform blocks where only primary transforms (e.g., DCT and DST transforms) are applied. As mentioned above, the LFNST can be applied to transform coefficients from a primary transform to provide better energy compaction of residual samples of intra-coded blocks. However, the sign prediction is bypassed for transform blocks to which the LFNST is applied in the current ECM design.

In a second example, a predetermined maximum number of predicted signs (denoted as "$L_{max}$") is determined for a transform block to control the complexity of the sign prediction. In the current ECM, a video encoder determines the value of the maximum number (e.g., $L_{max}$=8) based on tradeoff between the complexity and the coding efficiency, and sends the value to a video decoder. Moreover, for each transform block, the video encoder or decoder may scan all the transform coefficients in a raster-scan order and the first $L_{max}$ non-zero transform coefficients are selected as candidate transform coefficients for the sign prediction. Such equal treatment of the different transform coefficients in the transform block may not be optimal in terms of the accuracy of the sign prediction. For example, for transform coefficients with relatively large magnitudes, the prediction of their signs may have a better chance to achieve a correct prediction. This is because using incorrect signs for those transform coefficients tends to produce greater impacts on reconstructed samples on the block boundaries than that produced by using transform coefficients with relatively small magnitudes.

In a third example, instead of directly coding the explicit sign values, the video encoder or decoder can code the correctness of the predicted signs. For instance, for a transform coefficient which has a positive sign, if its predicted sign is also positive, only a bin "0" needs to be indicated in a bit stream from the video encoder to the video decoder. In this case, the predicted sign is the same as the true sign (or the original sign) of the transform coefficient, indicating that the sign prediction for this transform coefficient is correct. Otherwise (e.g., if the predicted sign is negative whereas the true sign is positive), a bin "1" may be included in the bit stream from the video encoder to the video decoder. If all the signs are predicted correctly, the corresponding bins indicated in the bit stream are zeros, which can be efficiently entropy-coded by CABAC. If some of the signs are predicted incorrectly, the corresponding bins indicated in the bit stream are ones. Although an arithmetic coding plus appropriate context model can be efficient to code the bins according to their corresponding probabilities, there are still non-negligible bits generated in the bit stream for the indication of the sign values.

In a fourth example, spatial discontinuity between samples at the boundaries between a current block and its neighboring block is used for the selection of the best sign prediction combination in the current design of sign prediction in ECM. An L1 norm of a gradient difference along a vertical direction and a horizontal direction are utilized to capture the spatial discontinuity. However, since the distribution of image signals is usually non-uniform, using only the vertical and horizontal directions may fail to capture the spatial discontinuity accurately.

Consistent with the present disclosure, a video processing method and system for sign prediction in block-based video coding are provided herein to address one or more of the above exemplary deficiencies. The method and system disclosed herein can improve the coding efficiency of the sign prediction while taking friendliness of hardware codec implementations into considerations. The method and system disclosed herein can improve the coding efficiency of transform blocks which apply the sign prediction technology to transform coefficients of the blocks.

For example, as mentioned above, the sign prediction may predict signs of transform coefficients in a transform block based on a correlation among boundary samples (also referred to as border samples) located at the boundaries or close to the boundaries of the transform block and its spatial neighboring blocks. Given that an existence of the correlation is independent on which specific transform is applied, two coding tools (i.e., the LFNST and the sign prediction) do not interfere with each other and can be applied jointly. Additionally, because the LFNST further compacts the energy of transform coefficients of a primary transform, the sign prediction for transform coefficients of the LFNST can be more accurate than that for the primary transform. This is because an incorrect sign prediction of a transform coefficient from the LFNST can yield more discrepancy on the smoothness of the boundary samples. Thus, consistent with the present disclosure, a harmonization scheme is disclosed herein to enable a combination of the LFNST and the sign prediction to enhance the coding efficiency of the transform coefficient coding. Furthermore, a template-based hypothesis generation scheme is also disclosed herein to reconstruct border samples for different combinations of predicted signs in order to reduce the number of inverse transforms.

In another example, instead of giving equal treatment to different transform coefficients in a transform block for the selection of candidate transform coefficients for the sign prediction as described above, higher weights may be given to transform coefficients which can lead to discrepancy between the boundary samples of neighboring blocks, given that the signs of those transform coefficients are more easily predicted. Consistent with the present disclosure, the method and system disclosed herein can select candidate transform coefficients for the sign prediction (e.g., transform coefficients whose signs are to be predicted for a transform block) based on one or more selection criteria to improve the accuracy of the sign prediction. For example, transform coefficients which have more impacts on the reconstructed border samples (rather than transform coefficients which have less impacts on the reconstructed border samples) are selected as candidate transform coefficients for the sign prediction, so that the accuracy of the sign prediction can be improved.

In yet another example, when signs of transform coefficients in a transform block are predicted with a high accuracy rate (e.g., correctness of the predicted signs is higher than a threshold such as 80% or 90%), a strong correlation exists between the boundary samples of the transform block and its neighboring blocks. In this case, it commonly occurs that there may be consecutive transform coefficients (e.g., especially for a few of non-zero transform coefficients at the beginning of the transform block) which can be correctly predicted for most scenarios. In such scenarios, a single bin (instead of multiple bins) can be used to indicate whether the signs of all the consecutive transform coefficients are correctly predicted or not to save a signaling overhead of the sign prediction. Consistent with the present disclosure, a vector-based sign prediction scheme is disclosed herein to reduce the signaling overhead of the sign prediction. Different from an existing sign prediction which predicts a sign of each non-zero transform coefficient separately, the disclosed vector-based sign prediction scheme groups a set of consecutive non-zero candidate transform coefficients and predict their corresponding signs together such that an average number of bins (or bits) used to indicate the correctness of the predicted signs can be efficiently reduced.

In still yet another example, using only the vertical and horizontal directions may fail to capture the spatial discontinuity between samples at the boundaries between the current block and its neighboring block accurately. Thus, more directions may be introduced to capture the spatial discontinuity more accurately. Consistent with the present disclosure, an improved cost function is disclosed herein which considers both the gradients of the vertical and horizontal directions and the gradients of diagonal directions to capture the spatial discontinuity more accurately.

Figure 13:
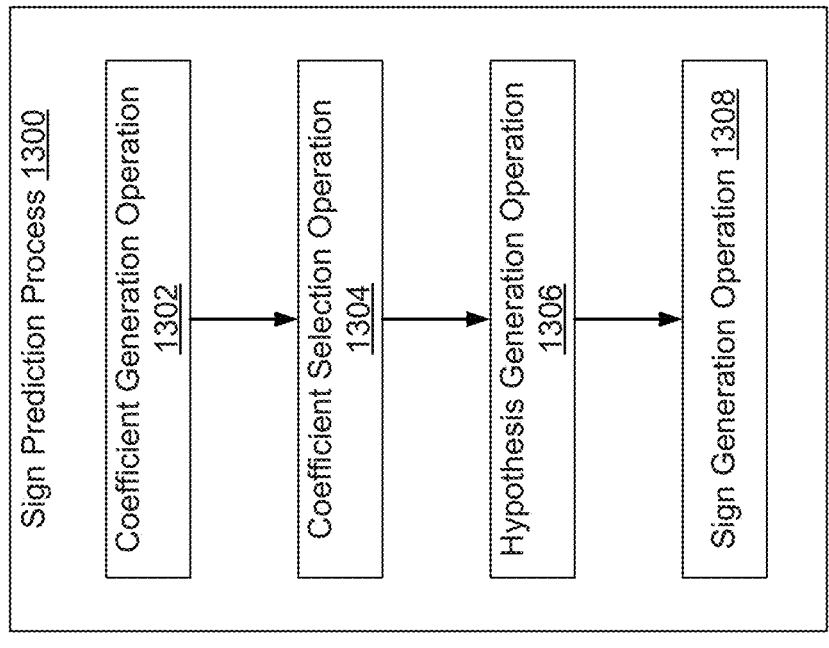
FIG. 13 is a block diagram illustrating an exemplary sign prediction process in block-based video coding in accordance with some implementations of the present disclosure.

FIG. 13 is a block diagram illustrating an exemplary sign prediction process 1100 in block-based video coding in accordance with some implementations of the present disclosure. In some implementations, sign prediction process 1300 may be performed by transform processing unit 52. In some implementations, sign prediction process 1300 may be performed by one or more processors (e.g., one or more video processors) of video encoder 20 or decoder 30. Throughout the present disclosure, the LFNST is used as an example of the secondary transform without loss of generality. It is contemplated that other examples of the secondary transform can also be applied herein.

In an existing design of ECM, sign prediction is disabled for a transform block to which the LFNST is applied. However, the principle of the sign prediction is to predict signs of transform coefficients based on the correlation between border samples of the transform block and its spatial neighboring blocks, which does not depend on specific transform types (e.g., whether it is a primary transform or secondary transform) or transform cores (e.g., whether it is DCT or DST) applied to the transform block. Therefore, the sign prediction and the LFNST can be applied together to further improve the efficiency of the transform coding herein. Consistent with the present disclosure, sign prediction process 1300 can be applied to predict signs of transform coefficients in the transform block where a primary transform and a secondary transform are applied jointly.

An exemplary overview of sign prediction process 1300 is provided herein. Initially, sign prediction process 1300 may perform a coefficient generation operation 1302 by applying a primary transform and a secondary transform to a transform block of a video frame from a video to generate transform coefficients for the transform block. Next, sign prediction process 1300 may perform a coefficient selection operation 1304 by selecting a set of candidate transform coefficients from the transform coefficients for the sign prediction. Subsequently, sign prediction process 1300 may perform a hypothesis generation operation 1306 by applying a template-based hypothesis generation scheme to select a hypothesis from a plurality of candidate hypotheses for the set of candidate transform coefficients. Additionally, sign prediction process 1300 may perform a sign generation operation 1108 by determining a combination of sign candidates associated with the selected hypothesis to be a set of predicted signs for the set of candidate transform coefficients. Operations 1302, 1304, 1306, and 1308 are respectively described below in more detail.

For example, transform processing unit 52 of video encoder 20 may transform residual video data into transform coefficients of a transform block by applying the primary transform and the secondary transform jointly (e.g., as shown in FIG. 6 where forward primary transform 603 and forward LFNST 604 are applied together). A predetermined number (e.g., L) of non-zero transform coefficients from the transform coefficients of the transform block can be selected as candidate transform coefficients based on one or more selection criteria as described below, with $1 \leq L \leq$ a maximum number of signs that can be predicted. Next, by applying a template-based hypothesis generation scheme, a plurality of candidate hypotheses can be generated using different combinations of sign candidates for the L candidate transform coefficients, respectively, which may result in a total of 21 candidate hypotheses. Each candidate hypothesis may include reconstructed samples on the top and left boundaries of the transform block. Then, a cost can be calculated for each candidate hypothesis reconstruction using a cost function that incorporates a combined gradient along horizontal, vertical, and diagonal directions. A candidate hypothesis associated with a minimal cost from the plurality of candidate hypotheses can be determined as a hypothesis for predicting the signs of the L candidate transform coefficients. For example, a combination of sign candidates used to generate the candidate hypothesis associated with the minimal cost is used as the predicted signs for the L candidate transform coefficients.

To begin with, sign prediction process 1300 may perform coefficient generation operation 1302, in which the primary transform (e.g., DCT, DST, etc.) and the secondary transform (e.g., LFNST) may be applied to a transform block jointly to generate transform coefficients for the transform block. For example, the primary transform may be applied to the transform block to generate primary transform coefficients for the transform block. Then, the LFNST may be applied to the transform block to generate LFNST transform coefficients based on the primary transform coefficients.

Sign prediction process 1300 may continue to perform coefficient selection operation 1304, in which a set of candidate transform coefficients for the sign prediction can be selected from the transform coefficients of the transform block based on one or more selection criteria. Through the selection of the candidate transform coefficients, the number of the candidate transform coefficients that can be correctly predicted can be maximized, and the accuracy of the sign prediction can be improved.

In some implementations, the set of candidate transform coefficients can be selected from the transform coefficients of the transform block based on magnitudes of the transform coefficients. For example, the set of candidate transform coefficients can include one or more transform coefficients that have larger magnitudes than remaining transform coefficients in the transform block.

In general, for transform coefficients with larger magnitudes, predicted signs of these transform coefficients are more likely to be correct. This is because these transform coefficients with larger magnitudes tend to have more impacts on the quality of the reconstructed samples, and using incorrect signs for these transform coefficients may be more likely to generate discontinuities between the boundary samples of the transform block and its spatial neighboring blocks. Based on this rationale, the set of candidate transform coefficients for the sign prediction can be selected from the transform coefficients of the transform block based on magnitudes of the non-zero transform coefficients in the transform block.

There could be multiple ways to implement the transform coefficient magnitude based reordering scheme for sign prediction. In a first implementation, the scheme can directly use the transform coefficients that are reconstructed after the de-quantization (i.e., dequantized transform coefficients) to the sorting such that the dequantized transform coefficients with larger magnitudes will be placed ahead the ones with smaller magnitudes for the sign prediction. For example, all the non-zero transform coefficients in the transform block can be scanned and sorted to form a coefficient list according to the descending order of their magnitudes. A transform coefficient with the largest magnitude can be selected from the coefficient list and placed as a first candidate transform coefficient in the set of candidate transform coefficients, a transform coefficient with the second largest magnitude can be selected from the coefficient list and placed as a second candidate transform coefficient in the set of candidate transform coefficients, so on and so forth until the number of the selected candidate transform coefficients reaches the predetermined number L.

In a second implementation, instead of directly using the dequantized transform coefficients, the quantization index (e.g., quantIdx as obtained according to expression (6)) of each transform coefficient can be used to represent the magnitude of the transform coefficient and used for such sorting. As shown in expression (7), because the value of one dequantized transform coefficient is equal to the production of its quantization index quantIdx and the corresponding step size $\Delta$ and the step size is the same for the dequantization of all the transform coefficients in one transform block, the two implementations are actually mathematically identical. However, given that the quantization index quantIdx can be obtained at the parsing stage (which is earlier than the acquisition of the dequantized transform coefficients), the second implementation may be provide certain benefits when implemented by some specific hardware.

In some implementations, the set of candidate transform coefficients can be selected from the transform coefficients of the transform block based on a coefficient scan order of entropy coding applied in the video coding. Since natural video content may have abundant low-frequency information, magnitudes of non-zero transform coefficients obtained from the processing of the video content tend to be larger at low frequency positions and smaller towards high frequency positions. Thus, a coefficient scan order (such as a zig-zag scan, a top-left scan, a horizontal scan, or a vertical scan, etc.) can be used in modern video codecs to scan the transform coefficients in the transform block for entropy coding. By using this coefficient scan order, transform coefficients with larger magnitudes (usually corresponding to lower frequencies) are scanned before transform coefficients with smaller magnitudes (usually corresponding to higher frequencies). Based on this rationale, the set of candidate transform coefficients for the sign prediction disclosed herein can be selected from the transform coefficients of the transform block based on the coefficient scan order for entropy coding. For example, a coefficient list can be obtained by scanning all the transform coefficients in the transform block using the coefficient scan order. Then, the first L non-zero transform coefficients in the coefficient list can be automatically selected as the set of candidate transform coefficients for the sign prediction.

In some implementations, for an intra coded block, the set of candidate transform coefficients for the sign prediction can be selected from the transform coefficients of the block based on an intra prediction direction of the block. For example, multiple scan orders coherent with the intra prediction directions (e.g., the 67 intra prediction directions in the VVC and ECM) can be determined and stored as look-up-tables at both video encoder 20 and video decoder 30. When coding transform coefficients of an intra block, video encoder 20 or video decoder 30 may identify a scan order from the scan orders that is closest to an intra prediction of the intra block. Video encoder 20 or video decoder 30 may use the identified scan order to scan all the non-zero transform coefficients of the intra block to obtain a coefficient list, and select the first L non-zero transform coefficients from the coefficient list as the set of candidates transform coefficients.

In some implementations, video encoder 20 may determine a scan order for the transform coefficients of the transform block and signal the determined scan order to video decoder 30. One or more new syntax elements which indicate the determined scan order can be signaled through the bit stream. For example, multiple fixed scan orders (e.g., for different transform block sizes and coding modes) can be predetermined by video encoder 20 and pre-shared with video decoder 30. Then, after selecting a scan order from the fixed scan orders, video encoder 20 only needs to signal a single index to indicate the selected scan order to video decoder 30. In another example, the one or more new syntax elements may be used to enable the signaling of any selected scan order of the transform coefficients. In some implementations, the one or more syntax elements can be signaled at various coding levels, e.g., a sequence parameter set (SPS), a picture parameter set (PPS), a picture (or slice) level, a CTU (or CU) level, etc.

In some implementations, the set of candidate transform coefficients can be selected from the transform coefficients of the transform block based on influence scores of the transform coefficients on reconstructed border samples of the transform block. Specifically, as shown in the above expression (5), the selection of the combination of the signs (i.e., predicted signs, or sign predictors) are based on a cost function to minimize the discontinuity of the gradients of the samples between the current transform block and its spatial neighboring blocks. Therefore, signs of transform coefficients with relatively large influence on the reconstructed samples on the top and left borders of the current transform block tend to be more likely to be accurately predicted, because the flipping of these signs may result in large variations on the smoothness between the boundary samples as calculated in (5). To maximize a percentage of accurate sign predictions, the signs of these transform coefficients (i.e., the ones with more impacts on reconstructed border samples) may be predicted before the other transform coefficients (i.e., the ones with less impacts on the reconstructed border samples). Based on this rationale, the set of candidate transform coefficients for the sign prediction disclosed herein can be selected based on their influence scores on the reconstructed samples on the top and left borders of the current transform block.

For example, video encoder 20 or decoder 30 may sort all the transform coefficients based on the measurement of their corresponding influence scores to the reconstructed border samples of the transform block. If a transform coefficient has a larger influence score to the reconstructed border samples, it may be assigned with a smaller index in a sign prediction candidate list because it is easier to be correctly predicted. The set of candidate transform coefficients disclosed herein can be L transform coefficients with the L smallest indices in the sign prediction candidate list.

In some implementations, different criteria may be applied to quantify an influence score of a transform coefficient on the reconstructed border samples. For example, a value which measures the energy of variations on the reconstructed border samples caused by the transform coefficient can be used as the influence score, which can be obtained as follows (in the L1 norm):

$$V = |C_{i,j}| \cdot \left( \sum_{n=0}^{N-1} |T_{i,j}(0, n)| + \sum_{m=0}^{M-1} |T_{i,j}(m, 0)| \right). \quad (8)$$

In the above expression (8), $C_{i,j}$ represents a transform coefficient at a position (i, j) in the transform block. $T_{i,j}(l, k)$ represents a corresponding border sample at a position (l,k) of a template that is associated with the transform coefficient $C_{i,j}$. N and M represent a width and a height of the transform block, respectively. V represents an influence score of the transform coefficient at the position (i, j).

In another example, the L1 norm in the above expression (8) can be replaced by the L2 norm, so that the influence score (e.g., the measurement on the energy of the variations on the reconstructed border samples caused by the transform coefficient) can be calculated using the L2 norm as follows:

$$V = |C_{i,j}| \cdot \left( \sum_{n=0}^{N-1} |T_{i,j}(0, n)|^2 + \sum_{m=0}^{M-1} |T_{i,j}(m, 0)|^2 \right). \quad (9)$$

Consistent with the present disclosure, although only top and left boundary samples (e.g., as indicated by $T_{i,j}(0, n)$ and $T_{i,j}(m, 0)$) are used for the calculation in the above expressions (8) and (9), the transform coefficient selection scheme disclosed herein can also be applied to any sign prediction scheme by changing the reconstructed samples of the current transform block that are used in a corresponding cost function.

Similar to the transform coefficient magnitude base scheme, there could be different ways to implement the influence scores based scheme. In a first implementation, the schemes can directly use the magnitudes of the dequantized transform coefficients $C_{i,j}$, as shown in expressions (8) and (9). In a second implementation, the quantization index values quantIdx can be applied instead to replace the dequantized transform coefficients $C_{i,j}$ to calculate the corresponding cost measurement. Specifically, when quantization index values quantIdx are applied, expressions (8) and (9) become expressions (10) and (11) below:

$$M = |quantIdx_{i,j}| \cdot \left( \sum_{n=0}^{N-1} |T_{i,j}(0, n)| + \sum_{m=0}^{M-1} |T_{i,j}(m, 0)| \right) \quad (10)$$

$$M = |quantIdx_{i,j}| \cdot \left( \sum_{n=0}^{N-1} |T_{i,j}(0, n)|^2 + \sum_{m=0}^{M-1} |T_{i,j}(m, 0)|^2 \right) \quad (11)$$

where $quantIdx_{i,j}$ represents the quantization index of the transform coefficient at position (i, j) in the transform block.

Because the value of one dequantized transform coefficient is equal to the production of its quantization index quantIdx and the corresponding step size $\Delta$ and the step size is the same for the dequantization of all the transform coefficients in one transform block, the two methods are actually mathematically identical.

Sign prediction process 1300 may continue to perform hypothesis generation operation 1106, in which a template-based hypothesis generation scheme can be applied to select a hypothesis for the set of candidate transform coefficients from a plurality of candidate hypotheses. Initially, a plurality of combinations of sign candidates can be determined for the set of candidate transform coefficients based on a total number of coefficients included in the set of candidate transform coefficients. For example, if there are L candidate transform coefficients in total, then the plurality of combinations of sign candidates for the set of candidate transform coefficients can be $2^L$ combinations of sign candidates. Each sign candidate can be either a negative sign (−) or a positive sign (+). Each combination of sign candidates may include a total of L negative or positive signs. For example, if L=2, then the plurality of combinations of sign candidates may include $2^2$=4 combinations of sign candidates, which are (+, +), (+, −), (−, −), and (−, −), respectively.

Next, a template-based hypothesis generation scheme can be applied to generate the plurality of candidate hypotheses for the plurality of combinations of sign candidates, respectively. To reduce the complexity of inverse primary and secondary transforms that need to be performed, the template-based hypothesis generation scheme disclosed herein can be used to optimize the generation of reconstructed border samples of the transform block. Two exemplary approaches for implementing the template-based hypothesis generation scheme are disclosed herein. It is contemplated that other exemplary approaches for implementing the template-based hypothesis generation scheme are possible, which is not limited herein.

In a first exemplary approach, a corresponding candidate hypothesis for each combination of sign candidates can be generated based on a linear combination of templates, so that a plurality of candidate hypotheses can be generated for the plurality of combinations of sign candidates, respectively. Each template may correspond to a candidate transform coefficient from the set of candidate transform coefficients. Each template may represent a group of reconstructed samples on the top and left boundaries of the transform block. Each template can be generated by applying an inverse secondary transform and an inverse primary transform to the transform block, where each of the set of candidate transform coefficients is set to zero except the candidate transform coefficient corresponding to the template which is set to one (e.g., the candidate transform coefficient corresponding to the template is set to be 1, whereas each of the remaining candidate transform coefficients is set to be 0).

Figure 14:
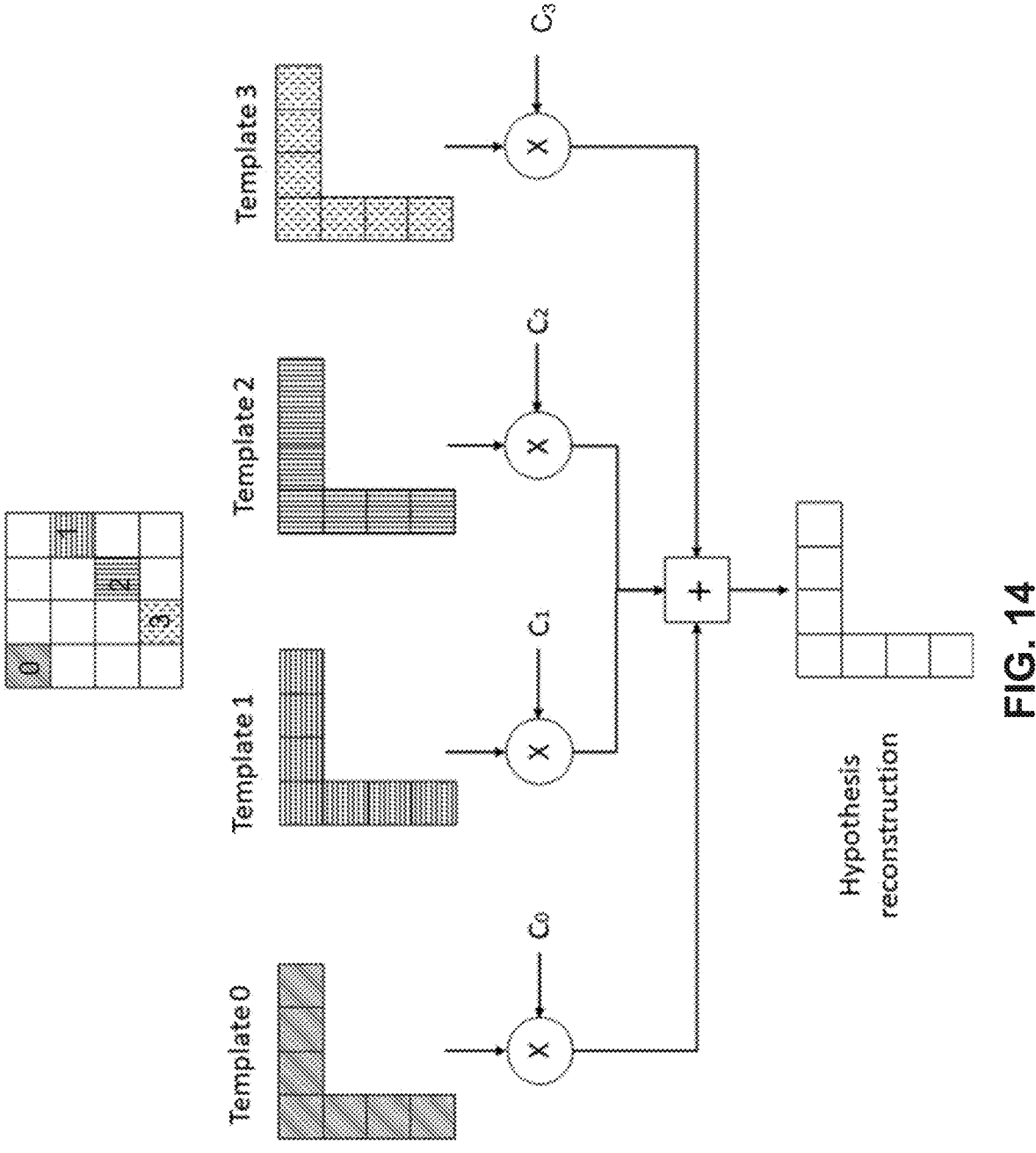
FIG. 14 is a graphical representation illustrating exemplary hypothesis generation based on a linear combination of templates in accordance with some implementations of the present disclosure.

For example, the corresponding candidate hypothesis for each combination of sign candidates can be set to be a linear combination of templates. For a template that corresponds to a respective candidate transform coefficient, a respective weight for the template can be set to be a magnitude of a dequantized transform coefficient corresponding to the respective candidate transform coefficient. An example of the hypothesis generation based on a linear combination of templates is illustrated in FIG. 14, which is described below in more detail.

To predict the signs of the candidate transform coefficients, video encoder 20 or decoder 30 may go through all the candidate hypotheses before identifying a hypothesis associated with a combination of sign candidates which can minimize a cost value calculated from a cost function. In the first exemplary approach described above, each candidate hypothesis can be generated based on a combination of multiple templates, which is relatively complicate when considering the per-sample calculations (e.g., additions, multiplications, and shifts) involved in such combination. In order to reduce the computation complexity associated with the identification of the hypothesis that minimizes the cost value calculated from the cost function, a second exemplary approach is introduced herein.

In the second exemplary approach, the plurality of combinations of sign candidates associated with the plurality of candidate hypotheses can be treated as a plurality of hypothesis indices for the plurality of candidate hypotheses, respectively. For example, digitals 0 and 1 can be configured to represent the positive sign (+) and the negative sign (−), respectively. A combination of sign candidates corresponding to a candidate hypothesis can be used as a unique representation (i.e., a hypothesis index) for the candidate hypothesis. For instance, assume that there are three signs to be predicted (e.g., L=3). A hypothesis index 000 may represent a candidate hypothesis which is generated by setting all three sign candidates to be positive (e.g., the three sign candidates being (+, +, +)). Similarly, a hypothesis index 010 may represent a candidate hypothesis which is generated by setting the first sign candidate and the third sign candidate to be positive while setting the second sign candidate to be negative (e.g., the three sign candidates being (+, −, +)).

Then, the plurality of candidate hypotheses can be generated based on a Gary code order of the plurality of hypothesis indices, such that reconstructed samples of a previous candidate hypothesis with a previous hypothesis index can be used to generate a current candidate hypothesis with a current hypothesis index. The current hypothesis index of the current candidate hypothesis can be immediately after the previous hypothesis index of the previous candidate hypothesis in the Gary code order of the plurality of hypothesis indices. The current hypothesis index can be generated by changing a sign candidate associated with the previous hypothesis index from positive (or negative) to negative (or positive). For example, the current hypothesis index can be obtained by changing a single "0" (or "1") in the previous hypothesis index to "1" (or "0").

For example, the plurality of hypothesis indices can be reordered based on the Gary code order of the plurality of hypothesis indices to generate a reordered sequence of hypothesis indices. For a first hypothesis index in the reordered sequence of hypothesis indices, a first candidate hypothesis corresponding to the first hypothesis index can be generated by applying an inverse secondary transform and an inverse primary transform to the transform block where each of the set of candidate transform coefficients is set to one. For a second hypothesis index in the reordered sequence of hypothesis indices that is immediately after the first hypothesis index, a second candidate hypothesis corresponding to the second hypothesis index can be generated based on (a) the first candidate hypothesis corresponding to the first hypothesis index and (b) an adjusting term for the second candidate hypothesis. The following Table 3 illustrates an exemplary process of generating all the candidate hypotheses for LFNST when the number of the candidate transform coefficients is 3 (e.g., L=3).

TABLE 3

| Sign Candidates | Hypothesis Index | Candidate Hypothesis | Hypothesis generation |
|---|---|---|---|
| (+, +, +) | 000 | H000 | Applying inverse transform to the |

TABLE 3-continued

| Sign Candidates | Hypothesis Index | Candidate Hypothesis | Hypothesis generation |
|---|---|---|---|
| | | | coefficient matrix where all the sign candidates are set to be positive. |
| (+, +, −) | 001 | H001 | $H000 - C_2 * T001$ |
| (+, −, −) | 011 | H011 | $H001 - C_1 * T010$ |
| (+, −, +) | 010 | H010 | $H011 + C_2 * T001$ |
| (−, −, +) | 110 | H110 | $H010 - C_0 * T100$ |
| (−, −, −) | 111 | H111 | $H110 - C_2 * T001$ |
| (−, +, −) | 101 | H101 | $H111 + C_1 * T010$ |
| (−, +, +) | 100 | H100 | $H101 - C_2 * T001$ |

In the above Table 3, a first column illustrates 23-8 combinations of sign candidates, respectively. A second column illustrates hypothesis indices corresponding to the combinations of sign candidates, respectively, by using digitals 0 and 1 to represent the positive sign (+) and the negative sign (−), respectively. The hypothesis indices in the second column are ordered according to the order of the Gary codes (e.g., in the order of 000, 001, 011, 010, 110, 111, 101, 100). A third column illustrates candidate hypotheses corresponding to the combinations of sign candidates and the hypothesis indices, respectively. A fourth column illustrates calculations of the candidate hypotheses, respectively.

In Table 3, TXYZ in the fourth column represents a corresponding template (i.e., reconstructed samples on the top and left boundaries of the transform block), which can be generated by applying an inverse transform to a coefficient matrix of the transform block where a specific transform coefficient is set to one while all the other transform coefficients are equal to zeros. For example, T100 represents a corresponding template which is generated by applying an inverse transform to the coefficient matrix where only the transform coefficient corresponding to the first sign candidate is set to one while all the transform coefficients in the coefficient matrix are set to zeros. $C_0$, $C_1$, and $C_2$ represent absolutes of dequantized transform coefficients that are associated with the first, second, and third sign candidates, respectively.

Referring to Table 3, for a first hypothesis index 000, a first candidate hypothesis H000 be generated by applying an inverse secondary transform and an inverse primary transform to a coefficient matrix associated with the transform block where each of the candidate transform coefficients is set to one. For a second hypothesis index 001 that is immediately after the first hypothesis index 000, a second candidate hypothesis H001 can be generated based on (a) the first candidate hypothesis H000 and (b) an adjusting term for the second candidate hypothesis (e.g., $-C_2*T001$). Similarly, for a third hypothesis index 011 that is immediately after the second hypothesis index 001, a third candidate hypothesis H011 can be generated based on (a) the second candidate hypothesis H001 and (b) an adjusting term for the third candidate hypothesis (e.g., $-C_1*T010$). For a fourth hypothesis index 010 that is immediately after the third hypothesis index 011, a fourth candidate hypothesis H010 can be generated based on (a) the third candidate hypothesis H011 and (b) an adjusting term for the fourth candidate hypothesis (e.g., $C_2*T001$).

Subsequently, a hypothesis associated with a minimal cost can be determined from the plurality of candidate hypotheses based on a cost function that incorporates a combined gradient along horizontal, vertical, and diagonal directions. As described above, if the cost function only utilizes a gradient of the horizontal and vertical directions (e.g., as shown above in the expression (5)), it may not work well for highly non-uniform image signals. Consistent with the present disclosure, a gradient along one or more diagonal directions is also utilized to improve the accuracy of the cost function. For example, two diagonal directions including a left diagonal direction and a right diagonal direction can also be incorporated into the cost function. For example, cost functions for the two diagonal directions can be described according to the following expressions (12) and (13):

$$costD1 = \tag{12}$$

$$\sum_{n=0}^{N-1} |2B_{-1,n-1} - B_{-2,n-2} - P_{0,n}| + \sum_{m=0}^{M-1} |2C_{m-1,-1} - C_{m-2,-2} - P_{m,0}|$$

$$costD2 = \tag{13}$$

$$\sum_{n=0}^{N-1} |2B_{-1,n+1} - B_{-2,n+2} - P_{0,n}| + \sum_{m=0}^{M-1} |2C_{m+1,-1} - C_{m+2,-2} - P_{m,0}|.$$

In the above expression (12) or (13), $B_{-1,n-1}$, $B_{-2,n-2}$, $B_{-1,n+1}$, and $B_{-2,n+2}$ represent neighboring samples of the transform block from its top neighboring block. $C_{m-1,-1}$, $C_{m-2,-2}$, $C_{m+1,-1}$, and $C_{m+2,-2}$ represent neighboring samples of the transform block from its left neighboring block. $P_{0,n}$ and $P_{m,0}$ represent reconstructed samples on the top and left boundaries of the transform block, respectively. N and M represent a width and a height of the transform block, respectively. costD1 and costD2 represent a left-diagonal cost function and a right-diagonal cost function for the left diagonal direction and the right diagonal direction, respectively.

The two cost functions of the diagonal directions (e.g., costD1 and costD2) can be used jointly with that of a horizontal-and-vertical cost function (e.g., costHV shown in the above expression (5)). Then, the cost function for the sign prediction can be determined based on the horizontal-and-vertical cost function that incorporates a gradient along the horizontal and vertical directions, the left-diagonal cost function that incorporates a gradient along a left diagonal direction, and the right-diagonal cost function that incorporates a gradient along a right diagonal direction. For example, the cost function may be a weighted sum of the horizontal-and-vertical cost function, the left-diagonal cost function, and the right-diagonal cost function as described in expression (14):

$$cost = costHV + \omega(costD1 + costD2). \tag{14}$$

In the above expression (14), w denotes a weight for the left-diagonal cost function and the right-diagonal cost function.

In another example, the cost function may be a minimum of the horizontal-and-vertical cost function, the left-diagonal cost function, and the right-diagonal cost function as described in expression (15):

$$cost = \min\{costHV, costD1, costD2\}. \tag{15}$$

Compared with the expression (5) shown above, the cost function in the expression (14) or (15) disclosed herein may need more neighboring pixels to support the cost functions costD1, costD2 along the diagonal directions, which is described below in more detail with reference to FIGS. 16A-16B.

In some implementations, a corresponding cost for each candidate hypothesis may be determined using the above expression (14) or (15). Then, a plurality of costs can be calculated for the plurality of candidate hypotheses, respectively. A minimal cost among the plurality of costs can be determined. A candidate hypothesis associated with the minimal cost can be determined from the plurality of candidate hypotheses and selected to be a hypothesis for the sign prediction.

Sign prediction process 1300 may continue to perform sign generation operation 1108, in which a combination of sign candidates associated with the selected hypothesis is determined to be a set of predicted signs for the set of candidate transform coefficients. For example, a combination of sign candidates (e.g., L sign candidates) used to generate the selected hypothesis can be used as the predicted signs for the L candidate transform coefficients.

In some implementations, sign generation operation 1308 may also include applying a vector-based sign prediction scheme to the set of predicted signs to generate a sequence of sign signaling bits for the set of candidate transform coefficients. A bit stream including the sequence of sign signaling bits may be generated by video encoder 20 and stored in storage device 32 of FIG. 1. Alternatively or additionally, the bit stream may be transmitted to video decoder 30 through link 16 of FIG. 1.

As described above, when signs of transform coefficients in a transform block are well predicted, it is very likely that signs of multiple consecutive transform coefficients can be correctly predicted. In this case, since a signaling scheme in existing sign prediction designs needs to signal multiple bins of "0" to separately indicate that a corresponding sign of each transform coefficient can be correctly predicted, it is obviously inefficient in terms of an overhead for signaling sign values of the transform block. An exemplary implementation of an existing sign prediction scheme is described below in more detail with reference to FIG. 15A.

Consistent with the present disclosure, the efficiency of sign signaling can be improved by applying the vector-based sign prediction scheme disclosed herein. Specifically, the candidate transform coefficients for the transform block can be divided into multiple groups and signs of candidate transform coefficients in each group can be predicted together. In this case, when original signs (or true signs) of candidate transform coefficients in a group are the same as their predicted signs respectively, only a bin with a value of "0" needs to be sent in a bit stream to indicate that all the signs in the group are correctly predicted. Otherwise (i.e., there is at least a candidate transform coefficient in the group whose original sign is different from the predicted sign), a bin with a value of "1" may be firstly signaled in the bit stream to indicate that not all the signs for the candidate transform coefficients in the group are correctly predicted. Then, additional bins may also be signaled in the bit stream from video encoder 20 to video decoder 30 to inform the corresponding correctness of each predicted sign in the group separately. An exemplary implementation of the vector-based sign prediction scheme disclosed herein is described below in more detail with reference to FIG. 15B.

In some implementations, the set of candidate transform coefficients can be divided into a plurality of groups of candidate transform coefficients. For each group of candidate transform coefficients, one or more sign signaling bits may be generated for the group of candidate transform coefficients based on whether original signs of the group of candidate transform coefficients are identical to predicted signs of the group of candidate transform coefficients. Responsive to the original signs of the group of candidate transform coefficients being identical to the predicted signs of the group of candidate transform coefficients, a bin with a value of zero ("0") may be generated and added as a sign signaling bit to the bit stream. For example, the bit stream may include a "0" to indicate that the predicted signs of the group of candidate transform coefficients are correctly predicted.

On the other hand, responsive to the original signs of the group of candidate transform coefficients being not identical to the predicted signs of the group of candidate transform coefficients, a bin with a value of one ("1") may be generated. A set of additional bins for informing corresponding correctness of the predicted signs of the group of candidate transform coefficients may also be generated. Then, the bin with the value of one and the set of additional bins can be added as sign signaling bits to the bit stream. For example, the set of additional bins can be an XOR result of the original signs and the predicted signs of the group of candidate transform coefficients. An additional bin with a value of "0" may indicate that a predicted sign of a candidate transform coefficient corresponding to the additional bin is correctly predicted, whereas an additional bin with a value of "1" may indicate that a predicted sign of a candidate transform coefficient corresponding to the additional bin is incorrectly predicted. The bit stream may include: (a) a "1" to indicate that the predicted signs of the group of candidate transform coefficients are not correctly predicted; and (b) the set of additional bins to indicate which predicted signs are correctly predicted and which predicted signs are incorrectly predicted.

In some implementations, a size of each group of candidate transform coefficients can be adaptively changed based on one or more predetermined criteria. The one or more predetermined criteria may include a width or height of the transform block, a coding mode of the transform block (e.g., intra or inter coding), and the number of non-zero transform coefficients within the transform block, etc. In some implementations, the size of each group of candidate transform coefficients can be signaled in the bit stream at various coding levels such as SPS, PPS, a slice or picture level, a CTU or CU level, or a transform block level.

In some implementations, one or more constraints may be applied to limit the application scenarios of the vector-based sign prediction scheme disclosed herein. For example, the vector-based sign prediction scheme disclosed herein can be applied to process signs for a first part of the transform coefficients in the transform block, whereas signs of a second part of the transform coefficients in the transform block can be processed using an existing sign prediction scheme. In a further example, the vector-based sign prediction scheme disclosed herein can be applicable to the first N (e.g., N=2, 3, 4, 5, 6, 7, or 8, etc.) non-zero candidate transform coefficients from the transform block, whereas signs of other candidate transform coefficients form the transform block can be processed using an existing sign prediction scheme shown in FIG. 15A, which will be described later in this disclosure.

Consistent with the present disclosure, sign prediction process 1100 disclosed herein may be disabled under some scenarios. For example, when the LFNST is applied to coding blocks that are coded by intra template matching mode, the primary transform can be DST-VII. Given that LFNST core transforms in ECM are mainly trained when the primary transform is DCT-II, the corresponding LFNST transform coefficients of intra template matching blocks may show different characteristics when compared to that of other LFNST blocks. Based on this rationale, sign prediction process 1300 may be disabled when a current coding block is an intra template matching block and is coded using the LFNST.

Consistent with the present disclosure, a maximum number of the predicted signs for LFNST blocks and a maximum number of the predicted signs for non-LFNST blocks may be different to control the computation complexity of the sign prediction. For example, the maximum number of the predicted signs for LFNST blocks may be set to be 6 (or 4), whereas the maximum number of the predicted signs for non-LFNST blocks may have a value different from 6 (or 4). Additionally, different values of the maximum number of predicted signs may be applied for video blocks that apply the LFNST and not apply the LFNST. In some implementations, video encoder 20 may determine the maximum number of the predicted signs for the LFNST blocks based on corresponding complexity or performance preference of the encoder, and may signal the maximum number to video decoder 30. When the maximum number of the predicted signs for the LFNST blocks is signaled to video decoder 30, it may be signaled at various coding levels, e.g., a sequence parameter set (SPS), a picture parameter set (PPS), a picture or slice level, or a CTU or CU level. In some implementations, video encoder 20 may determine different values of the maximum number of predicted signs for video blocks that apply the LFNST and not apply the LFNST and signal the values of the maximum number from video encoder 20 to video decoder 30.

Consistent with the present disclosure, given that the transform coefficients of both primary and secondary transforms are fixed, video encoder 20 or video decoder 30 may pre-calculate templates (e.g., samples of the templates) for different transform block sizes and different combinations of primary and secondary transform combinations. Video encoder 20 or video decoder 30 may store the templates (e.g., the samples of the templates) in an internal or external memory to avoid the complexity of producing the samples of the templates on-the-fly for optimized implementations. The samples of the templates may be stored with different fractional precisions to achieve different tradeoffs between a storage size and a sample precision. For example, video encoder 20 or video decoder 30 may scale floating samples of the templates with a fixed factor (e.g., 64, 128, or 256) and round the scaled samples to their nearest integers. The rounded samples may be stored in the memory. Then, when a template is used to reconstruct a candidate hypothesis, its corresponding samples may be firstly de-scaled to the original precision to ensure that generated samples in the candidate hypothesis are in a correct dynamic range.

FIG. 14 is a graphical representation illustrating exemplary hypothesis generation based on a linear combination of templates in accordance with some implementations of the present disclosure. In FIG. 14, four patterned blocks 0-3 represent candidate transform coefficients whose signs are to be predicted. Factors $C_0$, $C_1$, $C_2$, and $C_3$ represent corresponding values of dequantized transform coefficients of the four candidate transform coefficients. Templates 0-3 may correspond to the four candidate transform coefficients 0-3, respectively. For example, template 0 which corresponds to the candidate transform coefficient 0 can be generated by applying an inverse secondary transform and an inverse primary transform to the transform block, where the candidate transform coefficient 0 is set to be one, and the remaining candidate transform coefficients in the transform block are set to be zero. Similarly, templates 1-3 can be generated respectively. A candidate hypothesis can be generated by adding templates 0-1 together with weights $C_0$-$C_3$, respectively.

Figure 15A:
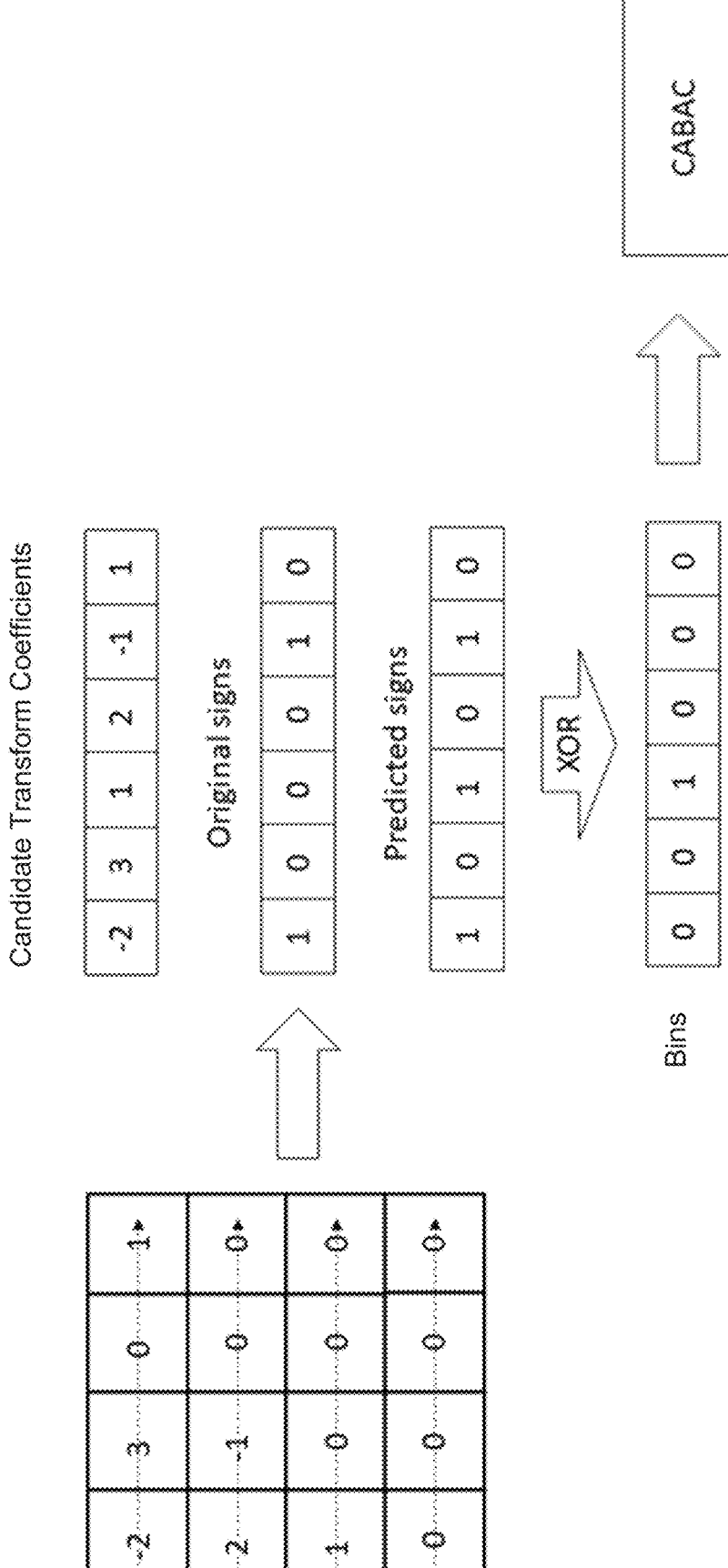
FIG. 15A is a graphical representation illustrating an exemplary implementation of an existing sign prediction scheme in accordance with some examples.
Figure 15B:
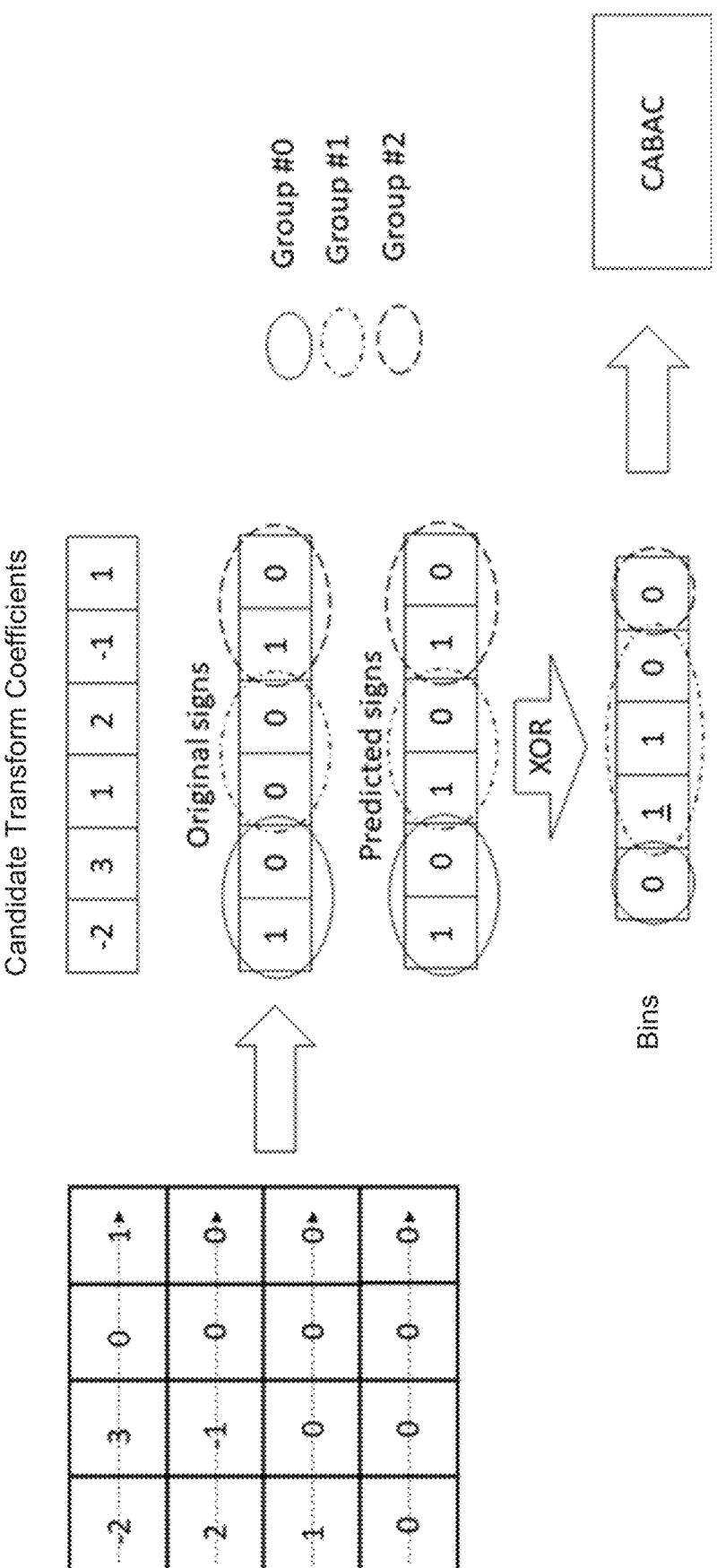
FIG. 15B is a graphical representation illustrating an exemplary implementation of a vector-based sign prediction scheme in accordance with some implementations of the present disclosure.

FIG. 15A is a graphical representation illustrating an exemplary implementation of an existing sign prediction scheme in accordance with some examples. FIG. 15B is a graphical representation illustrating an exemplary implementation of a vector-based sign prediction scheme in accordance with some implementations of the present disclosure. An exemplary comparison between the existing sign prediction scheme and the vector-based sign prediction scheme disclosed herein is illustrated herein with reference to FIGS. 15A-15B.

In FIGS. 15A-15B, there are six non-zero transform coefficients in a transform block which are selected as candidate transform coefficients for the sign prediction. The candidate transform coefficients are scanned from a coefficient matrix of the transform block using a raster scan order. Original signs and predicted signs of the candidate transform coefficients are also shown in FIGS. 15A-15B. For example, both an original sign and a predicted sign of a first candidate transform coefficient with a value of "−2" are "−" (represented as "1" in FIGS. 15A-15B). Both an original sign and a predicted sign of a second candidate transform coefficient with a value of "3" are "+" (represented as "0" in FIG. 15A). An original sign and a predicted sign of a third candidate transform coefficient with a value of "1" are "+" and "−," respectively (represented as "0" and "1" in FIGS. 15A-15B, respectively). The original sign of the third candidate transform coefficient is incorrectly predicted. As shown in FIGS. 15A-15B, except the third transform coefficient, original signs of all the other candidate transform coefficients are the same as their corresponding predicted signs (i.e., being correctly predicted).

Referring to FIG. 15A, 6 bins (i.e., 0, 0, 1, 0, 0 and 0) are generated in total with each bin corresponding to a candidate transform coefficient. The 6 bines can be generated by performing an XOR operation between the original signs and the predicted signs of the 6 candidate transform coefficients. The 6 bins can be used to indicate the corresponding correctness of the 6 predicted signs. For example, a first bin and a second bin each having a value of "0" indicate that the predicted signs for the first and second candidate transform coefficients are correct. A third bin having a value of "1" indicates that the predicted sign for the third transform coefficient is not correct. The 6 bins can be sent to CABAC for entropy coding.

Referring to FIG. 15B, the vector-based sign prediction scheme disclosed herein divides the 6 candidate transform coefficients into 3 groups, and each group includes 2 consecutive candidate transform coefficients. Because the signs of the candidate transform coefficients in Groups #0 and #2 can be correctly predicted, only two bins each having a value of "0" are generated for the two groups. For Group #1, since it includes the third candidate transform coefficient whose sign cannot be correctly predicted, a bin with a value of "1" (which is underlined in FIG. 15B) is generated and signaled in the bit stream to indicate that the group includes at least a candidate transform coefficient whose original sign is different from its predicted sign. Subsequently, two additional bins with values of "1" and "0" are generated for the third and fourth candidate transform coefficients in Group #1 to indicate whether their signs can be correctly predicted. Correspondingly, there are 5 bins in total generated for CABAC when the vector-based sign prediction scheme disclosed herein is applied, which has less bits than the bins generated by the existing sign prediction scheme shown in FIG. 15A. Thus, by applying the vector-based sign prediction scheme disclosed herein, the signaling overhead can be reduced, and the coding efficiency of the transform block can be improved.

Consistent with the present disclosure, although the raster scan order is used to obtain the candidate transform coefficients from the coefficient matrix of the transform block as shown in FIG. 15B, any other scan orders can also be used for selecting the candidate transform coefficients for sign prediction. For example, the candidate transform coefficients can be selected based on one or more selection criteria described above. The similar description is not repeated herein.

Figure 16A:
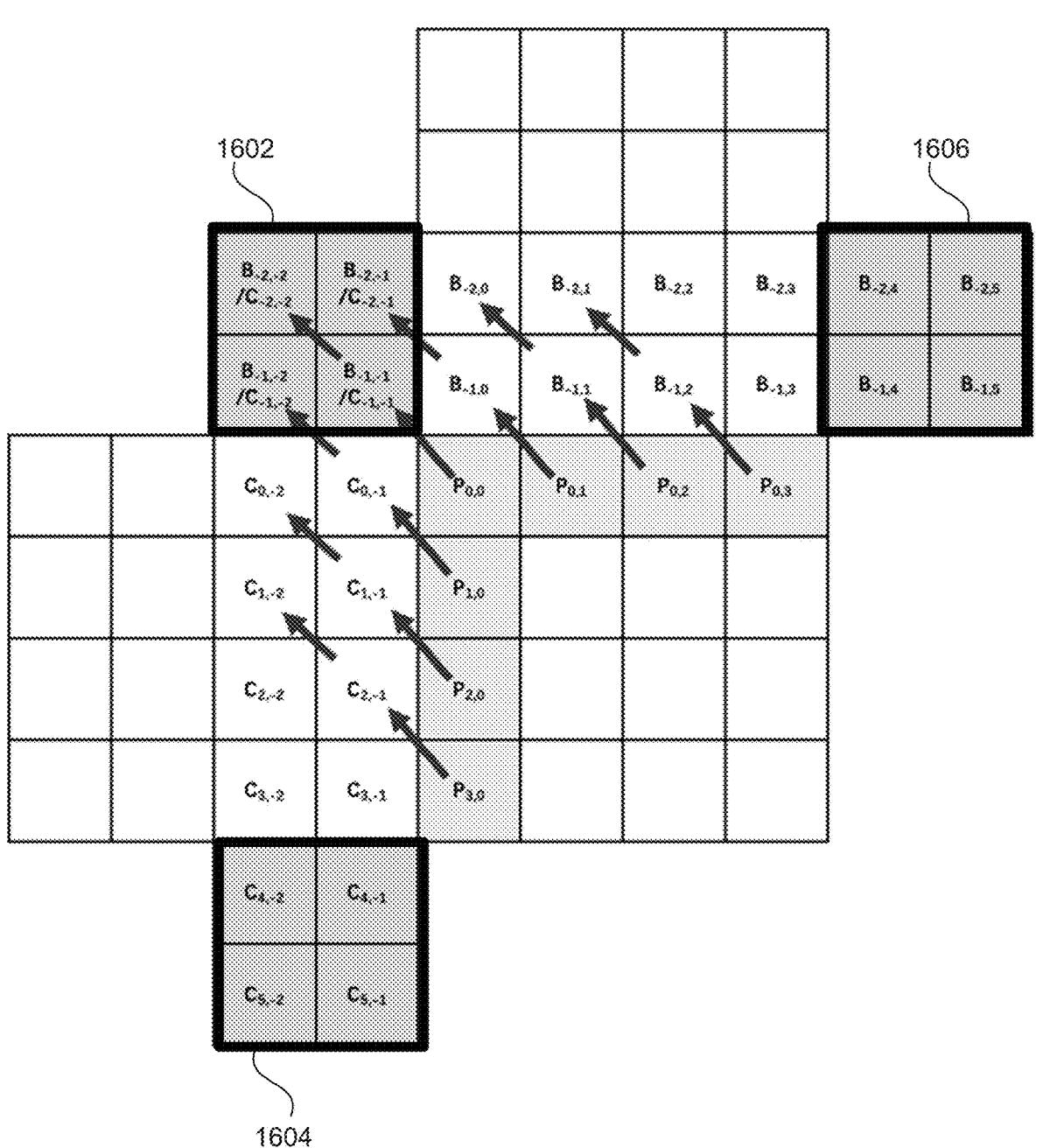
FIG. 16A is a graphical representation illustrating exemplary calculation of a left-diagonal cost function along a left diagonal direction in accordance with some implementations of the present disclosure.
Figure 16B:
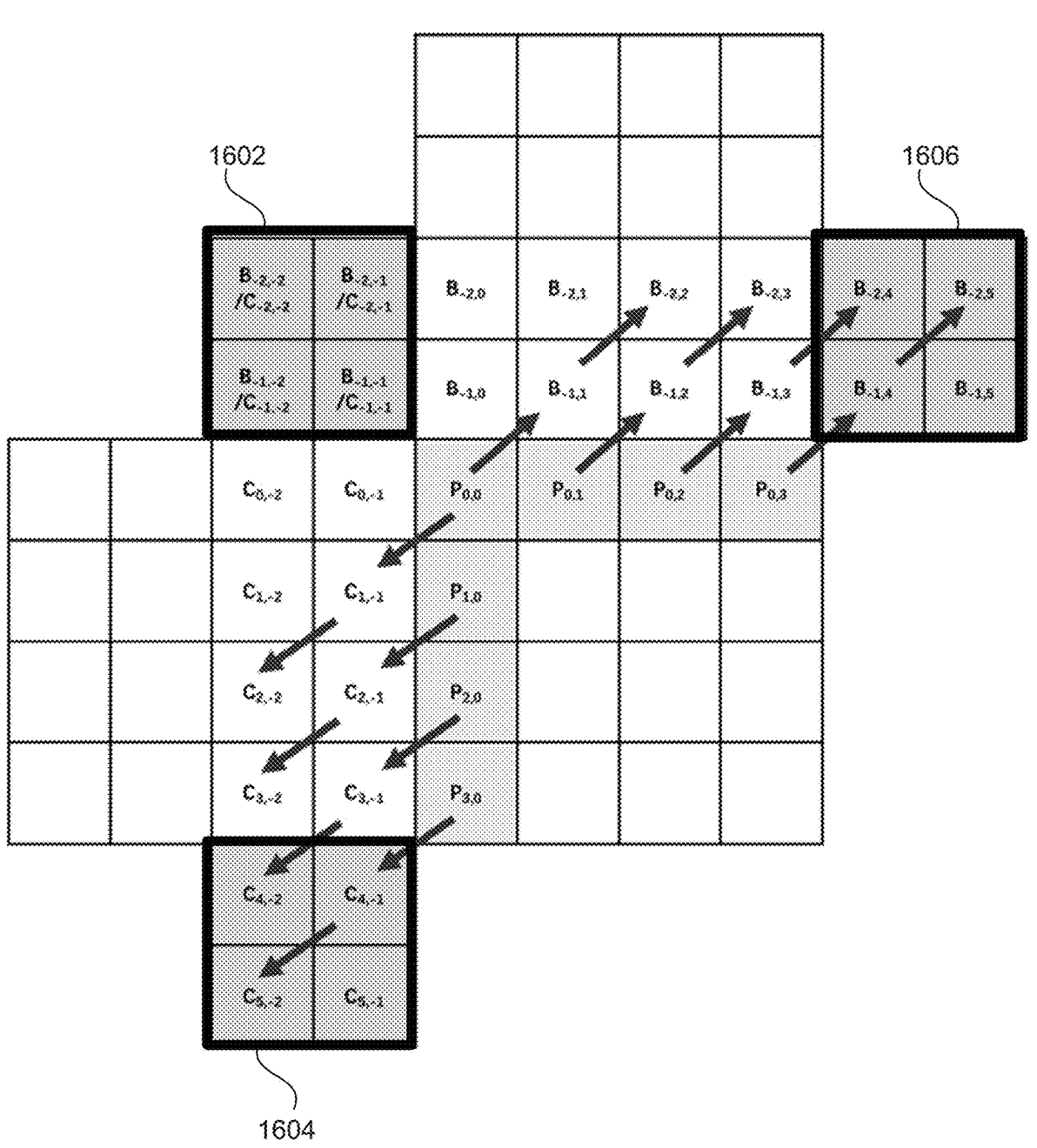
FIG. 16B is a graphical representation illustrating exemplary calculation of a right-diagonal cost function along a right diagonal direction in accordance with some implementations of the present disclosure.

FIG. 16A is a graphical representation illustrating exemplary calculation of a left-diagonal cost function along a left diagonal direction in accordance with some implementations of the present disclosure. FIG. 16B is a graphical representation illustrating exemplary calculation of a right-diagonal cost function along a right diagonal direction in accordance with some implementations of the present disclosure. Compared with the above expression (8) for the calculation of costHV, the left-diagonal cost function costD1 or the right-diagonal cost function costD2 shown in the above expression (14) or (15) may need more neighboring pixels to support the calculation of the cost functions costD1, costD2 along the diagonal directions (illustrated as pixels marked within areas 1602, 1604, and 16606 in FIGS. 16A-16B). When these pixels in areas 1602, 1604, and 1606 are not available, then a nearest padding method can be adopted to fill these unavailable positions. For example, if $B_{-1,4}$ in area 1606 is unavailable, $B_{-1,3}$ which is an available pixel closest to $B_{-1,4}$ is used to fill the position of $B_{-1,4}$ (e.g., $B_{-1,4}=B_{-1,3}$). If $B_{-1,-1}$ (also denoted as $C_{-1,-1}$), $B_{-1,-2}$ ($C_{-1,-1}$), $B_{-2,-1}$ ($C_{-1,-1}$), and $B_{-2,-2}$ ($C_{-1,-1}$) in area 1602 are unavailable, several exemplary methods are disclosed herein to fill the unavailable positions.

In a first exemplary method, each unavailable position can be filled by weighting its nearest available pixels as shown below in expressions (16)-(19):

$$B_{-2,-2} = (B_{-2,0} + C_{0,-2}) * 0.5 \qquad (16)$$

$$B_{-2,-1} = (2 * B_{-2,0} + C_{0,-1})/3 \qquad (17)$$

$$B_{-1,-2} = (B_{-1,0} + 2 * C_{0,-2})/3 \qquad (18)$$

$$B_{-1,-1} = (B_{-1,0} + C_{0,-1}) * 0.5. \qquad (19)$$

In a second exemplary method, some of the unavailable positions can be filled with their nearest available pixels, respectively. For example, if $B_{-1,-2}$ in area 1602 is unavailable, it is filled with $C_{0,-2}$. If $B_{-2,-1}$ is unavailable, it is filled with $B_{-2,0}$. However, if $B_{-2,-2}$ and $B_{-1,-1}$ are unavailable, they can be filled with an average of their two nearest neighboring pixels calculated according to the above expressions (16) and (17).

In a third exemplary method, only available neighboring reconstructed samples are used to calculate the cost function. In case when the cost calculation of one boundary sample along the top/left boundary of the current block involves any unavailable reconstructed samples, they will not be used in calculating the cost in the corresponding direction. For example, in FIG. 16B, only the boundary samples $P_{0,0}$, $P_{0,1}$ and $P_{1,0}$ are used for calculating the value of the cost function in the top-right direction while $P_{0,2}$, $P_{0,3}$, $P_{2,0}$ and $P_{3,0}$ will not be used given that their cost computations refer to at least one reference samples which are not available.

Consistent with the present disclosure, although the left diagonal and the right diagonal (i.e., 135° and 45° shown in FIGS. 16A-16B) are used for illustration purpose in the calculation of the cost function shown in the above expression (14) or (15), it is contemplated any other measurement components (e.g., a continuity measurement along one or more arbitrary directions) can be incorporated into the calculation of the cost function for the sign prediction.

In a fourth implementation, a sample extrapolation method, which is based on the gradient analysis of the texture information among the neighboring samples of one current block, can be implemented to improve the precision of the cost function for the sign prediction. Instead of always using a fixed extrapolation direction (e.g., vertical extrapolation for the above neighboring samples and horizontal extrapolation for the horizontal neighboring samples), a texture analysis of the top and left neighboring reconstructed samples of the current block can be performed at both encoder and decoder, and the most dominate direction of the neighboring samples' gradients can be selected to extrapolate the boundary samples along the top and left boundaries of the current block.

For example, FIG. 17 is a flow chart of a method 1700 for capturing a dominate gradient direction within the neighboring reconstructed samples of a current block in accordance with some implementations of the present disclosure. Method 1700 may be implemented by a video processor associated with video encoder 20 or video decoder 30, and may include steps 1702-1712 as described below. Some of the steps may be optional to perform the disclosure provided herein. Further, some of the steps may be performed simultaneously, or in a different order than shown in FIG. 17.

Figure 18A:
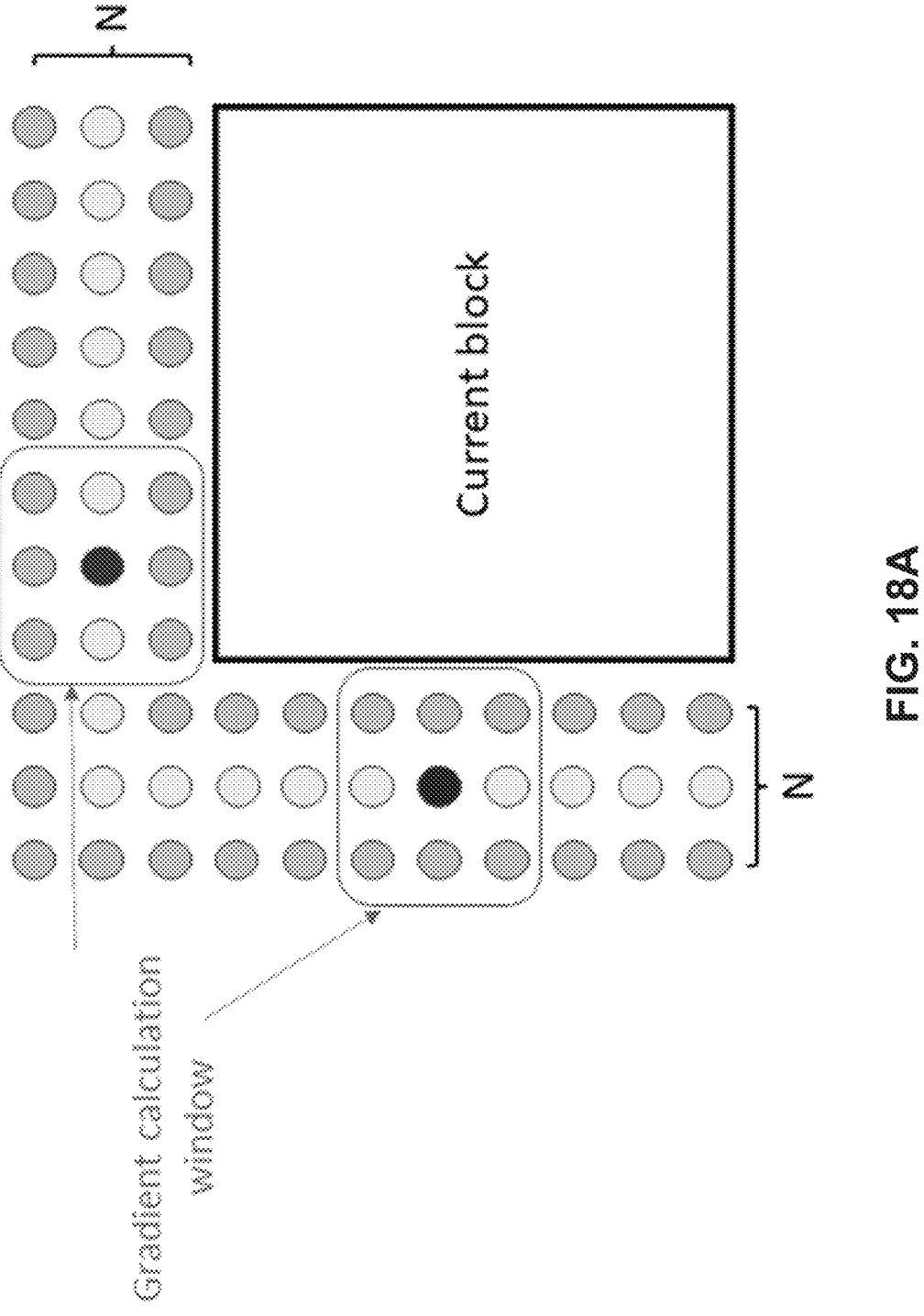
FIG. 18A is a graphical representation illustrating exemplary template samples and gradient filter windows in a gradient-based selection of a sample extrapolation direction for a cost function in accordance with some implementations of the present disclosure.

In step 1702, reference samples are selected for a current block for the gradient derivation. In some implementations, reference samples form a template. For example, FIG. 18A is a graphical representation illustrating exemplary template samples and gradient filter windows in a gradient-based selection of a sample extrapolation direction for a cost function in accordance with some implementations of the present disclosure. As shown in FIG. 18A, a template of N rows and columns of the neighboring reconstructed samples above and left to the current block are used as the reference samples for the gradient derivation. In the example of FIG. 18A, the template size is equal to 3.

In step 1704, a histogram of gradient (HoG) is initialized. For example, the HoG may be generated with a number of entries, where each entry of the histogram of gradient corresponds to an accumulated magnitude of the gradients at a predefined angular direction. Each entry may be initialized as zero. For example, FIG. 18B a graphical representation illustrating an exemplary histogram of gradient (HoG) in a gradient-based selection of a sample extrapolation direction for a cost function in accordance with some implementations of the present disclosure. In practice, different predefined directions may be used in the disclosed gradient analysis scheme. In one embodiment, the same directions as defined for 65 angular directions of the regular intra prediction in the VVC/ECM is used.

In step 1706, a gradient filter window is applied to the reference samples to calculate the respective gradients. As shown in FIG. 18A, one N×N gradient filter window is applied to each template sample located at the middle row/column of the template (i.e., the filter window is centered at the sample position) to calculate its corresponding horizontal gradient $G_h$ and vertical gradient $G_v$, respectively.

In step 1708, the angle (Angle) and magnitude (Amp) of the gradient of each reference sample is calculated. For example, the gradient of a sample can be calculated according to expressions (20) and (21):

$$\text{Angle} = \tan^{-1}\left(\frac{G_h}{G_v}\right) \tag{20}$$

$$Amp = |G_h| + |G_v| \tag{21}$$

Figure 18B:
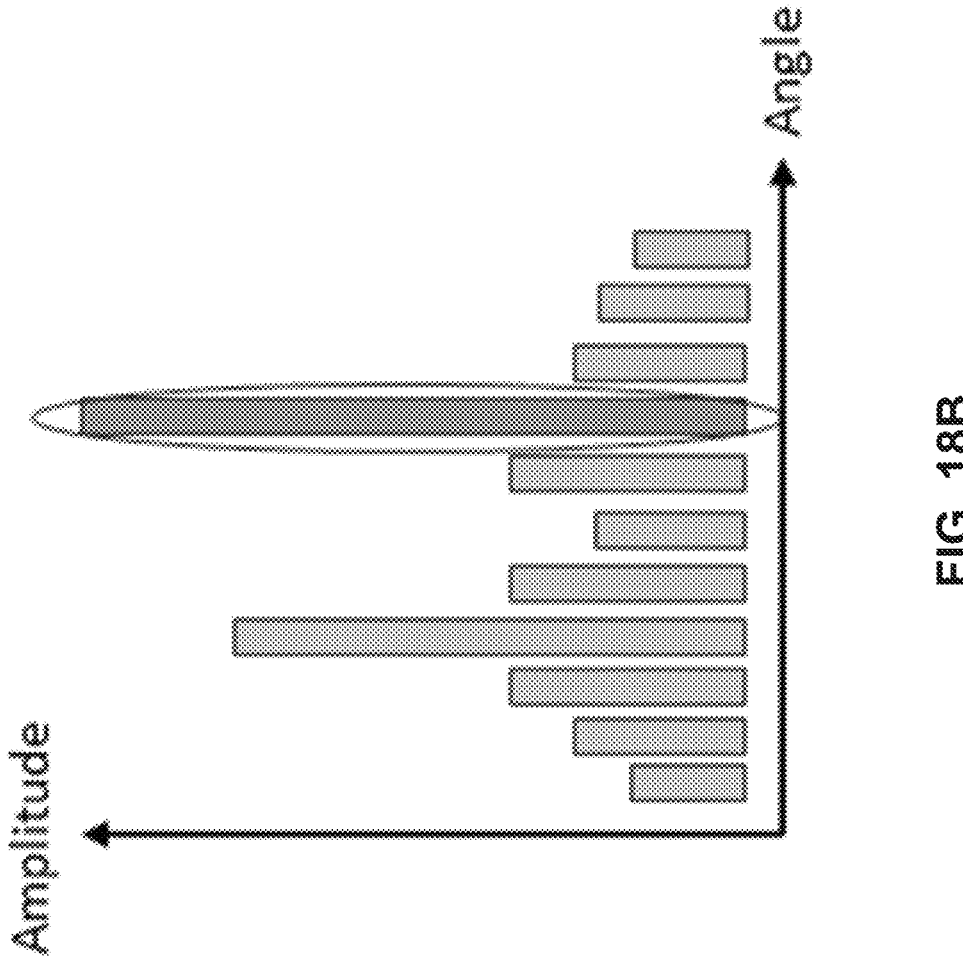
FIG. 18B a graphical representation illustrating an exemplary histogram of gradient (HoG) in a gradient-based selection of a sample extrapolation direction for a cost function in accordance with some implementations of the present disclosure.

In step 1710, the angle of the gradient can be converted into one of the predefined directions and the corresponding entry in the HoG is updated. For example, as shown in FIG. 18B, the Amplitude in the HoG for each Angle is updated by adding the magnitude (Amp) of the sample gradient of that Angle. As a result, the Amplitude is an accumulated magnitude.

In step 1712, the entry of the HoG with the largest accumulated magnitude will be selected as the direction used to extrapolate the neighboring samples for the cost function of the current block. For example, as shown in FIG. 18B, the largest entry is circled.

In the above method, the direction with the largest magnitude is selected as the direction for sample extrapolation. Such method may not necessarily be reliable when there is some noise (e.g., quantization errors and/or coding noise caused by other coding modules). To solve such problem, certain conditions may be applied before the dominant gradient direction is adopted as the extrapolation direction.

For example, in one implementation, the selected dominant gradient direction may be enabled for sample extrapolation of the cost function calculation only when there are enough template samples that belong to the selected gradient direction (e.g., the percentage of the samples belonging to the selected direction is large enough, such as exceeding a predetermined threshold). Otherwise (e.g., the number of template sample belonging to the selected direction is not large enough), the default extrapolation (e.g., vertical extrapolation for the above neighbor and horizontal extrapolation for the left neighbor) is still applied.

In another implementation, the selected dominant gradient direction may be enabled for sample extrapolation of the cost function calculation only when the gradient magnitude associated with the dominant gradient direction is large enough (e.g., the ratio of the magnitude of the selected gradient direction to the sum of the magnitudes of all the gradient directions is larger than another predetermined threshold). Otherwise (e.g., the gradient magnitude of the selected direction is not significant), the default extrapolation is still applied.

In yet another implementation, the above constrains are applied together. That is, the selected direction is only enabled for the sample extrapolation of the current block only when the number of template samples associated with selected direction are large enough and the gradient magnitude is significant enough. Otherwise, the default extrapolation is still applied.

In yet another implementation, when the selected dominant gradient direction is enabled, the direction that is orthogonal to the selected direction is used for the sample extrapolation in the calculation of the cost function when predicting the signs within one block. For instance, when the selected direction is 45-degree, then 135-degree will be used as the direction to extrapolate the samples along the top and left boundaries of the current block. Similarly, when the selected direction is 135-degree, then 45-degree will be used as the direction to extrapolate the samples along the top and left boundaries of the current block.

FIG. 19 is a flow chart of an exemplary method 1900 for sign prediction in block-based video coding in accordance with some implementations of the present disclosure. Method 1900 may be implemented by a video processor associated with video encoder 20 or video decoder 30, and may include steps 1802-1808 as described below. Some of the steps may be optional to perform the disclosure provided herein. Further, some of the steps may be performed simultaneously, or in a different order than shown in FIG. 19.

In step 1902, the video processor may apply a primary transform and a secondary transform to a transform block of a video frame from a video to generate transform coefficients for the transform block.

In step 1904, the video processor may select a set of candidate transform coefficients from the transform coefficients for the sign prediction.

In step 1906, the video processor may apply a template-based hypothesis generation scheme to select a hypothesis from a plurality of candidate hypotheses for the set of candidate transform coefficients.

In step 1908, the video processor may determine a combination of sign candidates associated with the selected hypothesis to be a set of predicted signs for the set of candidate transform coefficients.

Consistent with the present disclosure, methods 1500 and FIG. 15 may be performed on a video encoder side or a video decoder side. When method 1500 is performed on the video encoder side, it may be considered as encoding methods for transform coefficient sign prediction on the video encoder side. When method 1500 is performed on the video decoder side, it may be considered as decoding methods for transform coefficient sign prediction on the video decoder side. An exemplary encoding method for transform coefficient sign prediction on the video encoder side and an exemplary decoding method for transform coefficient sign prediction on the video decoder side are respectively provided below with reference to FIG. 20 and FIG. 21.

FIG. 20 is a flow chart of an exemplary video encoding method 2000 for transform coefficient sign prediction performed by a video encoder, in accordance with some implementations of the present disclosure. Method 2000 may be implemented by a video processor associated with video encoder 20, and may include steps 2002-2018 as described below. Specifically, steps 2006-2012 of method 2000 may be performed as an exemplary implementation of step 1906 of method 1900. Some of the steps may be optional to perform the disclosure provided herein. Further, some of the steps may be performed simultaneously, or in a different order than shown in FIG. 20.

In step 2002, the video processor may apply a primary transform and a secondary transform to a transform block of a video frame from a video to generate transform coefficients for the transform block.

In step 2004, the video processor may select a set of candidate transform coefficients from the transform coefficients for the sign prediction.

In step 2006, the video processor may determine a plurality of combinations of sign candidates for the set of candidate transform coefficients based on a total number of candidate transform coefficients in the set of candidate transform coefficients.

In step 2008, the video processor may apply a template-based hypothesis generation scheme to generate a plurality of candidate hypotheses for the plurality of combinations of sign candidates, respectively.

In step 2010, the video processor may capture a dominant gradient direction for neighboring sample extrapolation of the transform block. For example, the video processor may perform method 1700 to capture the dominant gradient direction, as described in connection with FIG. 17 above.

In step 2012, the video processor may select a hypothesis associated with a minimal cost from the plurality of candidate hypotheses based on a cost function that extrapolates neighboring samples based on the dominant gradient direction. In some implementations, as described above, the dominant gradient direction has to be meet certain conditions before it is adopted as the extrapolation direction for the purpose of calculating the cost function. The video processor may determine whether those conditions are met. If so, neighboring sample extrapolation is performed along the dominant gradient direction in calculating the cost function. Otherwise, default extrapolation directions (e.g., vertical extrapolation for the above neighbor and horizontal extrapolation for the left neighbor) may be used.

In step 2014, the video processor may determine a combination of sign candidates associated with the selected hypothesis to be a set of predicted signs for the set of candidate transform coefficients.

In step 2016, the video processor may apply a vector-based sign prediction scheme to the set of predicted signs to generate a sequence of sign signaling bits for the set of candidate transform coefficients.

In step 2018, the video processor may generate a bit stream including the sequence of sign signaling bits.

Figure 21:
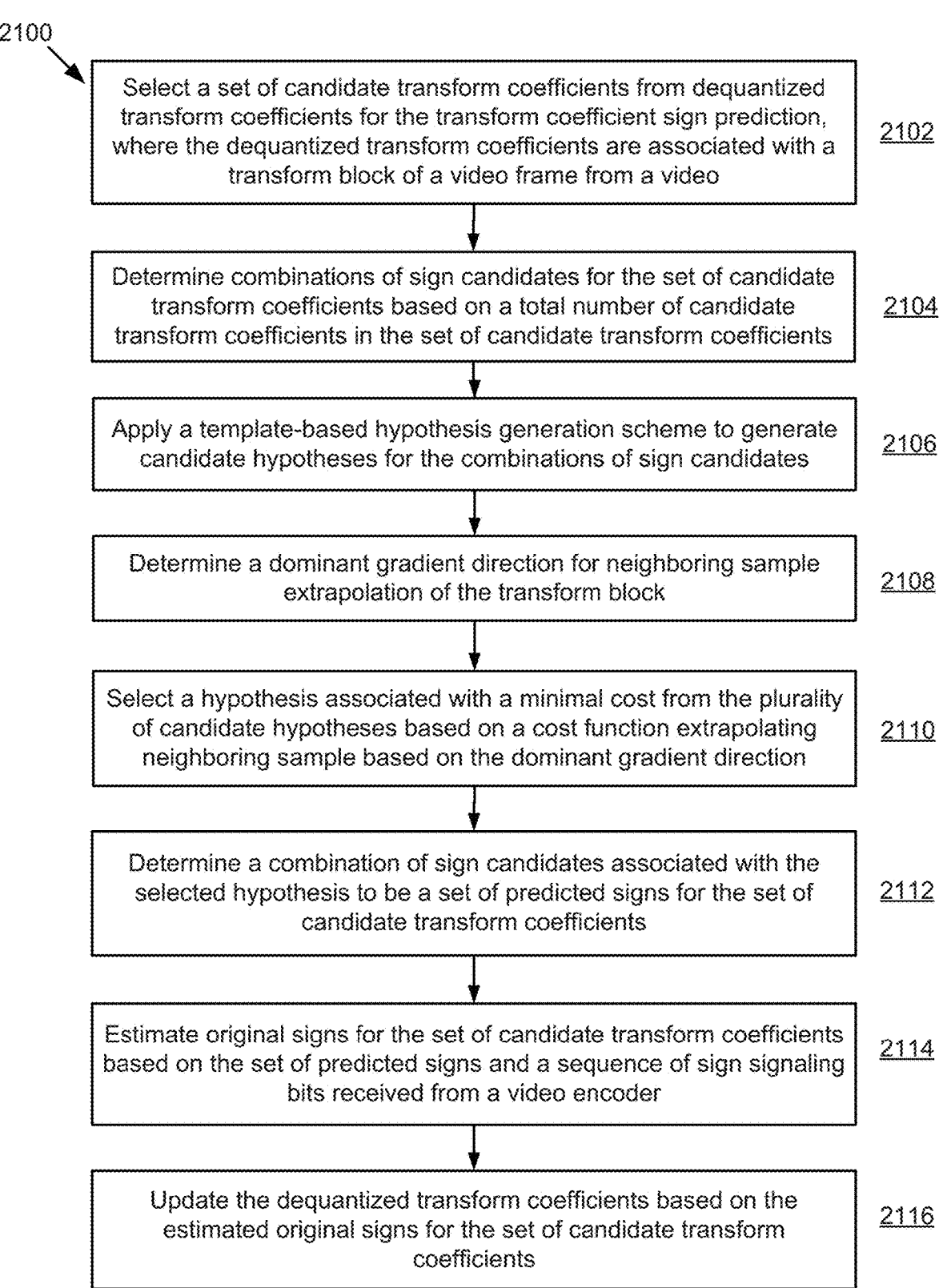
FIG. 21 is a flow chart of an exemplary video decoding method for transform coefficient sign prediction performed by a video decoder in accordance with some implementations of the present disclosure.

FIG. 21 is a flow chart of an exemplary video decoding method 2100 for transform coefficient sign prediction performed by a video decoder, in accordance with some implementations of the present disclosure. Method 2100 may be implemented by a video processor associated with video decoder 30, and may include steps 2102-2116 as described below. Some of the steps may be optional to perform the disclosure provided herein. Further, some of the steps may be performed simultaneously, or in a different order than shown in FIG. 21.

In step 2102, the video processor may select a set of candidate transform coefficients from dequantized transform coefficients for the transform coefficient sign prediction. The dequantized transform coefficients are associated with a transform block of a video frame from a video. The dequantized transform coefficients of the transform block in video decoder 30 may be equivalent to transform coefficients of the transform block in the video encoder 20.

In some implementations, the video processor may receive a bit stream including the sequence of sign signaling bits and quantized transform coefficients associated with the transform block. The video processor may generate the dequantized transform coefficients from the quantized transform coefficients through inverse quantization unit 86 of FIG. 3.

In some implementations, the video processor may select the set of candidate transform coefficients from the dequantized transform coefficients based on magnitudes of the dequantized transform coefficients. In some implementations, the video processor may select the set of candidate transform coefficients from the dequantized transform coefficients based on magnitudes of quantization indices of the dequantized transform coefficients. In some implementations, the video processor may select the set of candidate transform coefficients from the dequantized transform coefficients based on a coefficient scan order of entropy coding applied in video coding.

In some implementations, the video processor may select the set of candidate transform coefficients from the dequantized transform coefficients based on influence scores of the dequantized transform coefficients on reconstructed border samples of the transform block. For example, the influence scores of the dequantized transform coefficients on the reconstructed border samples are measured as an L1 norm of a variation of each dequantized transform coefficient on the reconstructed border samples. In another example, the influence scores of the dequantized transform coefficients on the reconstructed border samples are measured as an L2 norm of a variation of each dequantized transform coefficient on the reconstructed border samples.

In some implementations, the video processor may perform operations like those described above with reference to coefficient selection operation 1104 of FIG. 11 to select the set of candidate transform coefficients from the dequantized transform coefficients. Also, the video processor may perform operations like those described above for step 1904 of FIG. 19 to select the set of candidate transform coefficients from the dequantized transform coefficients. The similar description is not repeated herein.

In step 2104, the video processor may determine a plurality of combinations of sign candidates for the set of candidate transform coefficients based on a total number of candidate transform coefficients in the set of candidate transform coefficients.

In step 2106, the video processor may apply a template-based hypothesis generation scheme to generate a plurality of candidate hypotheses for the plurality of combinations of sign candidates, respectively.

In step 2108, the video processor may capture a dominant gradient direction for neighboring sample extrapolation of the transform block. For example, the video processor may perform method 1700 to capture the dominant gradient direction, as described in connection with FIG. 17 above.

In step 2110, the video processor may select a hypothesis associated with a minimal cost from the plurality of candidate hypotheses based on a cost function that extrapolates neighboring samples based on the dominant gradient direction.

In some implementations, to perform steps 2104-2110 of method 2100 that select a hypothesis based on a cost function using sample extrapolation along the dominant gradient direction, the video processor may perform operations like those described above with reference to steps 2006-2012 of method 2000.

In step 2112, the video processor may determine a combination of sign candidates associated with the selected hypothesis to be a set of predicted signs for the set of candidate transform coefficients.

In some implementations, the video processor may perform operations like those described above with reference to sign generation operation 1108 of FIG. 11. Also, the video processor may perform operations like those described above for step 1908 of FIG. 19 to determine the set of predicted signs for the set of candidate transform coefficients. The similar description is not repeated herein.

In step 2114, the video processor may estimate original signs for the set of candidate transform coefficients based on the set of predicted signs and a sequence of sign signaling bits received from a video encoder.

For example, with reference to FIG. 15B, the set of predicted signs can include Group #0 with values (1, 0), Group #2 with values (1, 0), and Group #3 with values (1, 0), where 1 indicates a negative sign and 0 indicates a positive sign. The sequence of sign signaling bits can include a bit "0" for Group #0, bits "1, 1, 0" for Group #2, and a bit "0" for Group #3. Since the bit for Group #0 has a value of "0," indicating the predicted signs for this group with values of (1, 0) are the same as the original signs, the estimated original signs for Group #0 are determined to be (1, 0). Since a first bit in the bits for Group #1 has a value of "1," indicating the predicted signs for this group (1, 0) are not the same as the original signs, then the estimated original signs for Group #1 (1, 0) are determined to be an XOR result of the predicted signs for this group (1, 0) and the second and third bits "1, 0" for Group #1 (e.g., the estimated original signs=XOR ((1, 0), (1, 0))=(0, 0)). Since the bit for Group #2 has a value of "0," indicating the predicted signs for this group with values of (1, 0) are the same as the original signs, the estimated original signs for Group #2 are determined to be (1, 0). Then, the estimated original signs for the set of candidate transform coefficients are formed by concatenating the estimated original signs of Groups #0, #1, and #2, respectively, which includes (1, 0, 0, 0, 1, 0).

In step 2116, the video processor may update the dequantized transform coefficients based on the estimated original signs for the set of candidate transform coefficients. For example, the video processor may use the estimated original signs as true signs for dequantized transform coefficients in the transform block that correspond to the set of candidate transform coefficients.

In some implementations, after the dequantized transform coefficients are updated, the video processor may further apply an inverse primary transform and an inverse secondary transform to the dequantized transform coefficients to generate residual samples in a residual block corresponding to the transform block. The inverse secondary transform corresponds to a secondary transform that includes an LFNST. The inverse primary transform corresponds to a primary transform that includes DCT-II, DCT-V, DCT-VIII, DST-I, DST-IV, DST-VII, or and identity transforms.

In some implementations, the sequence of sign signaling bits for the set of candidate transform coefficients are generated by the video encoder by: applying, by the video encoder, a vector-based sign prediction scheme to another set of predicted signs for another set of candidate transform coefficients selected on a video encoder side; and generating a bit stream including the sequence of sign signaling bits. The other set of candidate transform coefficients are transform coefficients on the video encoder side that correspond to the set of candidate transform coefficients on the video decoder side.

In some implementations, applying the vector-based sign prediction scheme to the other set of predicted signs for the other set of candidate transform coefficients further includes: dividing the other set of candidate transform coefficients into a plurality of groups of candidate transform coefficients; and for each group of candidate transform coefficients, generating one or more sign signaling bits for the group of candidate transform coefficients based on whether original signs of the group of candidate transform coefficients are identical to predicted signs of the group of candidate transform coefficients.

In some implementations, generating the one or more sign signaling bits for the group of candidate transform coefficients includes: responsive to the original signs of the group of candidate transform coefficients being identical to the predicted signs of the group of candidate transform coefficients, generating a bin with a value of zero; and adding the bin as a sign signaling bit to a bit stream.

In some implementations, generating the one or more sign signaling bits for the group of candidate transform coefficients includes: responsive to the original signs of the group of candidate transform coefficients being not identical to the predicted signs of the group of candidate transform coefficients, generating a bin with a value of one; generating a set of additional bins for informing corresponding correctness of the predicted signs of the group of candidate transform coefficients; and adding the bin and the set of additional bins as sign signaling bits to the bit stream.

Figure 22:
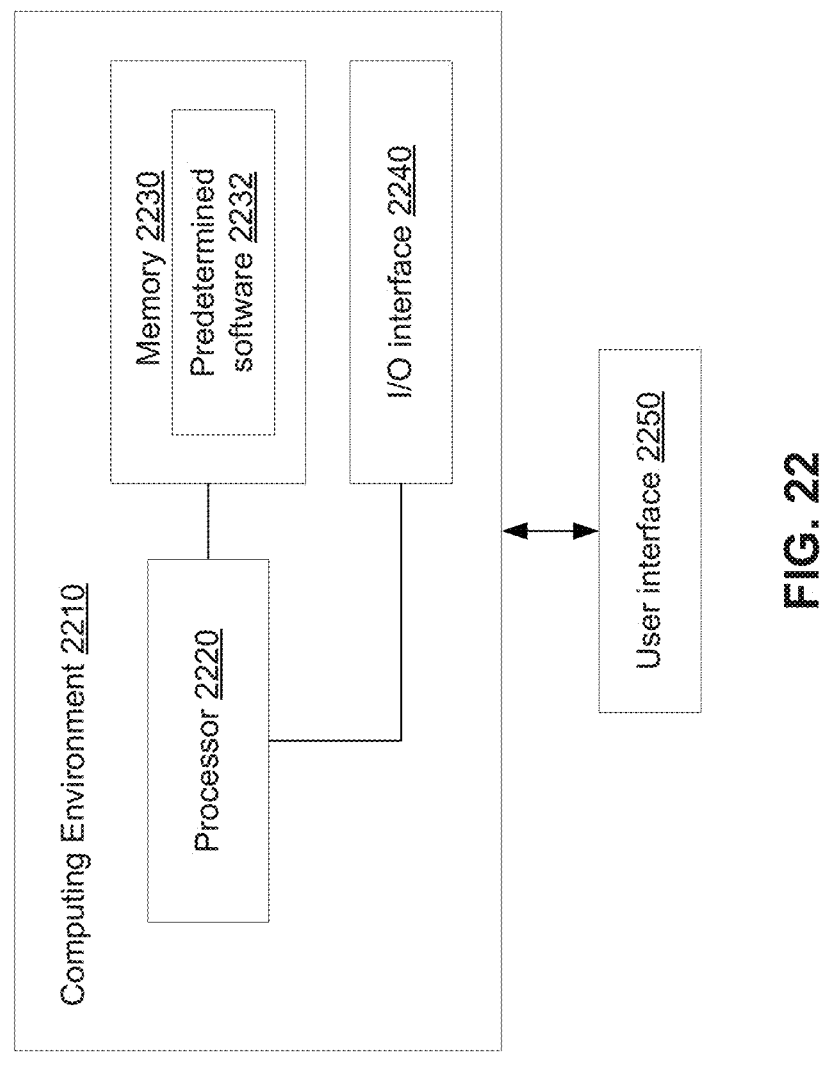
FIG. 22 is a block diagram illustrating a computing environment coupled with a user interface in accordance with some implementations of the present disclosure.

FIG. 22 shows a computing environment 2210 coupled with a user interface 2250, according to some implementations of the present disclosure. The computing environment 2210 can be part of a data processing server. For example, the video processor in video encoder 20 or video decoder 30, disclosed above, can be implemented using computing environment 2210. The computing environment 2210 includes a processor 2220, a memory 2230, and an Input/Output (I/O) interface 2240.

The processor 2220 typically controls overall operations of the computing environment 2210, such as the operations associated with display, data acquisition, data communications, and image processing. The processor 2220 may include one or more processors to execute instructions to perform all or some of the steps in the above-described methods. Moreover, the processor 2220 may include one or more modules that facilitate the interaction between processor 2220 and other components. The processor 2220 may be a Central Processing Unit (CPU), a microprocessor, a single chip machine, a Graphical Processing Unit (GPU), or the like.

The memory 2230 is configured to store various types of data to support the operation of the computing environment 2210. The memory 2230 may include predetermined software 2232. Examples of such data includes instructions for any applications or methods operated on the computing environment 2210, video datasets, image data, etc. The memory 2230 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 2240 provides an interface between the processor 2220 and peripheral interface modules, such as a keyboard, a click wheel, buttons, or the like. The buttons may include but are not limited to, a home button, a start scan button, and a stop scan button. The I/O interface 2240 can be coupled with an encoder and decoder.

In some implementations, there is also provided a non-transitory computer-readable storage medium comprising a plurality of programs, for example, in the memory 2230, executable by the processor 2220 in the computing environment 2210, for performing the above-described methods. Alternatively, the non-transitory computer-readable storage medium may have stored therein a bitstream or a data stream comprising encoded video information (for example, video information comprising one or more syntax elements) generated by an encoder (for example, video encoder 20 in FIG. 2) using, for example, the encoding method described above for use by a decoder (for example, video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like.

In some implementations, there is also provided a computing device comprising one or more processors (for example, the processor 2220); and the non-transitory computer-readable storage medium or the memory 2230 having stored therein a plurality of programs executable by the one or more processors, wherein the one or more processors, upon execution of the plurality of programs, are configured to perform the above-described methods.

In some implementations, there is also provided a computer program product comprising a plurality of programs, for example, in the memory 2230, executable by the processor 2220 in the computing environment 2210, for performing the above-described methods. For example, the computer program product may include the non-transitory computer-readable storage medium.

In some implementations, the computing environment 2210 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A video decoding method for transform coefficient sign prediction, comprising:

generating, by one or more processors, a plurality of candidate hypotheses for a set of candidate transform coefficients associated with a transform block of a video frame from a video;

selecting, by the one or more processor, a hypothesis from the plurality of candidate hypotheses as a set of predicted signs for the set of candidate transform coefficients, wherein the hypothesis is selected based on a cost function calculated by extrapolating neighboring samples of the transform block in an extrapolation direction, wherein the extrapolation direction is determined based on a dominant gradient direction, wherein the dominant gradient direction is a direction with the largest magnitude in a histogram of gradient obtained based on an accumulated magnitude of gradients for each of a plurality of angular directions; and estimating, by the one or more processors, original signs for the set of candidate transform coefficients based on the set of predicted signs and a sequence of sign signaling bits received from a video encoder.

2. The video decoding method of claim 1, further comprising:

receiving a bit stream comprising the sequence of sign signaling bits and quantized transform coefficients associated with the transform block;

generating dequantized transform coefficients from the quantized transform coefficients; and updating the dequantized transform coefficients based on the estimated original signs for the set of candidate transform coefficients.

3. The video decoding method of claim 2, further comprising:

applying an inverse primary transform and an inverse low-frequency non-separable transform (LFNST) to the dequantized transform coefficients to generate residual samples in a residual block corresponding to the transform block.

4. The video decoding method of claim 1, further comprising:

determining the dominant gradient direction for extrapolating neighboring samples of the transform block.

5. The video decoding method of claim 4, wherein determining the dominant gradient direction further comprises:

selecting templates of neighboring samples for the transform block;

applying a gradient filter window to the templates to calculate gradients for the respective templates; and selecting the dominant gradient direction based on the calculated gradients.

6. The video decoding method of claim 5, wherein selecting the dominant gradient direction based on the calculated gradients further comprises:

determining the histogram of gradient based on the calculated gradients, wherein each entry of the histogram of gradient corresponds to an accumulated magnitude of the gradients at a predefined angular direction; and selecting the angular direction in the histogram of gradient that corresponds to the maximum accumulated magnitude as the dominant gradient direction.

7. The video decoding method of claim 6, wherein determining the histogram of gradient based on the calculated gradients further comprises:

calculating an angle and a magnitude of the gradient of each template;

converting the angle of the gradient to one of the predefined angular directions in the histogram of gradient; and adding the magnitude of the gradient to the accumulated magnitude corresponding to the predefined angular direction converted from the angle of the gradient.

8. The video decoding method of claim 5, wherein the dominant gradient direction is determined to be the extrapolation direction for extrapolating the neighboring samples of the transform block in calculating the cost function, when a percentage of the neighboring samples of the transform block that belong to the dominant gradient direction exceeds a first predetermined threshold; or the dominant gradient direction is determined to be the extrapolation direction for extrapolating the neighboring samples of the transform block in calculating the cost function, when a ratio between a magnitude of the gradient of the dominant gradient direction and a sum of magnitudes of all gradients exceeds a second predetermined threshold; or the dominant gradient direction is determined to be the extrapolation direction for extrapolating the neighboring samples of the transform block in calculating the cost function, when a percentage of the neighboring samples of the transform block that belong to the dominant gradient direction exceeds a first predetermined threshold and that a ratio between a magnitude of the gradient of the dominant gradient direction and a sum of magnitudes of all gradients exceeds a second predetermined threshold.

9. The video decoding method of claim 5, wherein an orthogonal direction of the dominant gradient direction is determined to be the extrapolation direction for extrapolating the neighboring samples of the transform block in calculating the cost function.

10. The video decoding method of claim 2, wherein generating the dequantized transform coefficients from the quantized transform coefficients further comprises:

determining quantization indices of the dequantized transform coefficients based on transform coefficient levels of the quantized transform coefficients.

11. The video decoding method of claim 10, wherein determining quantization indices of the dequantized transform coefficients further comprises: for each quantized transform coefficient, selecting a quantizer between two predefined scalar quantizers based on the transform coefficient level of a quantized transform coefficient preceding the quantized transform coefficient; and determining the quantization index of the corresponding dequantized transform coefficient based on the selected quantizer applied to the quantized transform coefficient.

12. The video decoding method of claim 11, wherein the quantizer is selected between the two predefined scalar quantizers according to a state transition machine, wherein each state of the state transition machine corresponds to one of the two predefined scaler quantizers, wherein the video decoding method further comprises:

determining a current state of a state transition machine based on a previous state of a state transition machine and a parity of the transform coefficient level of a quantized transform coefficient preceding the quantized transform coefficient; and selecting the predefined scaler quantizer corresponding to the current state as the quantizer.

13. The video decoding method of claim 10, wherein:

the set of candidate transform coefficients are selected from the dequantized transform coefficients based on magnitudes of the quantization indices of the dequantized transform coefficients.

14. The video decoding method of claim 10, wherein the set of candidate transform coefficients are selected from the dequantized transform coefficients based on influence scores of the dequantized transform coefficients on reconstructed border samples of the transform block, wherein the influence scores of the dequantized transform coefficients on the reconstructed border samples are measured as an L1 norm or an L2 norm of a variation of the quantization index of each dequantized transform coefficient on the reconstructed border samples.

15. The video decoding method of claim 1, wherein generating the plurality of candidate hypotheses for the set of candidate transform coefficients further comprises:

determining a plurality of combinations of sign candidates for the set of candidate transform coefficients based on a total number of candidate transform coefficients in the set of candidate transform coefficients; and applying a template-based hypothesis generation scheme to generate the plurality of candidate hypotheses for the plurality of combinations of sign candidates, respectively.

16. The video decoding method of claim 1, wherein the sequence of sign signaling bits for the set of candidate transform coefficients indicate whether original signs of the candidate transform coefficients are identical to predicted signs of the candidate transform coefficients.

17. The video decoding method of claim 16, wherein sequence of sign signaling bits includes a first bin with a value of zero, wherein estimating the original signs for the set of candidate transform coefficients based on the set of predicted signs and the sequence of sign signaling bits further comprises:

adopting the predicted signs of a first group of candidate transform coefficients corresponding to the first bin in the sequence of sign signaling bits as the original signs of the first group of candidate transform coefficients.

18. The video decoding method of claim 17, wherein the sequence of sign signaling bits further includes a second bin with a value of one and a set of additional bins for informing corresponding correctness of the predicted signs of a second group of candidate transform coefficients, wherein estimating the original signs for the set of candidate transform coefficients based on the set of predicted signs and the sequence of sign signaling bits further comprises:

correcting the predicted signs of the second group of candidate transform coefficients according to the additional set of bins before adopting the predicted signs as the original signs of the second group of candidate transform coefficients.

19. A video decoding apparatus for transform coefficient sign prediction, comprising:

a memory configured to store a video comprising a plurality of video frames; and one or more processors coupled to the memory and configured to:

generate a plurality of candidate hypotheses for a set of candidate transform coefficients associated with a transform block of a video frame from a video;

select a hypothesis from the plurality of candidate hypotheses as a set of predicted signs for the set of candidate transform coefficients, wherein the hypothesis is selected based on a cost function calculated by extrapolating neighboring samples of the transform block in an extrapolation direction, wherein the extrapolation direction is determined based on a dominant gradient direction, wherein the dominant gradient direction is a direction with the largest magnitude in a histogram of gradient obtained based on an accumulated magnitude of gradients for each of a plurality of angular directions; and estimate original signs for the set of candidate transform coefficients based on the set of predicted signs and a sequence of sign signaling bits received from a video encoder.

20. A non-transitory computer-readable storage medium having stored therein a bitstream comprising video information to be decoded by acts comprising:

generating a plurality of candidate hypotheses for a set of candidate transform coefficients associated with a transform block of a video frame from a video;

selecting a hypothesis from the plurality of candidate hypotheses as a set of predicted signs for the set of candidate transform coefficients, wherein the hypothesis is selected based on a cost function calculated by extrapolating neighboring samples of the transform block in an extrapolation direction, wherein the extrapolation direction is determined based on a dominant gradient direction, wherein the dominant gradient direction is a direction with the largest magnitude in a histogram of gradient obtained based on an accumulated magnitude of gradients for each of a plurality of angular directions; and estimating original signs for the set of candidate transform coefficients based on the set of predicted signs and a sequence of sign signaling bits received through a bit stream from a video encoder, wherein the bit stream is stored in the non-transitory computer-readable storage medium.

* * * * *